United States Patent
Morita et al.

(10) Patent No.: US 11,042,342 B2
(45) Date of Patent: Jun. 22, 2021

(54) COMMUNICATION TERMINAL, IMAGE COMMUNICATION SYSTEM, DISPLAY METHOD, AND NON-TRANSITORY RECORDING MEDIUM

(71) Applicants: Kenichiro Morita, Tokyo (JP);
Hidekuni Annaka, Saitama (JP);
Takeshi Homma, Kanagawa (JP);
Takuya Soneda, Kanagawa (JP);
Tomonori Aikawa, Kanagawa (JP);
Hideki Shiro, Kanagawa (JP);
Takafumi Takeda, Tokyo (JP)

(72) Inventors: Kenichiro Morita, Tokyo (JP);
Hidekuni Annaka, Saitama (JP);
Takeshi Homma, Kanagawa (JP);
Takuya Soneda, Kanagawa (JP);
Tomonori Aikawa, Kanagawa (JP);
Hideki Shiro, Kanagawa (JP);
Takafumi Takeda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/929,540

(22) Filed: May 8, 2020

(65) Prior Publication Data
US 2021/0026589 A1   Jan. 28, 2021

(30) Foreign Application Priority Data
Jul. 25, 2019   (JP) .............................. JP2019-137205

(51) Int. Cl.
G06F 3/14   (2006.01)
(52) U.S. Cl.
CPC ................................ *G06F 3/1454* (2013.01)

(58) Field of Classification Search
CPC ...... H04N 7/147; H04N 5/23238; H04N 7/15; H04N 7/142; H04N 5/2258;
(Continued)

(56) References Cited

U.S. PATENT DOCUMENTS

2009/0273688 A1*  11/2009  Nonaka ................ H04N 5/2258
                                          348/222.1
2018/0097682 A1    4/2018  Hori et al.
(Continued)

FOREIGN PATENT DOCUMENTS

JP        2007-215012        8/2007

OTHER PUBLICATIONS

U.S. Appl. No. 16/699,340, filed Nov. 29, 2019 Kenichiro Morita, et al.
(Continued)

*Primary Examiner* — Koosha Sharifi-Tafreshi
(74) *Attorney, Agent, or Firm* — Xsensus LLP

(57) ABSTRACT

A communication terminal includes circuitry that displays a first image corresponding to a first area of a whole image shared by communication terminals, and stores first terminal information identifying a first one of the communication terminals that causes a second one of the communication terminals to display an image being displayed by the first communication terminal. The circuitry receives second terminal information and viewable area information from a third one of the communication terminals that displays a second image corresponding to a second area of the whole image. The second terminal information identifies the third communication terminal. The viewable area information represents the second area. When the first terminal information and the second terminal information are the same, the circuitry determines whether an operation state of the first image is an operating state, and if so, displays the second image after the operation state shifts to a standby state.

12 Claims, 47 Drawing Sheets

(58) Field of Classification Search
CPC .......... H04N 5/23206; H04N 5/232061; H04L 65/403; H04L 65/1059; H04L 29/06414
See application file for complete search history.

(56) References Cited

U.S. PATENT DOCUMENTS

| | | |
|---|---|---|
| 2018/0098105 A1 | 4/2018 | Morita et al. |
| 2018/0191787 A1 | 7/2018 | Morita et al. |
| 2018/0227457 A1 | 8/2018 | Morita et al. |
| 2019/0012332 A1* | 1/2019 | Newman .............. H04N 1/2158 |
| 2019/0082144 A1 | 3/2019 | Hakata et al. |
| 2019/0098211 A1 | 3/2019 | Ohmura et al. |
| 2019/0098253 A1 | 3/2019 | Soneda et al. |
| 2019/0191198 A1 | 6/2019 | Morita et al. |
| 2019/0306004 A1 | 10/2019 | Hakata et al. |
| 2019/0306201 A1 | 10/2019 | Ohmura et al. |
| 2019/0306421 A1 | 10/2019 | Takeda et al. |
| 2019/0306458 A1 | 10/2019 | Soneda et al. |
| 2020/0045230 A1 | 2/2020 | Ohmura et al. |
| 2020/0045244 A1 | 2/2020 | Ohmura et al. |

OTHER PUBLICATIONS

U.S. Appl. No. 16/785,661, filed Feb. 10, 2020 Tomonori Aikawa, et al.
U.S. Appl. No. 16/785,658, filed Feb. 10, 2020 Hideki Shiro, et al.

* cited by examiner

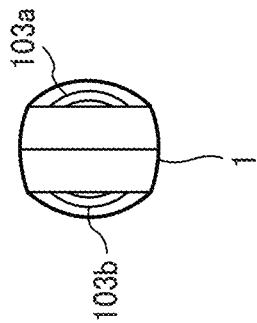
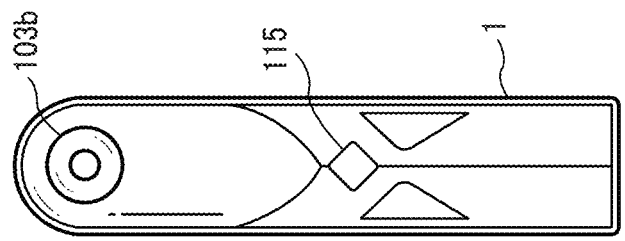
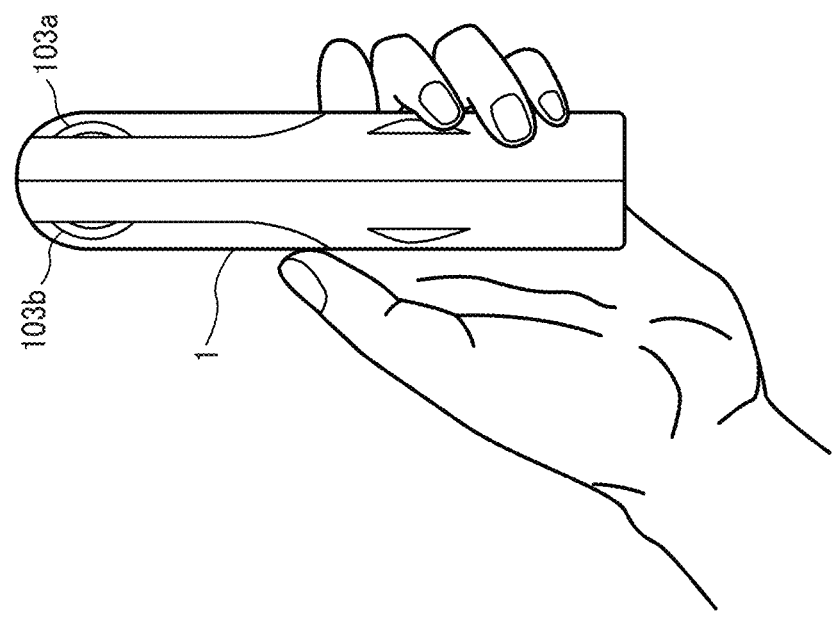
FIG. 1C
FIG. 1B
FIG. 1A

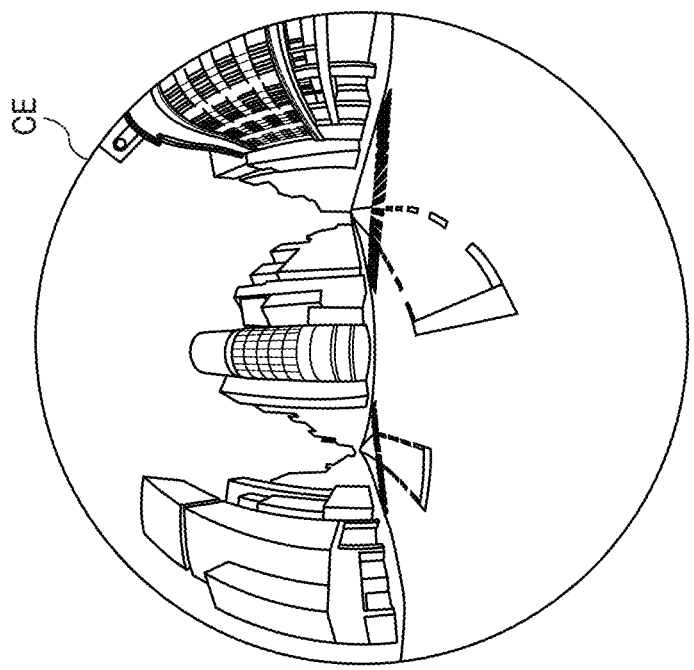
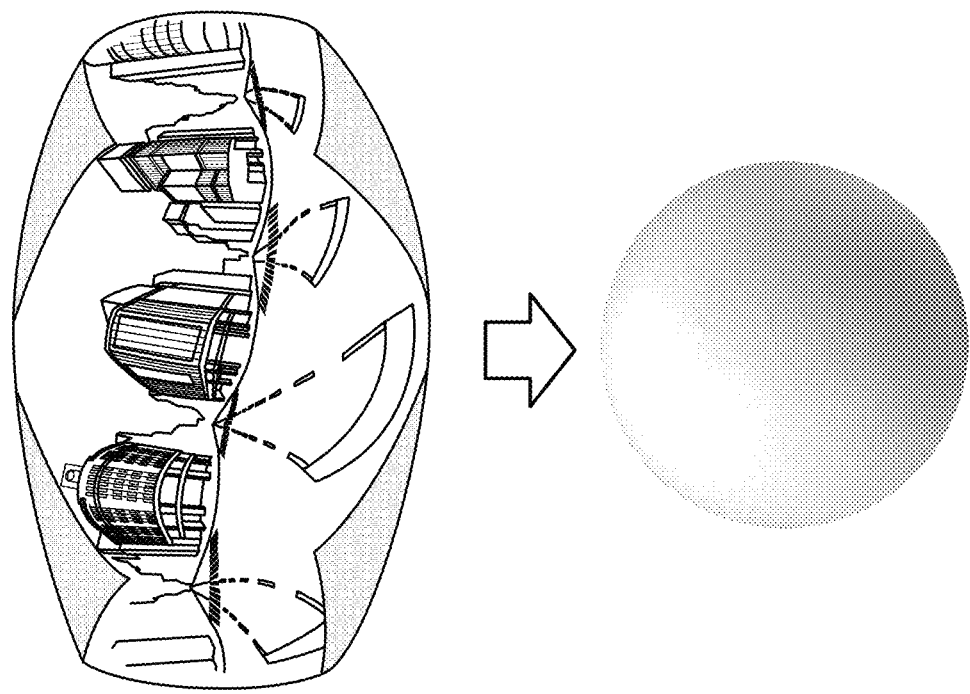

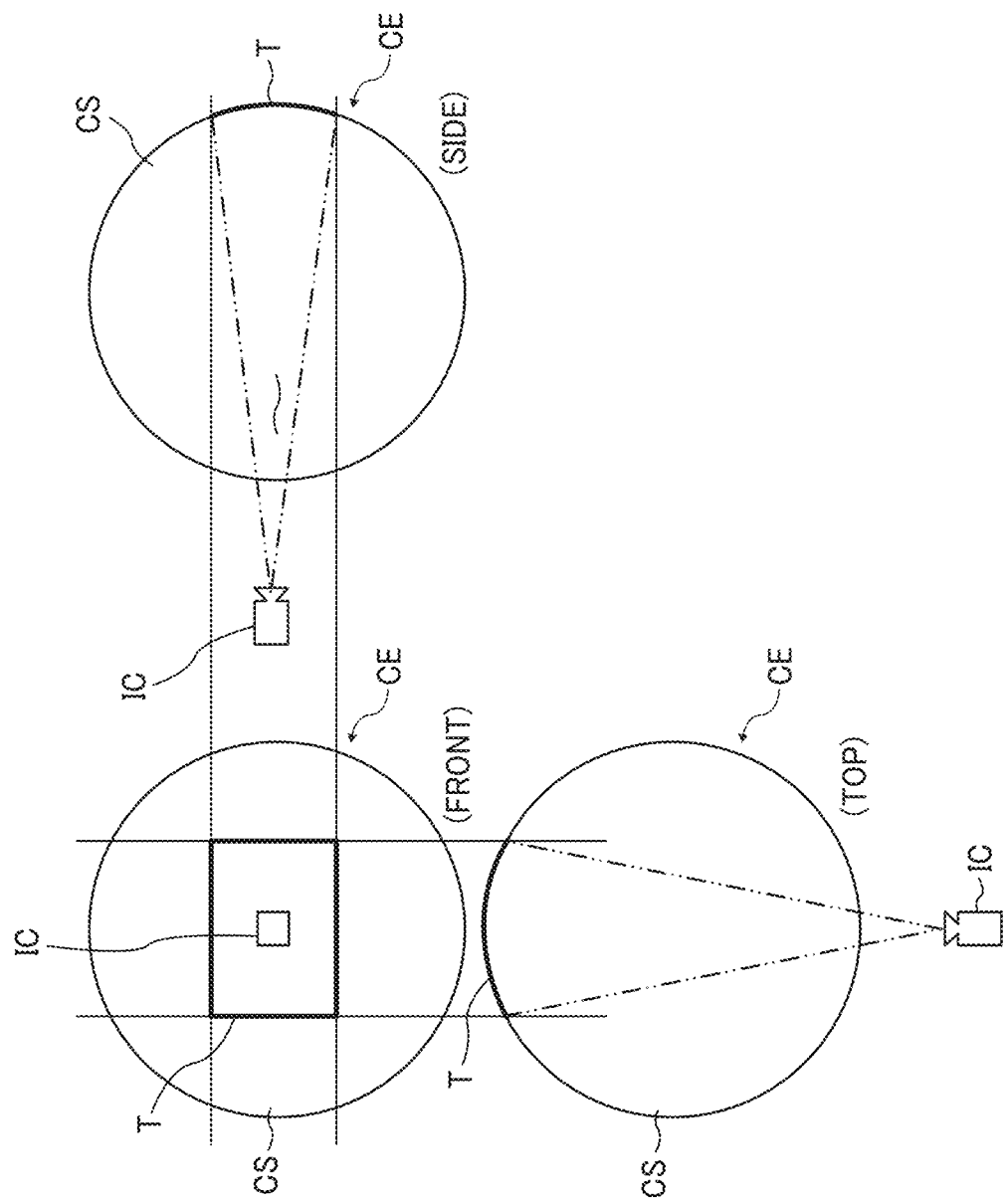

FIG. 14A
FIG. 14 | FIG. 14A |
| FIG. 14B |
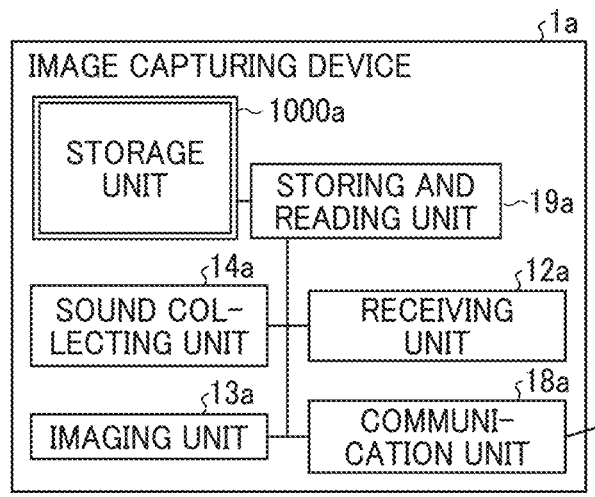
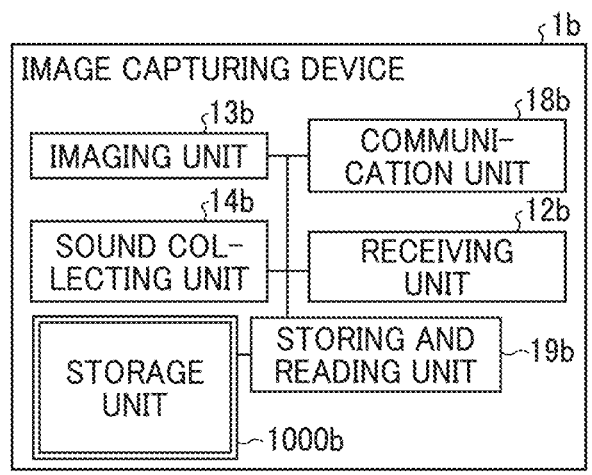

FIG. 16

| IMAGE DATA ID | IP ADDRESS OF TRANSMITTER TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |

FIG. 17

| VENDOR ID AND PRODUCT ID INCLUDED IN GUIDS OF IMAGE CAPTURING DEVICE |
|---|
| vid_05ca&pid_2711 |
| vid_05ca&pid_3822 |
| ... |

FIG. 18

| IP ADDRESS OF TERMINAL THAT TRANSMITS IMAGE | IP ADDRESS OF TERMINAL THAT RECEIVES IMAGE (TERMINAL THAT TRANSMITS VIEWABLE AREA INFORMATION) | VIEWABLE AREA INFORMATION | | |
|---|---|---|---|---|
| | | RADIUS VECTOR ($r$) | POLAR ANGLE ($\theta$) | AZIMUTH ($\phi$) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 19

| IP ADDRESS OF TERMINAL THAT TRANSMITS OMNIDIRECTIONAL IMAGE | OPERATION STATE | OPERATION TIME | IP ADDRESS OF DISPLAY CONTROL RIGHT SET TERMINAL | PENDING PARAMETERS (VIEWABLE AREA INFORMATION) | | |
|---|---|---|---|---|---|---|
| | | | | RADIUS VECTOR (r) | POLAR ANGLE ($\theta$) | AZIMUTH ($\phi$) |
| 1.2.1.1 | OPERATING | 10:12:00 | 1.2.1.4 | 10 | 20 | 30 |
| 1.2.1.2 | STANDBY | ... | ... | ... | ... | ... |
| ... | ... | ... | ... | ... | ... | ... |

FIG. 20

| SESSION ID | IP ADDRESSES OF PARTICIPANT COMMUNICATION TERMINALS |
|---|---|
| se101 | 1.2.1.3, 1.2.2.3, 1.3.1.3 |
| se102 | 1.2.1.3, 1.2.2.3, 1.3.1.3 |
| ... | ... |

FIG. 21

| SESSION ID | IMAGE DATA ID | IP ADDRESS OF TRANSMITTER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

FIG. 22

| IP ADDRESS OF TERMINAL THAT TRANSMITS IMAGE | IP ADDRESS OF TERMINAL THAT RECEIVES IMAGE | VIEWABLE AREA INFORMATION | | |
|---|---|---|---|---|
| | | RADIUS VECTOR ($r$) | POLAR ANGLE ($\theta$) | AZIMUTH ($\phi$) |
| 1.2.1.3 | 1.2.2.3 | 10 | 20 | 30 |
| 1.2.1.3 | 1.2.2.3 | 20 | 30 | 40 |
| 1.2.1.3 | 1.2.2.3 | ... | ... | ... |
| 1.2.2.3 | 1.2.1.3 | ... | ... | ... |
| 1.2.2.3 | 1.2.1.3 | ... | ... | ... |
| ... | ... | ... | ... | ... |

FIG. 23

| IP ADDRESS OF TERMINAL THAT TRANSMITS OMNIDIRECTIONAL IMAGE | IP ADDRESS OF DISPLAY CONTROL RIGHT SET TERMINAL |
|---|---|
| 1.2.1.3 | 1.2.1.1 |
| 1.2.2.3 | – |
| 1.2.3.3 | – |
| 1.2.4.3 | 1.2.4.4 |
| 1.2.5.3 | – |
| ... | ... |

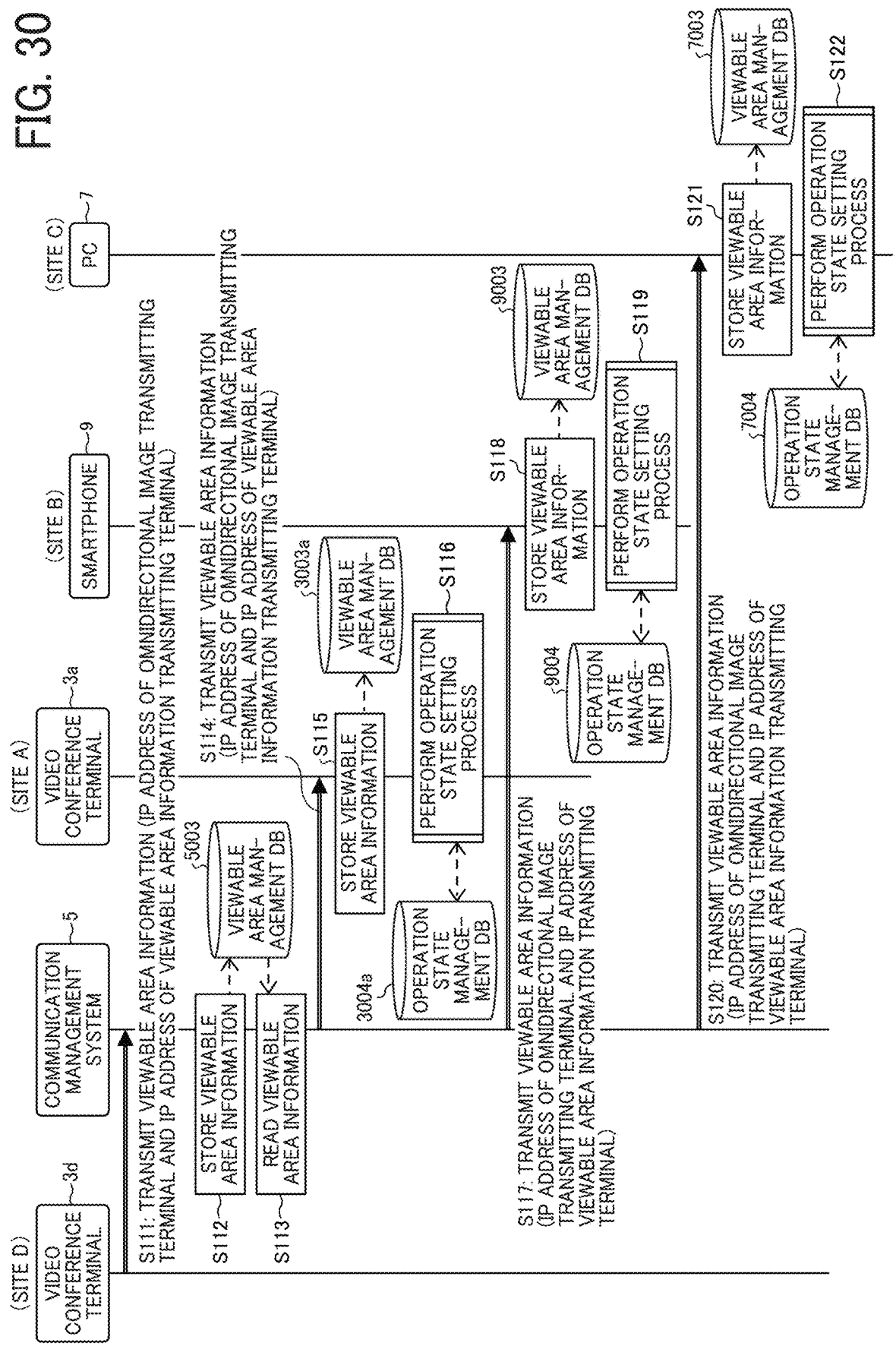

| IP ADDRESS OF TERMINAL THAT TRANSMITS VIEWABLE AREA INFORMATION | IP ADDRESS OF TERMINAL THAT RECEIVES VIEWABLE AREA INFORMATION |
|---|---|
| 1.3.1.1/32 | 1.2.1.1 |
| 1.0.0.0/8 | 1.2.1.2 |
| 2.2.2.2/32 | 1.2.1.2 |
| ... | ... |

COMMUNICATION TERMINAL, IMAGE COMMUNICATION SYSTEM, DISPLAY METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2019-137205 filed on Jul. 25, 2019 in the Japan Patent Office, the entire disclosure of which is hereby incorporated by reference herein.

BACKGROUND

Technical Field

The present invention relates to a communication terminal, an image communication system, a display method, and a non-transitory recording medium.

Description of the Related Art

There is a widely used system that enables a plurality of users at remote sites to view images of the remote sites via a communication network such as the Internet. For example, in such a system, a server or a communication terminal at one of the sites transmits the same image data to communication terminals at the other sites to enable users at the other sites to view the same image. Further, when a user of a given communication terminal or one of the communication terminals at the sites wants the other users to pay attention to a viewable area corresponding to a part of the image, the system may allow the user to perform remote display control to cause the other communication terminals to display a screen including the viewable area, to thereby facilitate communication between the sites.

When the viewable area of interest is different between the sites, however, such remote display control may be inconvenient. That is, the users at the sites are unable to freely view the viewable area of interest, resulting in a limited degree of freedom of display.

SUMMARY

In one embodiment of this invention, there is provided an improved communication terminal that includes, for example, circuitry that displays a first viewable area image on a display. The first viewable area image corresponds to a first viewable area of a whole image, and the whole image is shared by a plurality of communication terminals. The circuitry stores first display control terminal identification information in a memory. The first display control terminal identification information identifies a first communication terminal of the plurality of communication terminals that causes a second communication terminal of the plurality of communication terminals to display an image being displayed by the first communication terminal. The circuitry receives second display control terminal identification information and viewable area information from a third communication terminal of the plurality of communication terminals that displays a second viewable area image corresponding to a second viewable area of the whole image. The second display control terminal identification information identifies the third communication terminal, and the viewable area information represents the second viewable area. When the second display control terminal identification information is the same as the first display control terminal identification information, the circuitry determines whether an operation state of the first viewable area image at the time of receipt of the viewable area information is an operating state. When the operation state of the first viewable area image at the time of receipt of the viewable area information is the operating state, the circuitry displays the second viewable area image represented by the viewable area information on the display after the operation state of the first viewable area image shifts from the operating state to a standby state.

In one embodiment of this invention, there is provided an improved image communication system that includes, for example, a plurality of communication terminals and a communication management server. Each of the plurality of communication terminals is the above-described communication terminal. The communication management server controls communication between the plurality of communication terminals.

In one embodiment of this invention, there is provided an improved display method executed by a communication terminal. The display method includes, for example, displaying, on a display, a first viewable area image corresponding to a first viewable area of a whole image shared by a plurality of communication terminals, storing, in a memory, first display control terminal identification information identifying a first communication terminal of the plurality of communication terminals that causes a second communication terminal of the plurality of communication terminals to display an image being displayed by the first communication terminal, and receiving second display control terminal identification information and viewable area information from a third communication terminal of the plurality of communication terminals that displays a second viewable area image corresponding to a second viewable area of the whole image. The second display control terminal identification information identifies the third communication terminal, and the viewable area information represents the second viewable area. The display method further includes, when the second display control terminal identification information is the same as the first display control terminal identification information, determining whether an operation state of the first viewable area image at the time of receipt of the viewable area information is an operating state, and when the determining determines that the operation state of the first viewable area image at the time of receipt of the viewable area information is the operating state, displaying the second viewable area image represented by the viewable area information on the display after the operation state of the first viewable area image shifts from the operating state to a standby state.

In one embodiment of this invention, there is provided a non-transitory recording medium storing a plurality of instructions which, when executed by one or more processors, cause the processors to perform the above-described display method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 1A is a left side view of an image capturing device of a first embodiment of the present invention;

FIG. 1B is a rear view of the image capturing device:

FIG. 1C is a plan view of the image capturing device:

FIG. 4A is a conceptual diagram illustrating the equidistant cylindrical image covering a sphere;

FIG. 4B is a diagram illustrating an omnidirectional image obtained from the equidistant cylindrical image;

FIG. 5 is a diagram illustrating respective positions of a virtual camera and a viewable area of the omnidirectional image when the omnidirectional image is expressed as a three-dimensional solid sphere:

FIGS. 14A and 14B and FIGS. 15A and 15B are functional block diagrams each illustrating a part of the image communication system;

FIG. 16 is a conceptual diagram illustrating an image type management table stored in the video conference terminal;

FIG. 17 is a conceptual diagram illustrating an image capturing device management table stored in the video conference terminal;

FIG. 18 is a conceptual diagram illustrating a viewable area management table stored in the video conference terminal;

FIG. 19 is a conceptual diagram illustrating an operation state management table stored in the video conference terminal;

FIG. 20 is a conceptual diagram illustrating a session management table stored in the communication management system;

FIG. 21 is a conceptual diagram illustrating an image type management table stored in the communication management system:

FIG. 22 is a conceptual diagram illustrating a viewable area management table stored in the communication management system;

FIG. 23 is a conceptual diagram illustrating a display control right management table stored in the communication management system;

FIG. 27A illustrating a video call not using the image capturing device, and FIG. 27B illustrating a video call using the image capturing device:

FIG. 30 is a sequence diagram illustrating a viewable area information sharing process performed in the image communication system;

Figure 2:
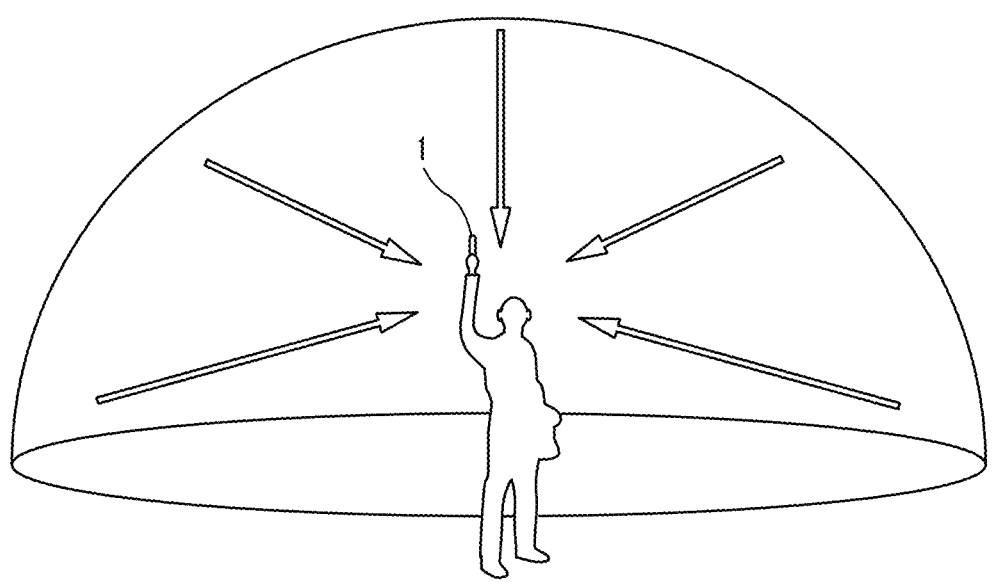
FIG. 2 is a conceptual diagram illustrating use of the image capturing device.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described below with the drawings.

A method of a first embodiment of the present invention to generate an omnidirectional panoramic image (hereinafter referred to as the omnidirectional image) will be described with FIGS. 1A, 1B, and 1C and FIGS. 2 to 7.

The exterior of an image capturing device 1 of the first embodiment will first be described with FIGS. 1A, 1B, and 1C.

The image capturing device 1 is a digital camera for capturing an image to generate a three-dimensional, 360-degree omnidirectional image based on the captured image. FIG. 1A is a left side view of the image capturing device 1. FIG. 1B is a rear view of the image capturing device 1. FIG. 1C is a plan view of the image capturing device 1.

As illustrated in FIG. 1A, the image capturing device 1 has a size suitable for being held by a human hand. As illustrated in FIGS. 1A, B, and 1C, an upper portion of the image capturing device 1 is equipped with imaging elements 103a and 103b, which are formed on one surface and the other surface, respectively, of the image capturing device 1. Each of the imaging elements 103a and 103b is implemented by an image sensor, and is used with an optical member (e.g., a fisheye lens 102a or 102b in FIG. 10) capable of capturing a hemispherical image with an angle of view of at least 180 degrees. As illustrated in FIG. 1B, the surface of the image capturing device 1 with the imaging element 103b is equipped with an operation device 115 including a shutter button.

With reference to FIG. 2, a description will be given of a situation in which the image capturing device 1 is used.

FIG. 2 is a conceptual diagram illustrating use of the image capturing device 1. As illustrated in FIG. 2, the image capturing device 1 is used as held by a hand of a user to capture the image of a subject around the user. In this case, the image of the subject around the user is captured by the imaging elements 103a and 103b illustrated in FIGS. 1A, 1B, and 1C to obtain two hemispherical images.

An overview of a process of generating the omnidirectional image from the images captured by the image capturing device 1 will be described with FIGS. 3A, 3B, and 3C and FIGS. 4A and 4B.

Figure 3A:
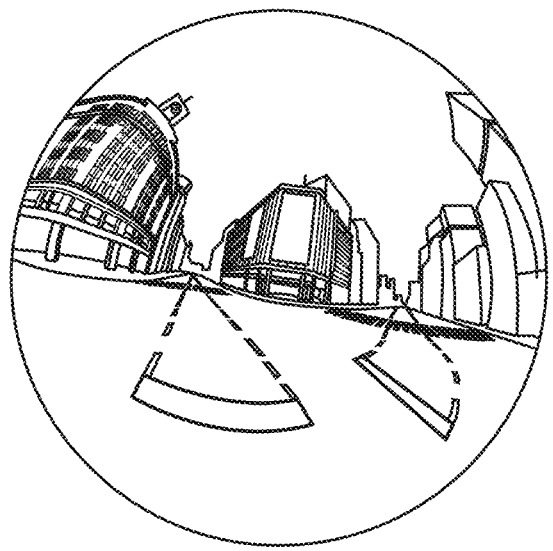
FIG. 3A is a diagram illustrating a front hemispherical image captured by the image capturing device.
Figure 3B:
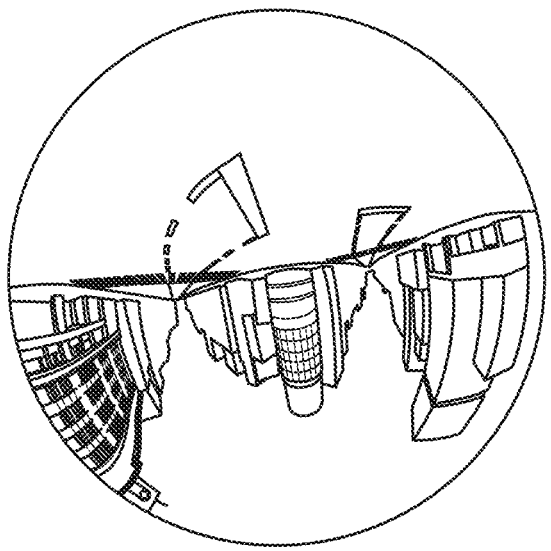
FIG. 3B is a diagram illustrating a rear hemispherical image captured by the image capturing device.
Figure 3C:
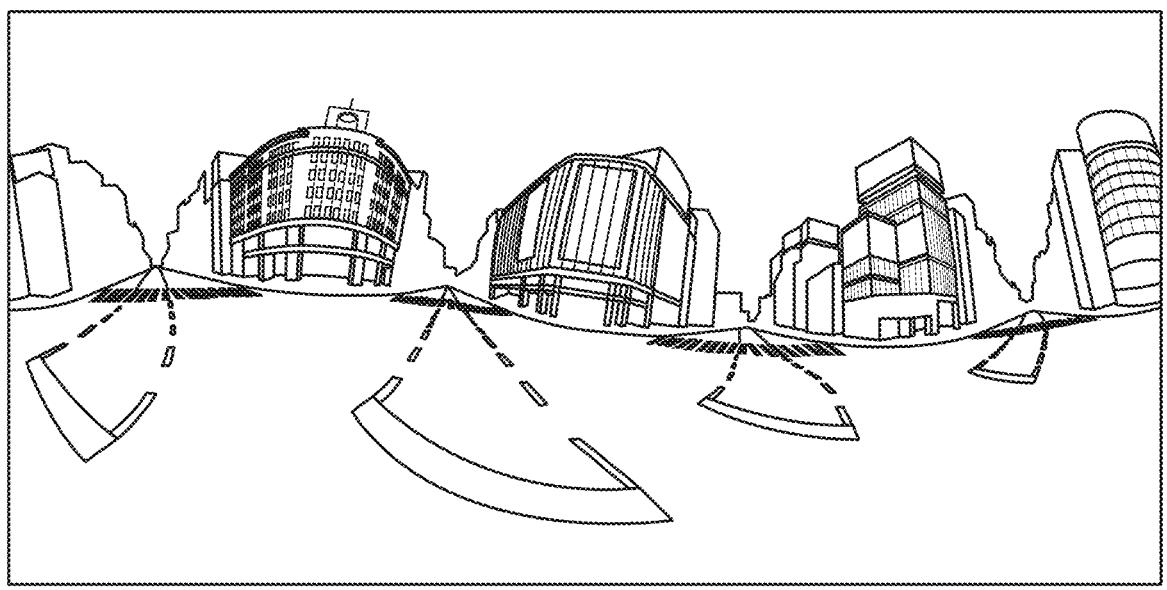
FIG. 3C is a diagram illustrating an equidistant cylindrical image generated from the hemispherical images by equidistant cylindrical projection.

FIG. 3A is a diagram illustrating a front hemispherical image captured by the image capturing device 1. FIG. 3B is a diagram illustrating a rear hemispherical image captured by the image capturing device 1. FIG. 3C is a diagram illustrating an image generated from the hemispherical images by equidistant cylindrical projection (hereinafter referred to as the equidistant cylindrical image). FIG. 4A is a conceptual diagram illustrating the equidistant cylindrical image covering a sphere. FIG. 4B is a diagram illustrating an omnidirectional image CE obtained from the equidistant cylindrical image.

As illustrated in FIG. 3A, the front hemispherical image captured by the imaging element 103a is distorted by the fisheye lens 102a. Further, as illustrated in FIG. 3B, the rear hemispherical image captured by the imaging element 103b is distorted by the fisheye lens 102b. The image capturing device 1 combines the front hemispherical image and the rear hemispherical image rotated therefrom by 180 degrees, to thereby generate an equidistant cylindrical image, as illustrated in FIG. 3C.

Then, with an application programming interface (API) such as open graphics library for embedded systems (OpenGL ES, registered trademark), the equidistant cylindrical image is placed to the surface of a sphere to cover the spherical surface, as illustrated in FIG. 4A. Thereby, the omnidirectional image CE as illustrated in FIG. 4B is generated. The omnidirectional image CE is thus expressed as the equidistant cylindrical image facing the center of the sphere. OpenGL ES is a graphics library used to visualize two-dimensional (2D) or three-dimensional (3D) data. The omnidirectional image CE may be a still or video image.

As described above, the omnidirectional image CE is an image placed on a sphere to cover the spherical surface, and thus is perceived as unnatural to human eyes. Therefore, a viewable area as a part of the omnidirectional image CE (hereinafter referred to as the viewable area image) is displayed as a planar image with less distortion to be perceived as less unnatural to human eyes.

Display of the viewable area image will be described with FIG. 5 and FIGS. 6A and 6B.

FIG. 5 is a diagram illustrating the respective positions of a virtual camera IC and a viewable area T when the omnidirectional image CE is expressed as a three-dimensional solid sphere CS. The position of the virtual camera IC corresponds to the position of the viewpoint of a user viewing the omnidirectional image CE expressed as the three-dimensional solid sphere CS. FIG. 6A is a perspective view of the omnidirectional image CE in FIG. 5 expressed as the solid sphere CS. FIG. 6B is a diagram illustrating a viewable area image Q displayed on a display. In FIG. 6A, the omnidirectional image CE in FIG. 4B is illustrated as the three-dimensional solid sphere CS. When the omnidirectional image CE generated as described above is expressed as the solid sphere CS, the virtual camera IC is located outside the omnidirectional image CE, as illustrated in FIG. 5. The viewable area T of the omnidirectional image CE corresponds to the imaging area of the virtual camera IC, and is identified by viewable area information. The viewable area information represents the imaging direction and the angle of view of the virtual camera IC in a three-dimensional virtual space including the omnidirectional image CE.

Figure 6A:
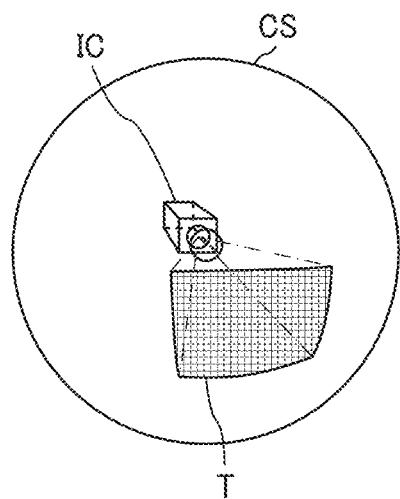
FIG. 6A is a perspective view of the omnidirectional image in FIG. 5 as the solid sphere.
Figure 6B:
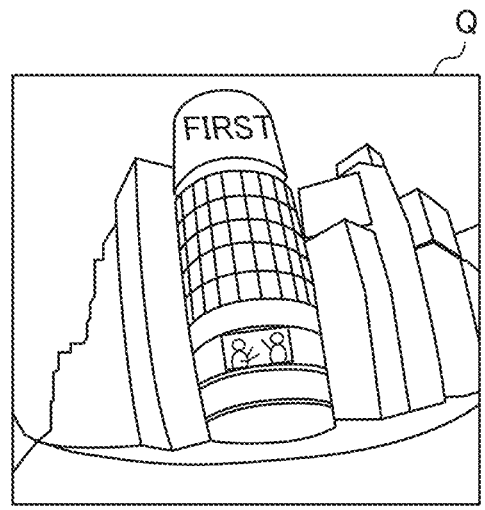
FIG. 6B is a diagram illustrating an image of the viewable area displayed on a display.

As illustrated in FIG. 6B, the viewable area T in FIG. 6A is displayed on a particular display as the image of the imaging area of the virtual camera IC, i.e., the viewable area image Q represented by initially set (i.e., default) viewable area information. The viewable area information may be expressed not as the position coordinates of the virtual camera IC but as coordinates (X, Y, Z) of the imaging area of the virtual camera IC corresponding to the viewable area T. The following description will be given with an imaging direction (rH, rV) and an angle of view ($\alpha$) of the virtual camera IC.

The relationship between the viewable area information and the image of the viewable area T will be described with FIG. 7.

Figure 7:
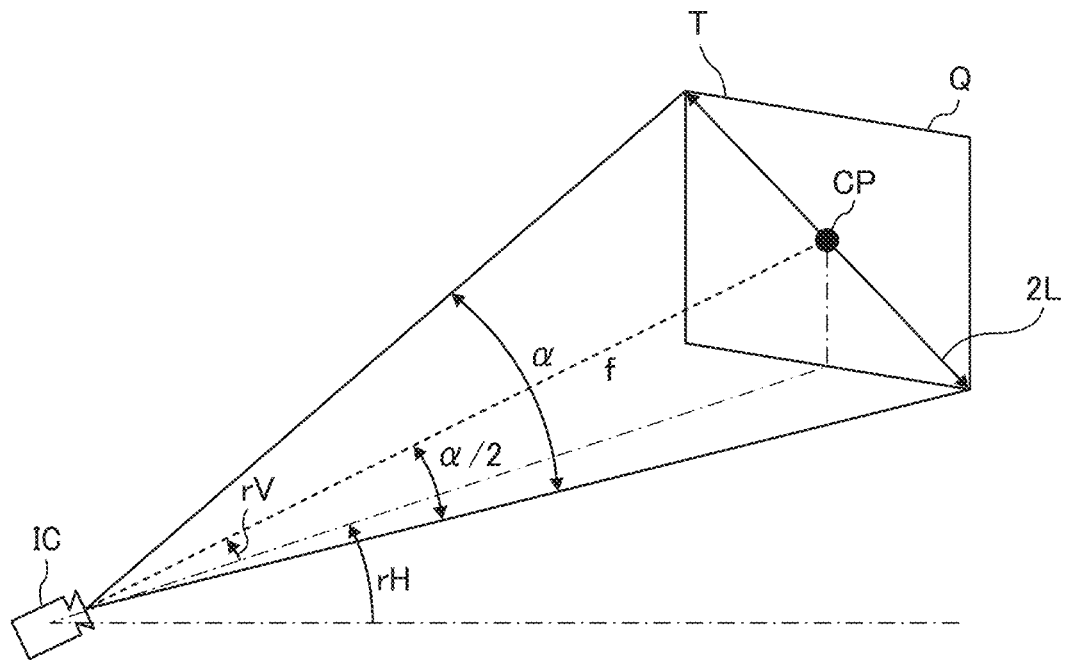
FIG. 7 is a diagram illustrating the relationship between viewable area information and the image of the viewable area.

FIG. 7 is a diagram illustrating the relationship between the viewable area information and the image of the viewable area T. As illustrated in FIG. 7, rH represents the horizontal radian, and rV represents the vertical radian. Further, a represents the angle of view. That is, the attitude of the virtual camera IC is changed such that the point of interest of the virtual camera IC represented by the imaging direction (rH, rV) corresponds to a center point CP of the viewable area T as the imaging area of the virtual camera IC. The viewable area image Q is the image of the viewable area T of the omnidirectional image CE in FIG. 5. Further, f represents the distance from the virtual camera IC to the center point CP, and L represents the distance between a given vertex of the viewable area T and the center point CP. Thus, 2L represents the length of a diagonal of the viewable area T. Further, in FIG. 7, a trigonometric function typically expressed as $L/f=\tan(\alpha/2)$ holds.

Figure 8:
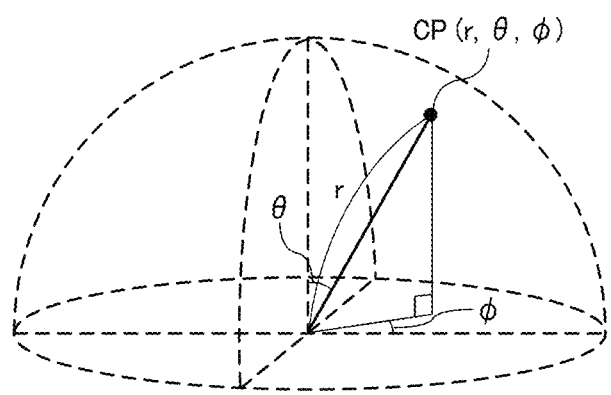
FIG. 8 is a diagram illustrating a point in a three-dimensional Euclidean space represented by spherical coordinates.

FIG. 8 is a diagram illustrating a point in a three-dimensional Euclidean space represented by spherical coordinates. The position coordinates of the center point CP are expressed as (r, $\theta$, $\varphi$) in a spherical polar coordinate system. Herein, r, $\theta$, and $\varphi$ represent the radius vector, the polar angle, and the azimuth, respectively. The radius vector r corresponds to the distance from the center point CP to the origin of the three-dimensional virtual space including the omnidirectional image CE, and thus is equal to the distance f. FIG. 8 illustrates the relationships between these elements. In the following description, the center point CP will be described with the position coordinates (r, $\theta$, $\varphi$) of the virtual camera IC.

A schematic configuration of an image communication system 10 of the first embodiment will be described with FIG. 9.

Figure 9:
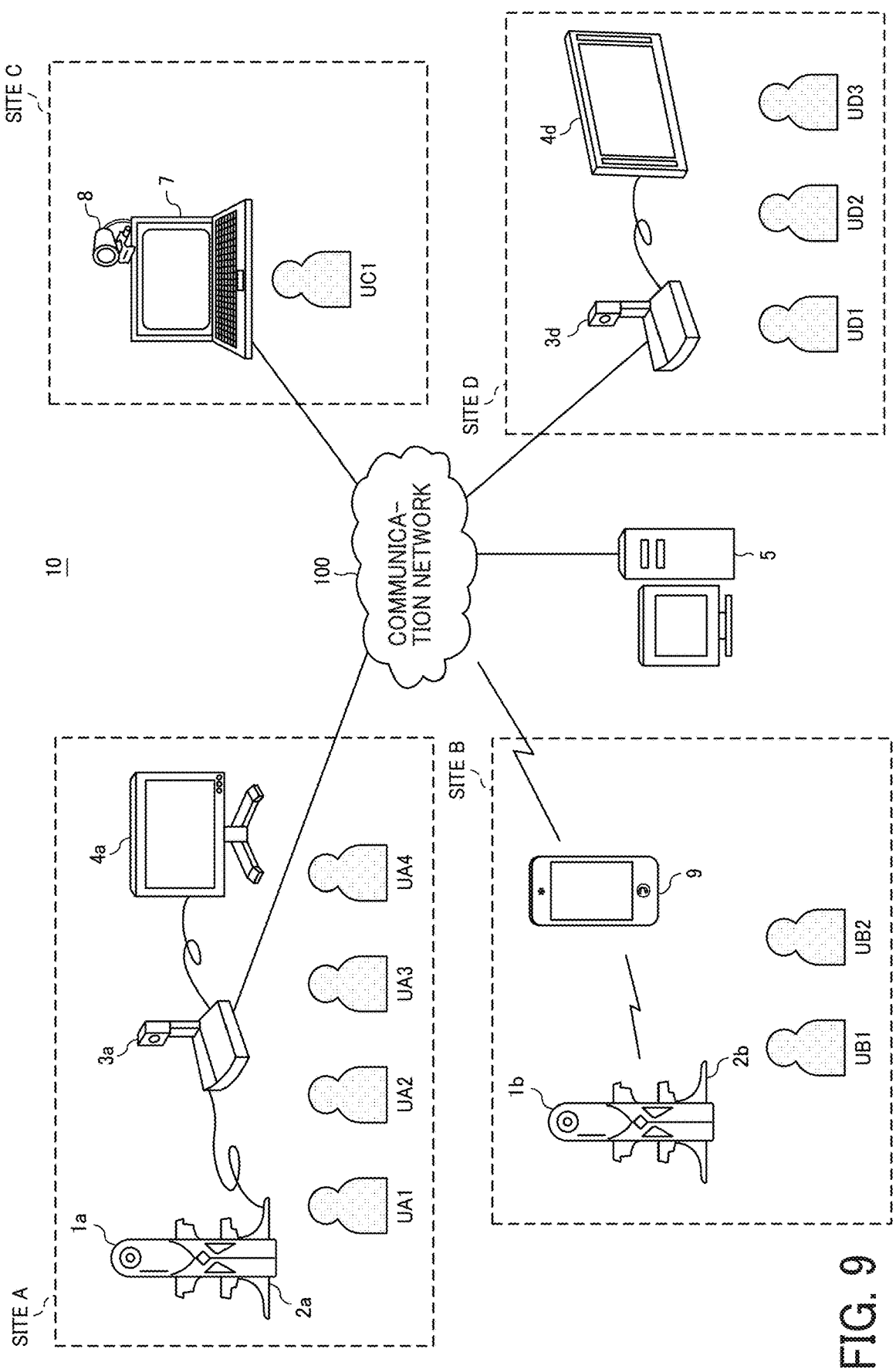
FIG. 9 is a schematic diagram illustrating a configuration of an image communication system of the first embodiment.

FIG. 9 is a schematic diagram illustrating a configuration of the image communication system 10 of the first embodiment. As illustrated in FIG. 9, the image communication system 10 of the first embodiment includes image capturing devices 1a and 1b, video conference terminals 3a and 3d, displays 4a and 4d, a communication management system 5, a personal computer (PC) 7, an image capturing device 8, and a smartphone 9, which are capable of communicating with each other via a communication network 100 such as the Internet. In the communication network 100, the above-described components may be connected by wire or wirelessly.

As described above, each of the image capturing devices 1a and 1b is a special digital camera for capturing the image of a subject (e.g., an object or surroundings) and obtaining two hemispherical images, based on which the omnidirectional image is generated. The image capturing device 8, on the other hand, is a commonly used digital camera for capturing the image of a subject (e.g., an object or surroundings) and obtaining a typical planar image.

The video conference terminals 3a and 3d are terminals dedicated to video conference. The video conference terminals 3a and 3d display the image of a video call (i.e., video communication) on the displays 4a and 4d, respectively, via a wired cable such as a universal serial bus (USB) cable. The video conference terminal 3a normally captures the image with a camera 312 in FIG. 11. However, if the video conference terminal 3a is connected, via a wired cable, to a cradle 2a to which the image capturing device 1a is attached, the image capturing device 1a is given priority over the camera 312 to obtain two hemispherical images, based on which the omnidirectional image is generated. With the wired cable, the cradle 2a not only enables communication between the image capturing device 1a and the video conference terminal 3a but also supports the image capturing device 1a and supplies power thereto. In the present example, the image capturing device 1a, the cradle 2a, the video conference terminal 3a, and the display 4a are located at one site, specifically a site A. At the site A, four users UA1, UA2, UA3, and UA4 are participating in the video call. The video conference terminal 3d and the display 4d are located at one site, specifically a site D. At the site D, three users UD1, UD2, and UD3 are participating in the video call.

The communication management system 5 (an example of a communication management server) manages and controls communication between the video conference terminals 3a and 3d, the PC 7, and the smartphone 9, and manages the types of image data transmitted and received therebetween (e.g., general image and special image). Therefore, the communication management system 5 also functions as a communication control system.

Herein, the special image corresponds to the omnidirectional image. The communication management system 5 is installed in, for example, a service provider company that provides a video communication service. The communication management system 5 may be implemented by a single computer, or may be implemented by a plurality of computers to which units (e.g., functions, devices, and memories) of the communication management system 5 are divided and allocated.

The image capturing device 8 is attached to the PC 7 to enable the video conference. In the present example, the PC 7 and the image capturing device 8 are located at one site, specifically a site C. At the site C, one user UC1 is participating in the video call.

The smartphone 9 displays, on a display 917 (see FIG. 13) thereof, the image of the video call. The smartphone 9 normally captures the image with a complementary metal oxide semiconductor (CMOS) sensor 905 (see FIG. 13) thereof, for example. The smartphone 9 is also capable of acquiring the data of two hemispherical images, based on which the omnidirectional image is generated, from the image capturing device 1b with a wireless communication technology conforming to a standard such as the wireless fidelity (Wi-Fi, registered trademark) or Bluetooth (registered trademark) standard. When the wireless communication technology is used, a cradle 2b simply supports the image capturing device 1b and supplies power thereto. In the present example, the image capturing device 1b, the cradle 2b, and the smartphone 9 are located atone site, specifically a site B. At the site B, two users UB1 and UB2 are participating in the video call.

The video conference terminals 3a and 3d, the PC 7, and the smartphone 9 are examples of a communication terminal. The communication terminal is installed with OpenGL ES to generate the viewable area information representing the viewable area as a part of the omnidirectional image and generate the viewable area image from the omnidirectional image transmitted from another communication terminal.

The apparatuses, terminals (e.g., the communication terminals, displays, and image capturing devices) and user arrangements illustrated in FIG. 9 are illustrative, and other examples are possible. For example, the image capturing device 8 at the site C may be replaced by an image capturing device capable of capturing the omnidirectional image. Further, examples of the communication terminal also include a digital television, a smartwatch, and a car navigation system, for example.

In the following description, a given one of the image capturing devices 1a and 1b will be described as the image capturing device 1. Similarly, a given one of the video conference terminals 3a and 3d will be described as the video conference terminal 3. Further, a given one of the displays 4a and 4d will be described as the display 4.

Respective hardware configurations of the image capturing device 1, the video conference terminal 3, the communication management system 5, the PC 7, and the smartphone 9 of the first embodiment will be described in detail with FIGS. 10 to 13. The image capturing device 8 is a commonly used camera, and thus detailed description thereof will be omitted.

A hardware configuration of the image capturing device 1 will be described with FIG. 10.

Figure 10:
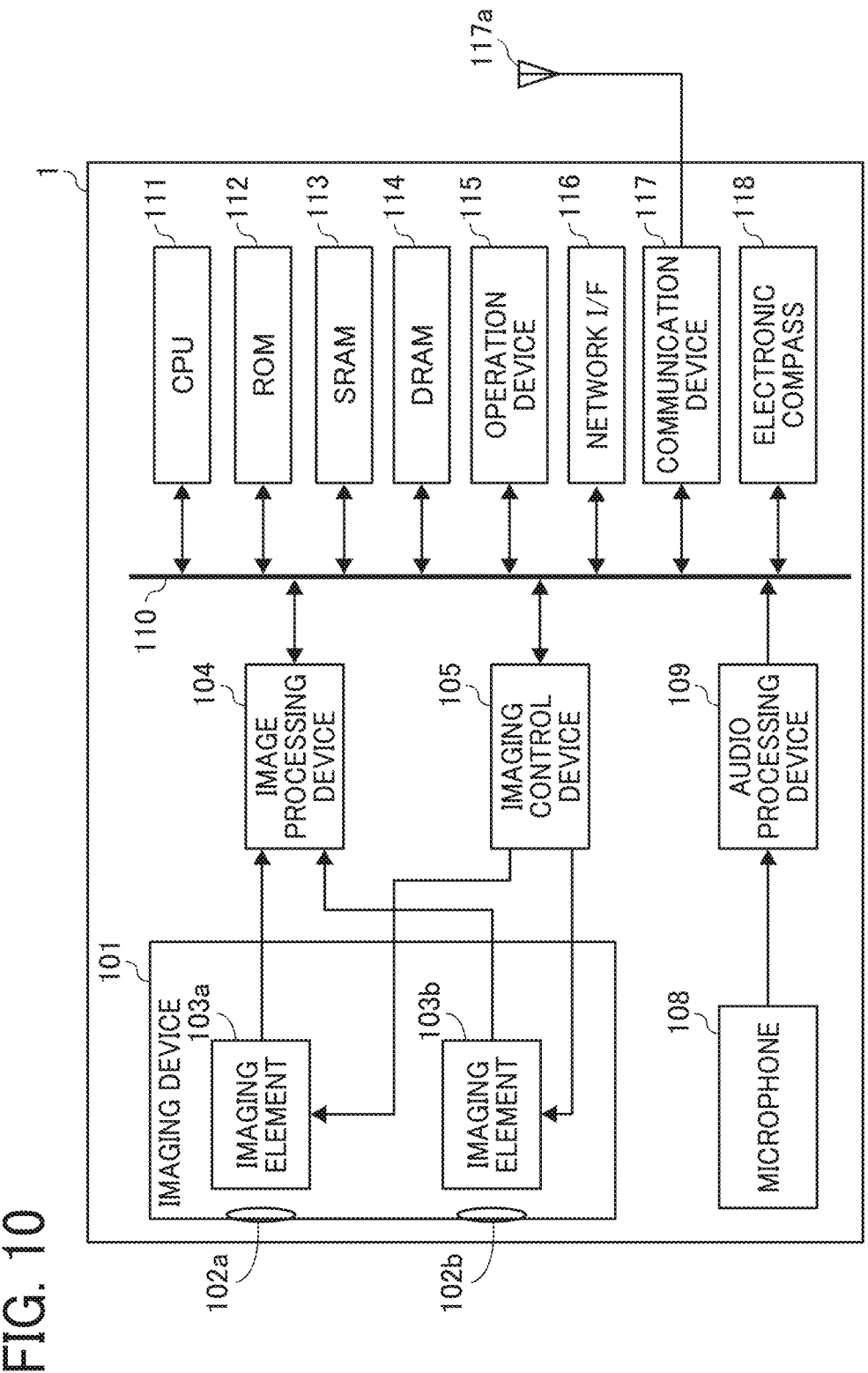
FIG. 10 is a diagram illustrating a hardware configuration of the image capturing device included in the image communication system.

FIG. 10 is a diagram illustrating a hardware configuration of the image capturing device 1. The image capturing device 1 described below is an omnidirectional (i.e., all-directional) image capturing device with two imaging elements. However, the number of imaging elements may be three or more.

Further, the image capturing device 1 is not necessarily required to be a device dedicated to the purpose of capturing the all-directional image. Therefore, an all-directional image capturing device may be additionally attached to a typical digital camera or smartphone, for example, to provide substantially the same functions as those of the image capturing device 1.

As illustrated in FIG. 10, the image capturing device 1 includes an imaging device 101, an image processing device 104, an imaging control device 105, a microphone 108, an audio processing device 109, a central processing unit (CPU) 111, a read only memory (ROM) 112, a static random access memory (SRAM) 113, a dynamic RAM (DRAM) 114, an operation device 115, a network interface (I/F) 116, a communication device 117, an antenna 117a, and an electronic compass 118.

The imaging device 101 includes two fisheye lenses 102a and 102b and two imaging elements 103a and 103b corresponding thereto. The fisheye lenses 102a and 102b are wide-angle lenses each having an angle of view of at least 180 degrees for forming a hemispherical image. Each of the imaging elements 103a and 103b includes an image sensor, a timing generating circuit, and a group of registers, for example. For example, the image sensor may be a CMOS or charge coupled device (CCD) sensor that converts an optical image formed by the fisheye lens 102a or 102b into image data of electrical signals and outputs the image data. The timing generating circuit generates a horizontal or vertical synchronization signal or a pixel clock signal for the image sensor. Various commands and parameters for the operation of the imaging element 103a or 103b are set in the group of registers.

Each of the imaging elements 103a and 103b of the imaging device 101 is connected to the image processing device 104 via a parallel I/F bus, and is connected to the imaging control device 105 via a serial I/F bus (e.g., an inter-integrated circuit ($I^2C$) bus). The image processing device 104 and the imaging control device 105 are connected to the CPU 111 via a bus 110. The bus 110 is further connected to the ROM 112, the SRAM 113, the DRAM 114, the operation device 115, the network I/F 116, the communication device 117, and the electronic compass 118, for example.

The image processing device 104 receives image data items from the imaging elements 103a and 103b via the parallel I/F bus, performs a predetermined process on the image data items, and combines the processed image data items to generate the data of the equidistant cylindrical image as illustrated in FIG. 3C.

The imaging control device 105 sets commands in the groups of registers of the imaging elements 103a and 103b via the serial I/F bus such as the $I^2C$ bus, with the imaging control device 105 and the imaging elements 103a and 103b acting as a master device and slave devices, respectively. The imaging control device 105 receives the commands from the CPU 111. The imaging control device 105 further receives data such as status data from the groups of registers of the imaging elements 103a and 103b via the serial I/F bus such as the $I^2C$ bus, and transmits the received data to the CPU 111.

The imaging control device 105 further instructs the imaging elements 103a and 103b to output the image data when the shutter button of the operation device 115 is pressed down. The image capturing device 1 may have a preview display function or a video display function using a display (e.g., the display 4a connected to the video conference terminal 3a). In this case, the imaging elements 103a and 103*b* continuously output the image data at a predetermined frame rate. The frame rate is defined as the number of frames per minute.

The imaging control device 105 also functions as a synchronization controller that cooperates with the CPU 111 to synchronize the image data output time between the imaging elements 103*a* and 103*b*. In the present embodiment, the image capturing device 1 is not equipped with a display. The image capturing device 1, however, may be equipped with a display.

The microphone 108 converts sound into audio (signal) data. The audio processing device 109 receives the audio data from the microphone 108 via an I/F bus, and performs a predetermined process on the audio data.

The CPU 111 controls an overall operation of the image capturing device 1, and executes various processes. The ROM 112 stores various programs for the CPU 111. The SRAM 113 and the DRAM 114 are used as work memories to store programs executed by the CPU 111 and data being processed. The DRAM 114 particularly stores image data being processed by the image processing device 104 and processed data of the equidistant cylindrical image.

The operation device 115 collectively refers to components such as various operation buttons including the shutter button, a power switch, and a touch panel that has a display function and an operation function. The user operates the operation buttons to input various imaging modes and imaging conditions, for example.

The network I/F 116 collectively refers to interface circuits (e.g., a USB I/F circuit) to connect to external devices or apparatuses such as an external medium (e.g., a secure digital (SD) card) and a PC. The network I/F 116 may be a wireless or wired interface. Via the network I/F 116, the data of the equidistant cylindrical image stored in the DRAM 114 may be recorded on an external medium, or may be transmitted as necessary to an external apparatus such as the video conference terminal 3*a*, for example.

The communication device 117 communicates with an external apparatus such as the video conference terminal 3*a* via the antenna 117*a* of the image capturing device 1 in accordance with a near field wireless communication technology conforming to the Wi-Fi or near field communication (NFC) standard, for example. The data of the equidistant cylindrical image may also be transmitted to an external apparatus such as the video conference terminal 3*a* via the communication device 117.

The electronic compass 118 outputs orientation and tilt information by calculating the orientation and tilt (i.e., the roll rotation angle) of the image capturing device 1 from the geomagnetism. The orientation and tilt information is an example of related information (i.e., metadata) conforming to the exchangeable image file format (Exif) standard. The orientation and tilt information is used in image processing such as image correction of the captured image. The related information includes data such as the date and time of capturing the image and the data capacity of the image data.

A hardware configuration of the video conference terminal 3 will be described with FIG. 11.

Figure 11:
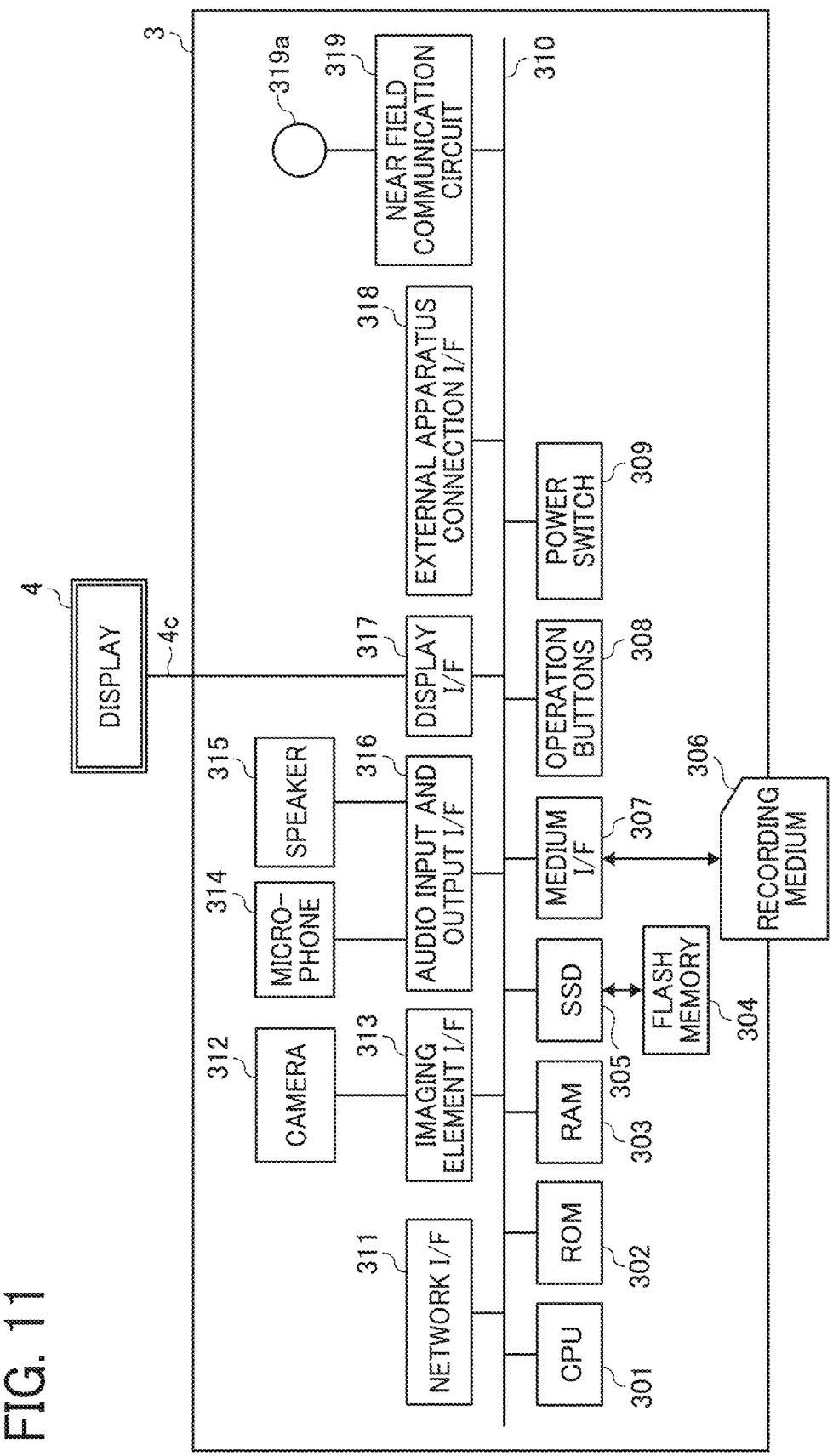
FIG. 11 is a diagram illustrating a hardware configuration of a video conference terminal included in the image communication system.

FIG. 11 is a diagram illustrating a hardware configuration of the video conference terminal 3. As illustrated in FIG. 11, the video conference terminal 3 includes a CPU 301, a ROM 302, a RAM 303, a flash memory 304, a solid state drive (SSD) 305, a medium I/F 307. operation buttons 308, a power switch 309, a bus line 310, a network I/F 311, a camera 312, an imaging element I/F 313, a microphone 314, a speaker 315, an audio input and output I/F 316, a display I/F 317, an external apparatus connection I/F 318, a near field communication circuit 319, and an antenna 319*a* for the near field communication circuit 319.

The CPU 301 controls an overall operation of the video conference terminal 3. The ROM 302 stores a program used to drive the CPU 301 such as an initial program loader (IPL). The RAM 303 is used as a work area for the CPU 301. The flash memory 304 stores a communication program, image data, audio data, and various other data. The SSD 305 controls writing and reading of various data to and from the flash memory 304 under the control of the CPU 301. The SSD 305 may be replaced by a hard disk drive (HDD). The medium I/F 307 controls writing (i.e., storage) and reading of data to and from a recording medium 306 such as a flash memory. The operation buttons 308 are operated in the selection of an address by the video conference terminal 3, for example. The power switch 309 is used to switch between ON and OFF of power supply to the video conference terminal 3.

The network I/F 311 is an interface for data communication via the communication network 100 such as the Internet. The camera 312 is a built-in image capturing device that captures the image of a subject under the control of the CPU 301 to obtain image data. The imaging element I/F 313 is a circuit that controls driving of the camera 312. The microphone 314 is a built-in sound collecting device for inputting sounds. The audio input and output I/F 316 is a circuit that processes input of audio signals from the microphone 314 and output of audio signals to the speaker 315 under the control of the CPU 301. The display I/F 317 is a circuit that transmits the image data to the external display 4 under the control of the CPU 301. The external apparatus connection I/F 318 is an interface for connecting the video conference terminal 3 to various external apparatuses. The near field communication circuit 319 is a communication circuit conforming to the NFC or Bluetooth standard, for example.

The bus line 310 includes an address bus and a data bus for electrically connecting the CPU 301 and the other components illustrated in FIG. 11.

The display 4 is implemented as a liquid crystal or organic electroluminescence (EL) display, for example, that displays the image of the subject and icons for performing various operations. The display 4 is connected to the display I/F 317 via a cable 4*c*. The cable 4*c* may be a cable for analog red-green-blue (RGB) video graphics array (VGA) signals, a cable for component video, or a cable for high-definition multimedia interface (HDMI, registered trademark) or digital video interactive (DVI) signals.

The camera 312 includes lenses and a solid-state image sensing device that converts light into electric charge to digitize the still or video image of the subject. The solid-state image sensing device is a CMOS or CCD sensor, for example. The external apparatus connection I/F 318 is connectable to an external apparatus such as an external camera, an external microphone, or an external speaker via a USB cable, for example. If an external camera is connected to the external apparatus connection I/F 318, the external camera is driven in preference to the built-in camera 312 under the control of the CPU 301. Similarly, if an external microphone or speaker is connected to the external apparatus connection I/F 318, the external microphone or speaker is driven in preference to the built-in microphone 314 or speaker 315 under the control of the CPU 301.

The recording medium 306 is removable from the video conference terminal 3. Further, the flash memory 304 may be replaced by any nonvolatile memory for reading and writing data under the control of the CPU 301, such as an electrically erasable and programmable ROM (EEPROM).

A hardware configuration of each of the communication management system 5 and the PC 7 will be described with FIG. 12.

Figure 12:
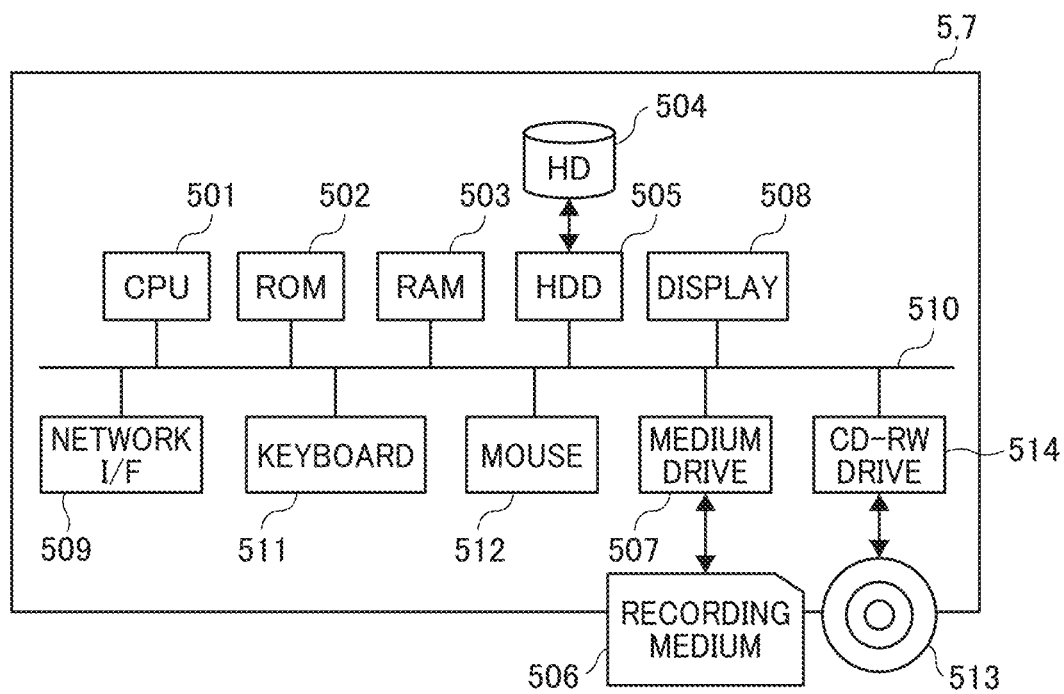
FIG. 12 is a diagram illustrating a hardware configuration of each of a communication management system and a personal computer included in the image communication system.

FIG. 12 is a diagram illustrating a hardware configuration of each of the communication management system 5 and the PC 7. The communication management system 5 and the PC 7 are computers having the same configuration. The following description will therefore be limited to the configuration of the communication management system 5, and description of the configuration of the PC 7 will be omitted.

The communication management system 5 includes a CPU 501, a ROM 502, a RAM 503, a hard disk (HD) 504, an HDD 505, a medium drive 507, a display 508, a network I/F 509, a keyboard 511, a mouse 512, a compact disc-rewritable (CD-RW) drive 514, and a bus line 510.

The CPU 501 controls an overall operation of the communication management system 5. The ROM 502 stores a program used to drive the CPU 501 such as an IPL. The RAM 503 is used as a work area for the CPU 501. The HD 504 stores various data of a program for the communication management system 5, for example. The HDD 505 controls writing and reading of various data to and from the HD 504 under the control of the CPU 501. The medium drive 507 controls writing (i.e., storage) and reading of data to and from a recording medium 506 such as a flash memory. The display 508 displays various information such as a cursor, menus, windows, text, and images. The network I/F 509 is an interface for data communication via the communication network 100. The keyboard 511 includes a plurality of keys for inputting text, numerical values, and various instructions, for example. The mouse 512 is used to select and execute various instructions, select a processing target, and move the cursor, for example. The CD-RW drive 514 controls reading of various data from a CD-RW 513 as an example of a removable recording medium. The bus line 510 includes an address bus and a data bus for electrically connecting the above-described components of the communication management system 5, as illustrated in FIG. 12.

A hardware configuration of the smartphone 9 will be described with FIG. 13.

Figure 13:
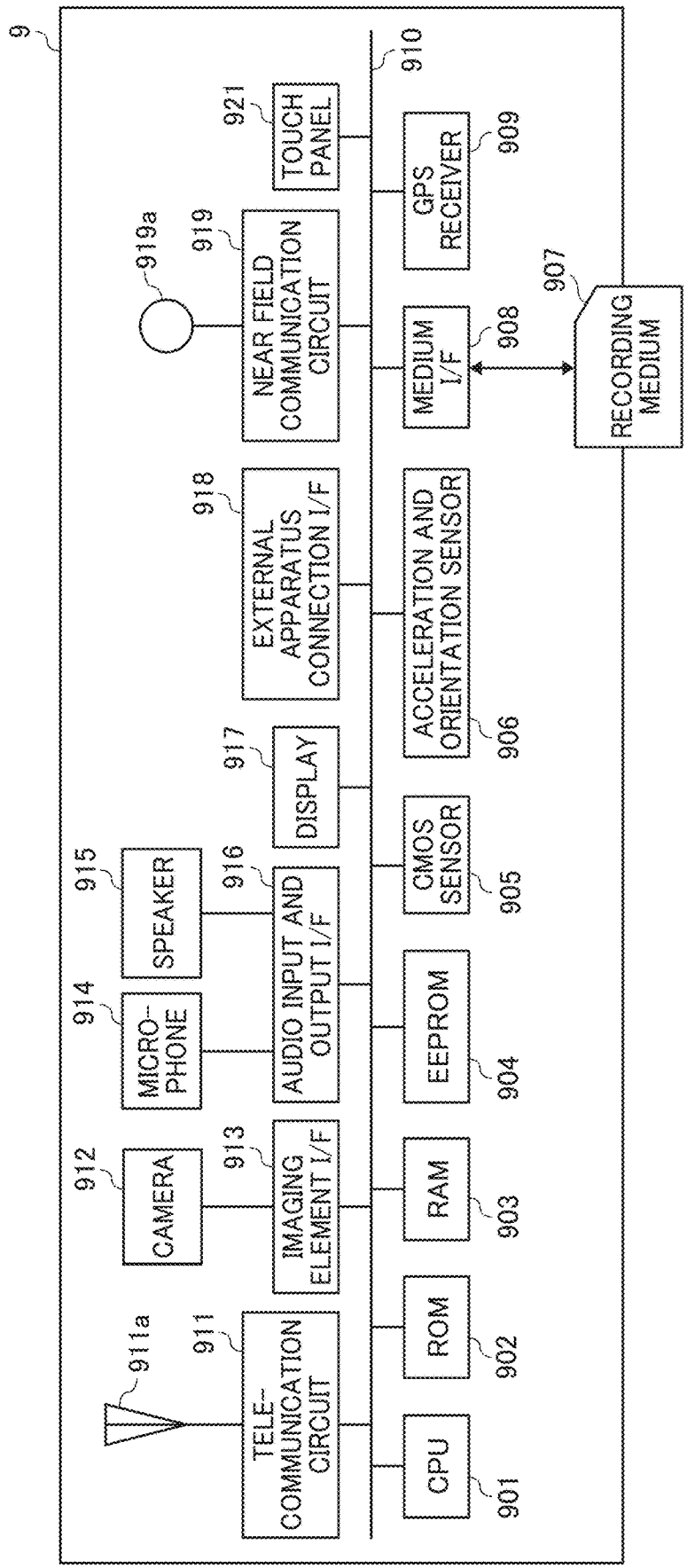
FIG. 13 is a diagram illustrating a hardware configuration of a smartphone included in the image communication system.

FIG. 13 is a diagram illustrating a hardware configuration of the smartphone 9. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls an overall operation of the smartphone 9. The ROM 902 stores a program used to drive the CPU 901 such as an IPL. The RAM 903 is used as a work area for the CPU 901. The EEPROM 904 performs reading and writing of various data of a program for the smartphone 9, for example, under the control of the CPU 901. The CMOS sensor 905 captures the image of a subject (normally the image of a user) under the control of the CPU 901 to obtain image data. The acceleration and orientation sensor 906 includes various sensors such as an electromagnetic compass that detects geomagnetism, a gyrocompass, and an acceleration sensor. The medium I/F 908 controls writing (i.e., storage) and reading of data to and from a recording medium 907 such as a flash memory. The GPS receiver 909 receives a GPS signal from a GPS satellite.

The smartphone 9 further includes a telecommunication circuit 911, a camera 912, an imaging element I/F 913, a microphone 914, a speaker 915, an audio input and output I/F 916, a display 917, an external apparatus connection I/F 918, a near field communication circuit 919, an antenna 919a for the near field communication circuit 919, a touch panel 921, and a bus line 910.

The telecommunication circuit 911 is a circuit that communicates with another apparatus via the communication network 100. The camera 912 is a built-in image capturing device that captures the image of a subject under the control of the CPU 901 to obtain image data. The imaging element I/F 913 is a circuit that controls driving of the camera 912. The microphone 914 is a built-in sound collecting device for inputting sounds. The audio input and output I/F 916 is a circuit that that processes input of audio signals from the microphone 914 and output of audio signals to the speaker 915 under the control of the CPU 901. The display 917 is implemented as a liquid crystal or organic EL display, for example, that displays the image of the subject and various icons. The external apparatus connection I/F 918 is an interface for connecting the smartphone 9 to various external apparatuses. The near field communication circuit 919 is a communication circuit conforming to the NFC or Bluetooth standard, for example. The touch panel 921 is an input device for the user to operate the smartphone 9 by pressing the display 917. The bus line 910 includes an address bus and a data bus for electrically connecting the CPU 901 and the other components described above.

A recording medium (e.g., a CD-ROM) or an HD storing at least one of the above-described programs may be shipped to the market as a program product.

A functional configuration of the image communication system 10 of the first embodiment will be described with FIGS. 14 to 23.

FIGS. 14 and 15 are functional block diagrams each illustrating a part of the image communication system 10 of the first embodiment.

A functional configuration of the image capturing device 1a will first be described.

As illustrated in FIG. 14A, the image capturing device 1a includes a receiving unit 12a, an imaging unit 13a, a sound collecting unit 14a, a communication unit 18a, and a storing and reading unit 19a. Each of these units is a function or unit implemented when at least one of the components illustrated in FIG. 10 operates in response to a command from the CPU 111 in accordance with a program for the image capturing device 1 deployed on the DRAM 114 from the SRAM 113.

The image capturing device 1a further includes a storage unit 1000a implemented by the ROM 112, the SRAM 113, and the DRAM 114 illustrated in FIG. 10. The storage unit 1000a stores globally unique identifiers (GUIDs) of the image capturing device 1a.

The image capturing device 1b includes a receiving unit 12b, an imaging unit 13b, a sound collecting unit 14b, a communication unit 18b, a storing and reading unit 19b, and a storage unit 1000b. These units implement similar functions to those of the receiving unit 12a, the imaging unit 13a, the sound collecting unit 14a, the communication unit 18a, the storing and reading unit 19a, and the storage unit 1000a of the image capturing device 1a, and thus description thereof will be omitted.

Respective configurations of the functional units of the image capturing device 1a will be described in detail with FIGS. 10 and 14.

In the image capturing device 1a, the receiving unit 12a is mainly implemented by the operation device 115 and the processing of the CPU 111 illustrated in FIG. 10. The receiving unit 12a receives an operation input by the user.

The imaging unit 13a is mainly implemented by the imaging device 101, the image processing device 104, the imaging control device 105, and the processing of the CPU 111 illustrated in FIG. 10. The imaging unit 13a captures the image of surroundings of the image capturing device 1a, for example, to obtain captured image data.

The sound collecting unit 14a is implemented by the microphone 108, the audio processing device 109, and the processing of the CPU 111 illustrated in FIG. 10. The sound collecting unit 14a collects sounds around the image capturing device 1a.

The communication unit 18a is mainly implemented by the processing of the CPU 111 illustrated in FIG. 10. The communication unit 18a communicates with a later-described communication unit 38a of the video conference terminal 3a in accordance with a near field wireless communication technology conforming to the NFC, Bluetooth, or Wi-Fi standard, for example.

The storing and reading unit 19a is mainly implemented by the processing of the CPU 111 illustrated in FIG. 10. The storing and reading unit 19a stores various data and information in the storage unit 1000a, and reads therefrom various data and information.

A functional configuration of the video conference terminal 3a will be described.

Figure 14B:
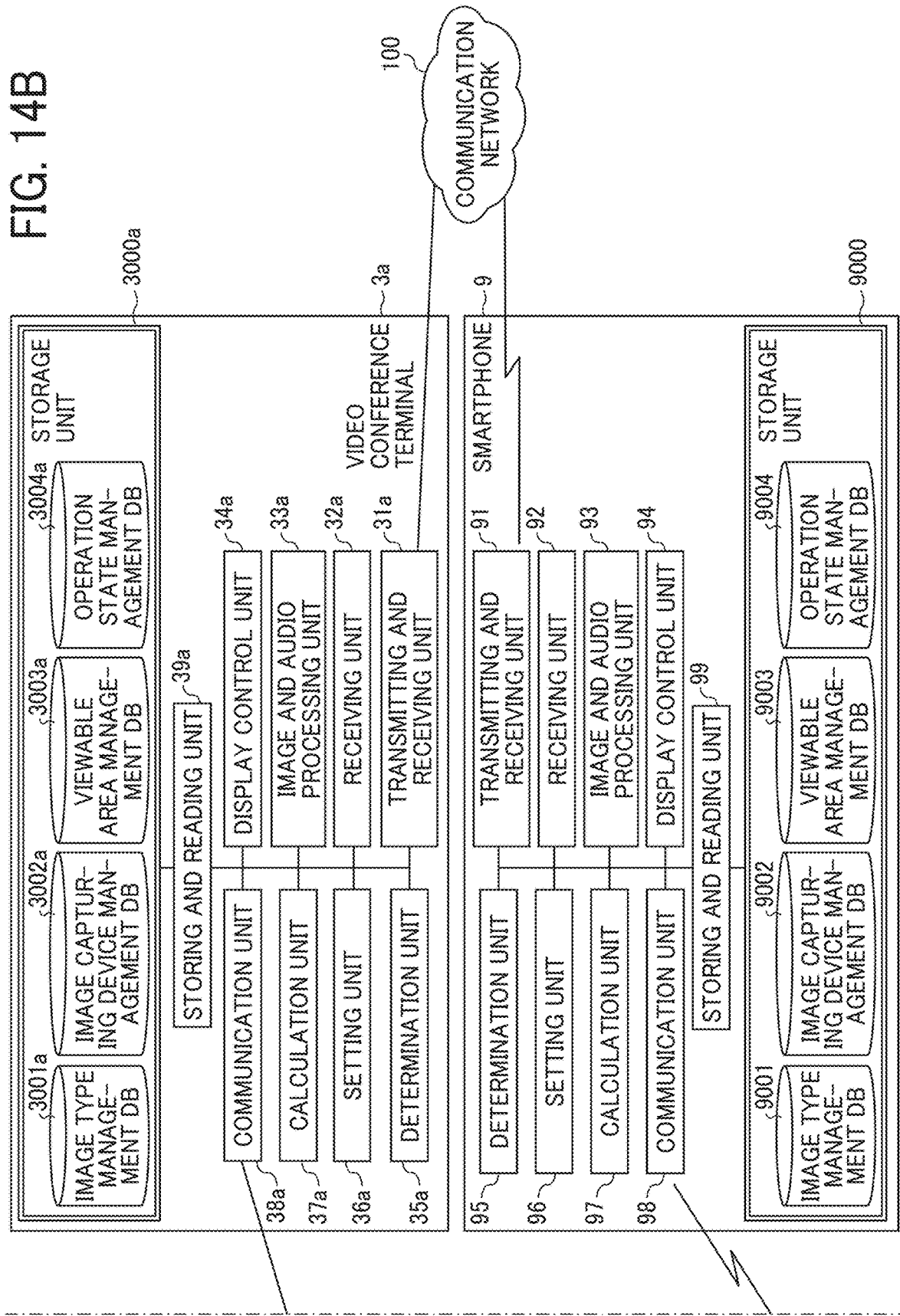

As illustrated in FIG. 14B, the video conference terminal 3a includes a transmitting and receiving unit 31a, a receiving unit 32a, an image and audio processing unit 33a, a display control unit 34a, a determination unit 35a, a setting unit 36a, a calculation unit 37a, a communication unit 38a, and a storing and reading unit 39a. Each of these units is a function or unit implemented when at least one of the components illustrated in FIG. 11 operates in response to a command from the CPU 301 in accordance with the program for the video conference terminal 3a deployed on the RAM 303 from the flash memory 304.

The video conference terminal 3a further includes a storage unit 3000a implemented by the ROM 302, the RAM 303, and the flash memory 304 illustrated in FIG. 1. The storage unit 3000a stores an image type management database (DB) 3001a, an image capturing device management DB 3002a, a viewable area management DB 3003a, and an operation state management DB 3004a.

The image type management DB 3001a is configured as an image type management table illustrated in FIG. 16. The image capturing device management DB 3002a is configured as an image capturing device management table illustrated in FIG. 17. The viewable area management DB 3003a is configured as a viewable area management table illustrated in FIG. 18. The operation state management DB 3004a is configured as an operation state management table illustrated in FIG. 19.

Figure 15A:
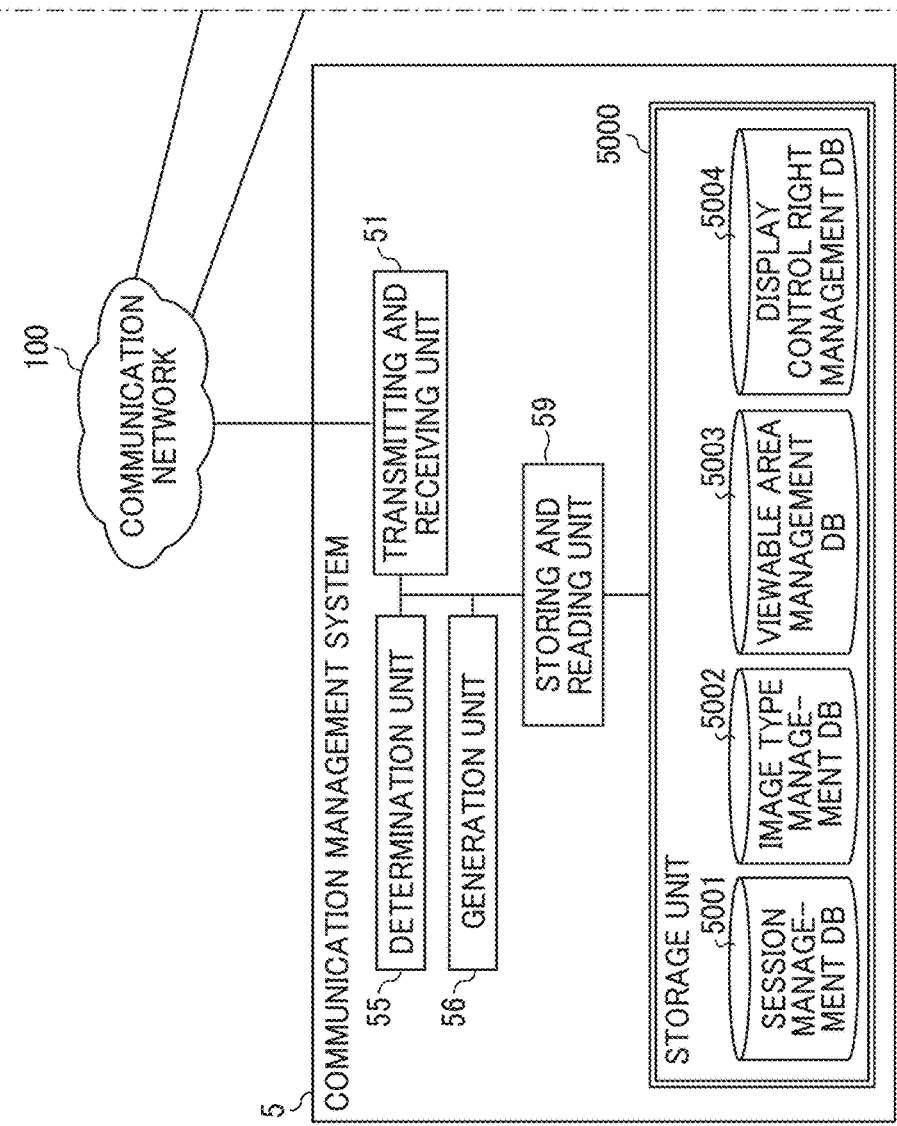
Figure 15B:
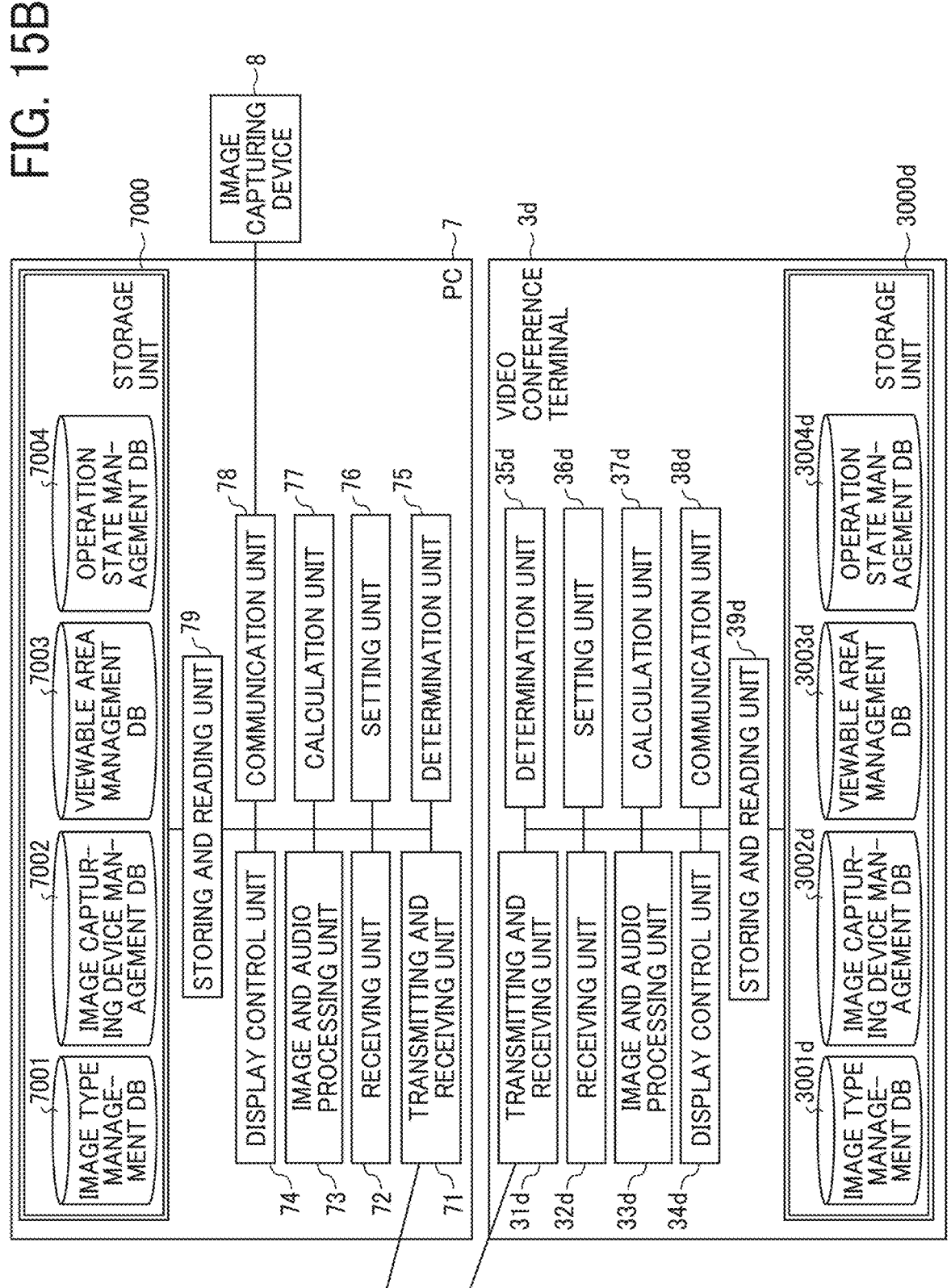

The video conference terminal 3d includes a transmitting and receiving unit 31d, a receiving unit 32d, an image and audio processing unit 33d, a display control unit 34d, a determination unit 35d, a setting unit 36d, a calculation unit 37d, a communication unit 38d, a storing and reading unit 39d, and a storage unit 3000d, as illustrated in FIG. 15B. These units implement similar functions to those of the transmitting and receiving unit 31a, the receiving unit 32a, the image and audio processing unit 33a, the display control unit 34a, the determination unit 35a, the setting unit 36a, the calculation unit 37a, the communication unit 38a, the storing and reading unit 39a, and the storage unit 3000a of the video conference terminal 3a, and thus description thereof will be omitted. Further, the storage unit 3000d of the video conference terminal 3d stores an image type management DB 3001d, an image capturing device management DB 3002d, a viewable area management DB 3003d, and an operation state management DB 3004d. These databases are similar in data structure to the image type management DB 3001a, the image capturing device management DB 3002a, the viewable area management DB 3003a, and the operation state management DB 3004a of the video conference terminal 3a, and thus description thereof will be omitted.

FIG. 16 is a conceptual diagram illustrating the image type management table. In the image type management table, an image data identification (ID), an internet protocol (IP) address, and a source name are stored and managed in association with each other. The image data ID is an example of image data identification information for identifying the image data in video communication. Image data items transmitted from the same transmitter terminal are assigned with the same image data ID, enabling a destination terminal (i.e., receiver terminal) to identify the transmitter terminal having transmitted the image data received by the receiver terminal. The IP address is an example of the address of the transmitter terminal. The IP address of the transmitter terminal represents the IP address of the communication terminal that transmits the image data represented by the image data ID associated with the IP address. The source name is a name for identifying the image capturing device that outputs the image data represented by the image data ID associated with the source name. The source name is an example of image type information. The source name is generated by the corresponding communication terminal such as the video conference terminal 3a in accordance with a particular naming rule. The IP address of the communication terminal is an example of identification information of the communication terminal. The same applies to the following description.

For example, the image type management table of FIG. 16 indicates that four communication terminals with respective IP addresses "1.2.1.3," "1.2.2.3," "1.3.1.3," and "1.3.2.3" have transmitted image data items represented by image data IDs "RS001," "RS002," "RS003," and "RS004." The image type management table further indicates that image types represented by respective source names of the communication terminals are "Video_Theta," "Video_Theta," "Video," and "Video," which represent "special image," "special image," "general image," and "general image," respectively. Herein, the special image is the omnidirectional image.

Data other than the image data may also be managed in association with the image data 1D. For example, the data other than the image data includes audio data and material data used in sharing a screen image.

FIG. 17 is a conceptual diagram illustrating the image capturing device management table. In the image capturing device management table, a vendor ID (VID) and a product ID (PID) are stored and managed. The VID and the PID are included in the GUIDs of an image capturing device capable of capturing two hemispherical images, based on which the omnidirectional image is generated. For example, the VID and the PID used by a USB device may be used as the GUIDs. The VID and the PID are stored in the communication terminal such as the video conference terminal 3 in factory shipment thereof, but may be additionally stored therein after the factory shipment.

FIG. 18 is a conceptual diagram illustrating the viewable area management table. In the viewable area management table, the IP address of the transmitter terminal, the IP address of the destination terminal, and the viewable area information are stored and managed in association with each other. Herein, the transmitter terminal is the communication terminal that transmits the captured image data, and the destination terminal is the communication terminal to which the captured image data is transmitted. The viewable area information represents the viewable area image being displayed by the destination terminal, i.e., the communication terminal to which the captured image data is transmitted. The destination terminal to which the captured image data is transmitted is also a transmitter terminal that transmits the viewable area information. The viewable area information is configured as conversion parameters for converting the captured image into the viewable area image Q corresponding to the viewable area T of the captured image, as illustrated in FIGS. 6A and 6B and FIG. 7. The IP address is an example of address information. The address information includes a media access control (MAC) address and a terminal ID for identifying the corresponding communication terminal. The IP address illustrated in FIG. 18 is a simplified version of the internet protocol version (IPv)4 address. Alternatively, the IPv6 address may be used as the IP address.

For example, when the IP address of the video conference terminal 3a is "1.2.1.3," the information managed in the first to third rows of the viewable area management table in FIG. 18 indicates that the captured image data transmitted from the video conference terminal 3a has been transmitted, via the communication management system 5, to the video conference terminal 3d with the IP address "1.2.2.3," the PC 7 with the IP address "1.3.1.3," and the smartphone 9 with the IP address "1.3.2.3." The information further indicates that the video conference terminal 3d is a transmitter terminal having transmitted viewable area information (r=10, θ=20, φ=30), that the PC 7 is a transmitter terminal having transmitted viewable area information (r=20, θ=30, φ=40), and that the smartphone 9 is a transmitter terminal having transmitted viewable area information (r=30, θ=40, φ=50).

If the transmitting and receiving unit 3a receives new viewable area information corresponding to the IP address of the transmitter terminal of already-managed captured image data and the IP address of the destination terminal of the already-managed captured image data, the storing and reading unit 39a overwrites the corresponding already-managed viewable area information with the newly received viewable area information.

FIG. 19 is a conceptual diagram illustrating the operation state management table. In the operation state management table, the operation state, the operation time, the IP address of the communication terminal set with a display control right (hereinafter referred to as the display control right set terminal), and pending parameters are managed in association with each other for each transmitter terminal IP address, i.e., the IP address of each communication terminal having transmitted the omnidirectional image. Thereby, the operation state is managed by the communication terminal storing the operation state management table representing the operation state of the captured image data.

The IP address of the communication terminal having transmitted the omnidirectional image is an example of identification information of the communication terminal having transmitted the omnidirectional image (i.e., the captured image data).

The operation state represents an operating state ("OPERATING") or a standby state ("STANDBY"). When the operation state is "OPERATING," the user is performing an operation on the viewable area image of the viewable area as a part of the omnidirectional image (i.e., the captured image data) transmitted from the transmitter terminal. When the operation state is "STANDBY," the user is not performing the operation on the viewable area image. The operation on the viewable area image is an operation of changing the viewable area image in one omnidirectional image to be displayed on a display. This operation is performed by the user by moving the cursor on the display with a device such as a mouse or by swiping over the display with a finger, for example. The operating state indicates that the operation is being performed on the viewable area image displayed on the display. The standby state indicates that at least a certain time (e.g., three seconds) has elapsed since the last execution of the operation on the viewable area image displayed on the display. The standby state may be described as "NOT OPERATING" instead of "STANDBY."

When the operation state is "OPERATING," the operation time represents the time of the last execution of the operation on the viewable area image by the user. The operation time is recorded as a time stamp, for example.

The IP address of the display control right set terminal represents the IP address of the communication terminal set with the display control right, i.e., owning the display control right. The display control right represents the right given to one of a plurality of communication terminals at a plurality of sites to display the viewable area image corresponding to the viewable area as a part of the omnidirectional image, and remotely control the other communication terminals at the other sites to display the same viewable area image. Practically, the IP address of the communication terminal causing the other communication terminals to display the viewable area image is managed in the operation state management table, and thereby the display control right is set for the communication terminal.

The pending parameters represent the viewable area information received by a destination terminal of the viewable area information (i.e., the communication terminal to which the viewable area information is transmitted) when the operation state of the destination terminal is "OPERATING." The pending parameters are used to display the viewable area image after the operation state of the destination terminal shifts from "OPERATING" to "STANDBY." When the pending parameters are absent, the fields of the pending parameters are set with a value "NO" or are set with no value.

Respective configurations of the functional units of the video conference terminal 3a will be described in detail with FIGS. 11 and 14.

In the video conference terminal 3a, the transmitting and receiving unit 31a is mainly implemented by the network I/F 311 and the processing of the CPU 301 illustrated in FIG. 11. The transmitting and receiving unit 31a transmits and receives various data and information to and from the communication management system 5 via the communication network 100.

The receiving unit 32a is mainly implemented by the operation buttons 308 and the processing of the CPU 301 illustrated in FIG. 11. The receiving unit 32a receives various selections and inputs by the user. As well as the operation buttons 308, the receiving unit 32a may also be implemented by another input device such as a touch panel.

The image and audio processing unit 33a is implemented by a command from the CPU 301 illustrated in FIG. 1. The image and audio processing unit 33a performs image processing on the image data of the image of the subject captured by the camera 312. The image and audio processing unit 33a further performs audio processing on audio data of audio signals converted from the voice of the user by the microphone 314.

Based on the image type information such as the source name, the image and audio processing unit 33a further performs image processing on the image data received from another communication terminal such that the display control unit 34a displays a resultant image on the display 4a. Specifically, when the image type information indicates that the image type is the special image, the image and audio processing unit 33a converts the image data (e.g., the data of the hemispherical images illustrated in FIGS. 3A and 3B) into omnidirectional image data (e.g., the data of the omnidirectional image CE illustrated in FIG. 4B), to thereby generate the data of the omnidirectional image. The image and audio processing unit 33a further generates a viewable area image such as the viewable area image Q illustrated in FIG. 6B. The image and audio processing unit 33a further outputs, to the speaker 315, audio signals of audio data received from another communication terminal via the communication management system 5, to thereby output sound from the speaker 315.

The display control unit 34a is mainly implemented by the display I/F 317 and the processing of the CPU 301. The display control unit 34a executes control for displaying various images and text on the display 4a.

The determination unit 35a is mainly implemented by the processing of the CPU 301. The determination unit 35a determines the image type of the image data received from the image capturing device 1a, for example.

The setting unit 36a is mainly implemented by the processing of the CPU 301. The setting unit 36a executes various settings based on various determination results obtained by the determination unit 35a. For example, based on the result indicating that the image type is the general image or the special image (i.e., the omnidirectional image in the present example), the setting unit 36a sets the source name (an example of the image type information) in accordance with the above-described naming rule. If the determination unit 35a determines that the image type is the general image, the setting unit 36a sets a source name "Video" indicating that the image type is the general image. If the determination unit 35a determines that the image type is the special image, on the other hand, the setting unit 36a sets a source name "Video_Theta" indicating that the image type is the special image.

The calculation unit 37a is mainly implemented by the processing of the CPU 301. Based on viewable area information i1 representing a viewable area T1 in the captured image and viewable area information i2 representing a viewable area T2 in the captured image, the calculation unit 37a calculates the direction of the viewable area T2 relative to the direction of the viewable area T1 in the captured image. Herein, the viewable area information i2 is the viewable area information received from another communication terminal by the transmitting and receiving unit 31a. The viewable area information i1 and viewable area information 12 will be described in detail later with FIGS. 36A and 36B and FIGS. 37A and 37B. In the following description, when the entirety of the captured image is displayed, the entirety of the captured image will also be referred to as the whole image.

The communication unit 38a is mainly implemented by the near field communication circuit 319, the antenna 319a, and the processing of the CPU 301. The communication unit 38a communicates with the communication unit 18a of the image capturing device 1a in accordance with a near field wireless communication technology conforming to the NFC. Bluetooth, or Wi-Fi standard, for example. In the present example, the communication unit 38a and the transmitting and receiving unit 31a are configured as separate communication units, but may be integrated together.

The storing and reading unit 39a is mainly implemented by the processing of the CPU 301. The storing and reading unit 39a stores various data and information in the storage unit 3000a, and reads therefrom various data and information.

A functional configuration of the communication management system 5 will be described in detail with FIGS. 12 and 15.

The communication management system 5 includes a transmitting and receiving unit 51, a determination unit 55, a generation unit 56, and a storing and reading unit 59. Each of these units is a function or unit implemented when at least one of the components illustrated in FIG. 12 operates in response to a command from the CPU 501 in accordance with the program for the communication management system 5 deployed on the RAM 503 from the HD 504.

The communication management system 5 further includes a storage unit 5000 implemented by the RAM 503 and the HD 504 illustrated in FIG. 12. The storage unit 5000 stores a session management DB 5001, an image type management DB 5002, a viewable area management DB 5003, and a display control right management DB 5004. The session management DB 5001 is configured as a session management table illustrated in FIG. 20. The image type management DB 5002 is configured as an image type management table illustrated in FIG. 21. The viewable area management DB 5003 is configured as a viewable area management table illustrated in FIG. 22. The display control right management DB 5004 is configured as a display control right management table illustrated in FIG. 23.

FIG. 20 is a conceptual diagram illustrating the session management table. In the session management table, a session ID and the IP addresses of participant communication terminals are stored and managed in association with each other. The session ID is an example of session identification information for identifying a communication session that implements a video call. The session ID is generated for each virtual meeting room. The session ID is also managed in each of the communication terminals such as the video conference terminal 3a, and is used thereby in the selection of a communication session. The IP addresses of the participant communication terminals represent the IP addresses of the communication terminals participating in the communication session in the virtual meeting room represented by the session ID associated with the IP addresses.

FIG. 21 is a conceptual diagram illustrating the image type management table. In the image type management table of FIG. 21, in addition to the information items managed in the image type management table of FIG. 16, the session ID managed in the session management table is managed in association with the information items. The image type management table of FIG. 21 indicates that three communication terminals with respective IP addresses "1.2.1.3," "1.2.2.3," and "1.3.1.3" are participating in the communication session in the virtual meeting room represented by the same session ID "se101." The communication management system 5 manages the image data IDs, the IP addresses of the transmitter terminals, and the image type information the same as those managed in the communication terminals such as the video conference terminal 3a. This is because, when a new communication terminal enters the virtual meeting room, for example, the communication management system 5 transmits the image type information and other information to both the communication terminals already participating in the video call and the newly participating communication terminal. It is thereby unnecessary for the communication terminals already participating in the video call and the newly participating communication terminal to transmit and receive therebetween the image type information and other information.

FIG. 22 is a conceptual diagram illustrating the viewable area management table. The viewable area management table of FIG. 22 is basically similar in data structure to the viewable area management table of FIG. 18. The transmitting and receiving unit 51 transmits the latest viewable area information to each of the communication terminals at each certain time interval (e.g., at every 30 seconds), as described later. During the transmission of the viewable area information at each certain time interval, therefore, all viewable area information received by the transmitting and receiving unit 51 is saved without being deleted. In the viewable area management table of FIG. 22, the viewable area information is managed such that a newer viewable area information item is placed at a higher position.

FIG. 23 is a conceptual diagram illustrating the display control right management table. In the display control right management table of FIG. 23, the IP address of the communication terminal having transmitted the omnidirectional image (i.e., the transmitter terminal) and the IP address of the communication terminal having requested the setting of the display control right (i.e., the display control right set terminal) are managed in association with each other. In this case, the IP address of the display control right set terminal is the IP address of the communication terminal for which the communication management system 5 has set the display control right in response to a display control right setting request.

Respective configurations of the functional units of the communication management system 5 will be described in detail with FIGS. 12 and 15.

In the communication management system 5, the transmitting and receiving unit 51 is mainly implemented by the network I/F 509 and the processing of the CPU 501 illustrated in FIG. 12. The transmitting and receiving unit 51 transmits and receives various data and information to and from the video conference terminal 3a or 3d, the PC 7, or the smartphone 9 via the communication network 100.

The determination unit 55 is mainly implemented by the processing of the CPU 501, and makes various determinations.

The generation unit 56 is mainly implemented by the processing of the CPU 501, and generates the image data ID.

The storing and reading unit 59 is mainly implemented by the HDD 505 and the processing of the CPU 501 illustrated in FIG. 12. The storing and reading unit 59 stores various data and information in the storage unit 5000, and reads therefrom various data and information.

A functional configuration of the PC 7 will be described in detail with FIGS. 12 and 15.

The PC 7 has basically the same functions as those of the video conference terminal 3a. That is, as illustrated in FIG. 15B, the PC 7 includes a transmitting and receiving unit 71, a receiving unit 72, an image and audio processing unit 73, a display control unit 74, a determination unit 75, a setting unit 76, a calculation unit 77, a communication unit 78, and a storing and reading unit 79. Each of these units is a function or unit implemented when at least one of the components illustrated in FIG. 12 operates in response to a command from the CPU 501 in accordance with the program for the PC 7 deployed on the RAM 503 from the HD 504.

The PC 7 further includes a storage unit 7000 implemented by the ROM 502, the RAM 503, and the HD 504 illustrated in FIG. 12. The storage unit 7000 stores an image type management DB 7001, an image capturing device management DB 7002, a viewable area management DB 7003, and an operation state management DB 7004. These databases are basically the same in data structure as the image type management DB 3001a, the image capturing device management DB 3002a, the viewable area management DB 3003a, and the operation state management DB 3004a of the video conference terminal 3a, and thus description thereof will be omitted.

In the PC 7, the transmitting and receiving unit 71 is mainly implemented by the network I/F 509 and the processing of the CPU 501 illustrated in FIG. 12. The transmitting and receiving unit 71 implements similar functions to those of the transmitting and receiving unit 31a.

The receiving unit 72 is mainly implemented by the keyboard 511, the mouse 512, and the processing of the CPU 501, and implements similar functions to those of the receiving unit 32a. The image and audio processing unit 73 is mainly implemented by a command from the CPU 501, and implements similar functions to those of the image and audio processing unit 33a. The display control unit 74 is mainly implemented by the processing of the CPU 501, and implements similar functions to those of the display control unit 34a. The determination unit 75 is mainly implemented by the processing of the CPU 501, and implements similar functions to those of the determination unit 35a. The setting unit 76 is mainly implemented by the processing of the CPU 501, and implements similar functions to those of the setting unit 36a. The calculation unit 77 is mainly implemented by the processing of the CPU 501, and implements similar functions to those of the calculation unit 37a. The communication unit 78 is mainly implemented by the processing of the CPU 501, and implements similar functions to those of the communication unit 38a. The storing and reading unit 79 is implemented by the processing of the CPU 501. The storing and reading unit 79 stores various data and information in the storage unit 7000, and reads therefrom various data and information.

A functional configuration of the smartphone 9 will be described in detail with FIGS. 13 and 14.

The smartphone 9 has basically the same functions as those of the video conference terminal 3a. That is, as illustrated in FIG. 14B, the smartphone 9 includes a transmitting and receiving unit 91, a receiving unit 92, an image and audio processing unit 93, a display control unit 94, a determination unit 95, a setting unit 96, a calculation unit 97, a communication unit 98, and a storing and reading unit 99. Each of these units is a function or unit implemented when at least one of the components illustrated in FIG. 13 operates in response to a command from the CPU 901 in accordance with the program for the smartphone 9 deployed on the RAM 903 from the EEPROM 904.

The smartphone 9 further includes a storage unit 9000 implemented by the ROM 902, the RAM 903, and the EEPROM 904 illustrated in FIG. 13. The storage unit 9000 stores an image type management DB 9001, an image capturing device management DB 9002, a viewable area management DB 9003, and an operation state management DB 9004. These databases are the same in data structure as the image type management DB 3001a, the image capturing device management DB 3002a, the viewable area management DB 3003a, and the operation state management DB 3004a of the video conference terminal 3a, and thus description thereof will be omitted.

In the smartphone 9, the transmitting and receiving unit 91 is mainly implemented by the telecommunication circuit 911 and the processing of the CPU 901 illustrated in FIG. 13.

The transmitting and receiving unit 91 implements similar functions to those of the transmitting and receiving unit 31a.

The receiving unit 92 is mainly implemented by the touch panel 921 and the processing of the CPU 901, and implements similar functions to those of the receiving unit 32a.

The image and audio processing unit 93 is mainly implemented by a command from the CPU 901, and implements similar functions to those of the image and audio processing unit 33a. The display control unit 94 is mainly implemented by the processing of the CPU 901, and implements similar functions to those of the display control unit 34a. The determination unit 95 is mainly implemented by the processing of the CPU 901, and implements similar functions to those of the determination unit 35a. The setting unit 96 is mainly implemented by the processing of the CPU 901, and implements similar functions to those of the setting unit 36a. The calculation unit 97 is mainly implemented by the processing of the CPU 901, and implements similar functions to those of the calculation unit 37a. The communication unit 98 is mainly implemented by the processing of the CPU 901, and implements similar functions to those of the communication unit 38a. The storing and reading unit 99 is implemented by the processing of the CPU 901. The storing and reading unit 99 stores various data and information in the storage unit 9000, and reads therefrom various data and information.

Processes and operations of the first embodiment will be described with FIGS. 24 to 44.

A process of having a communication terminal participate in a particular communication session will first be described with FIGS. 24 and 25.

Figure 24:
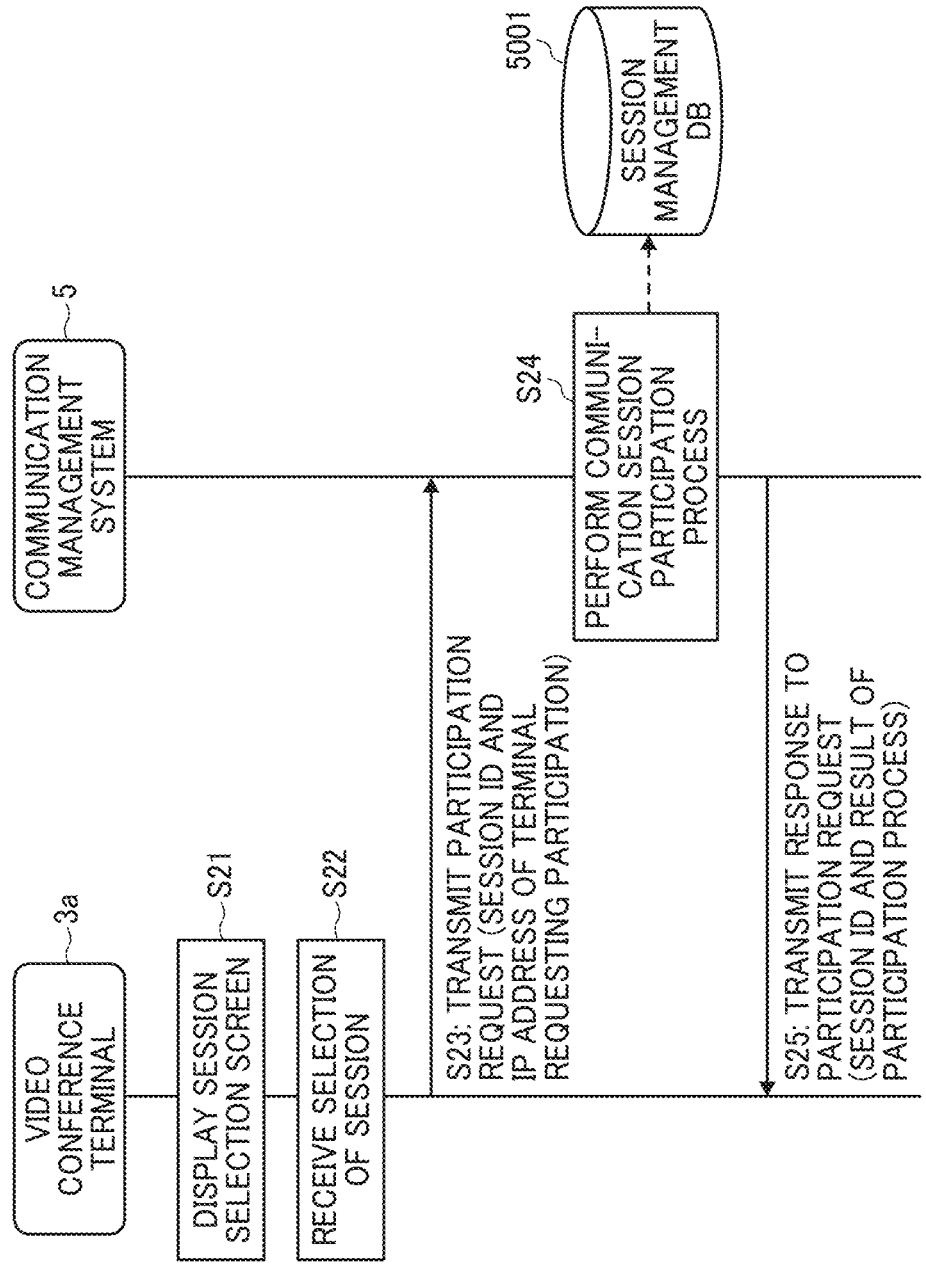
FIG. 24 is a sequence diagram illustrating a process of having a communication terminal of the image communication system participate in a particular communication session.
Figure 25:
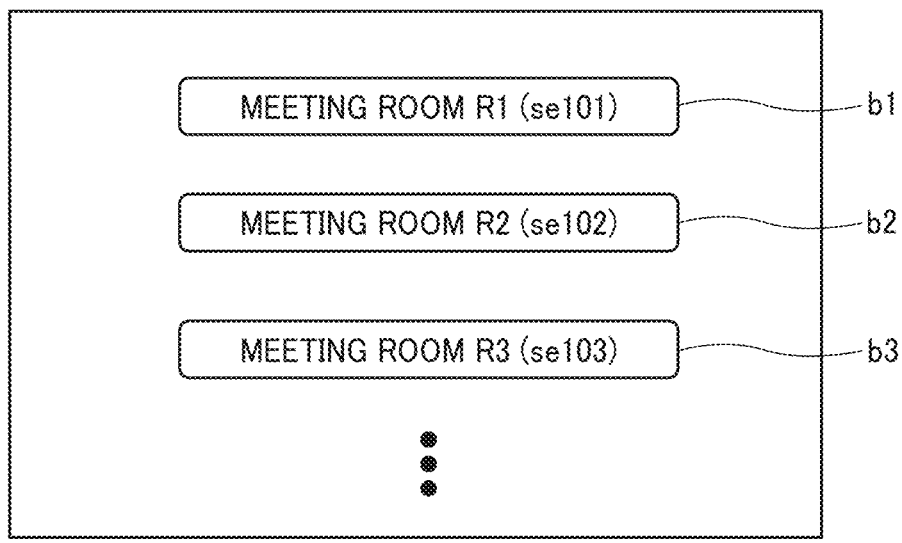
FIG. 25 is a diagram illustrating a selection screen displayed on the communication terminal to select a communication session in a virtual meeting room.

FIG. 24 is a sequence diagram illustrating a process of having a communication terminal participate in a particular communication session. FIG. 25 is a diagram illustrating a selection screen for selecting a communication session in a virtual meeting room.

A user at the site A (e.g., the user UA1) first operates the video conference terminal 3a to display the selection screen for selecting a communication session in a virtual meeting room. Then, in the video conference terminal 3a, the receiving unit 32a receives the operation for displaying the selection screen, and the display control unit 34a displays the selection screen as illustrated in FIG. 25 on the display 4a (step S21). The selection screen displays, for example, selection buttons b1, b2, and b3, which represent virtual meeting rooms R1, R2, and R3, respectively, as options. The selection buttons b1, b2, and b3 are associated with respective session IDs se101, se102, and se103.

The user UA1 then selects one of the selection buttons b1, b2, and b3 corresponding to a desired virtual meeting room. It is assumed here that the user UA1 selects the selection button b1. Then, the receiving unit 32a receives the selection of the communication session (step S22). Then, the transmitting and receiving unit 31a transmits a participation request to the communication management system 5 to participate in the communication session in the virtual meeting room (step S23). The participation request includes the session ID representing the communication session, the selection of which has been received at step S22, and the IP address of the video conference terminal 3a transmitting the participation request. Then, the transmitting and receiving unit 51 of the communication management system 5 receives the participation request.

In the communication management system 5, the storing and reading unit 59 then adds the IP address received at step S23 to the session management DB 5001 (see FIG. 20), specifically to the field of the IP addresses of participant communication terminals in a record corresponding to the session ID received at step S23. Thereby, a communication session participation process is performed (step S24). The transmitting and receiving unit 51 then transmits a response to the participation request to the video conference terminal 3a (step S25). The response to the participation request includes the session ID received at step S23 and a result of the communication session participation process. Then, the transmitting and receiving unit 31a of the video conference terminal 3a receives the response to the participation request. It is assumed in the following description that the communication session participation process has succeeded.

A process of managing the image type information will be described with FIG. 26.

Figure 26:
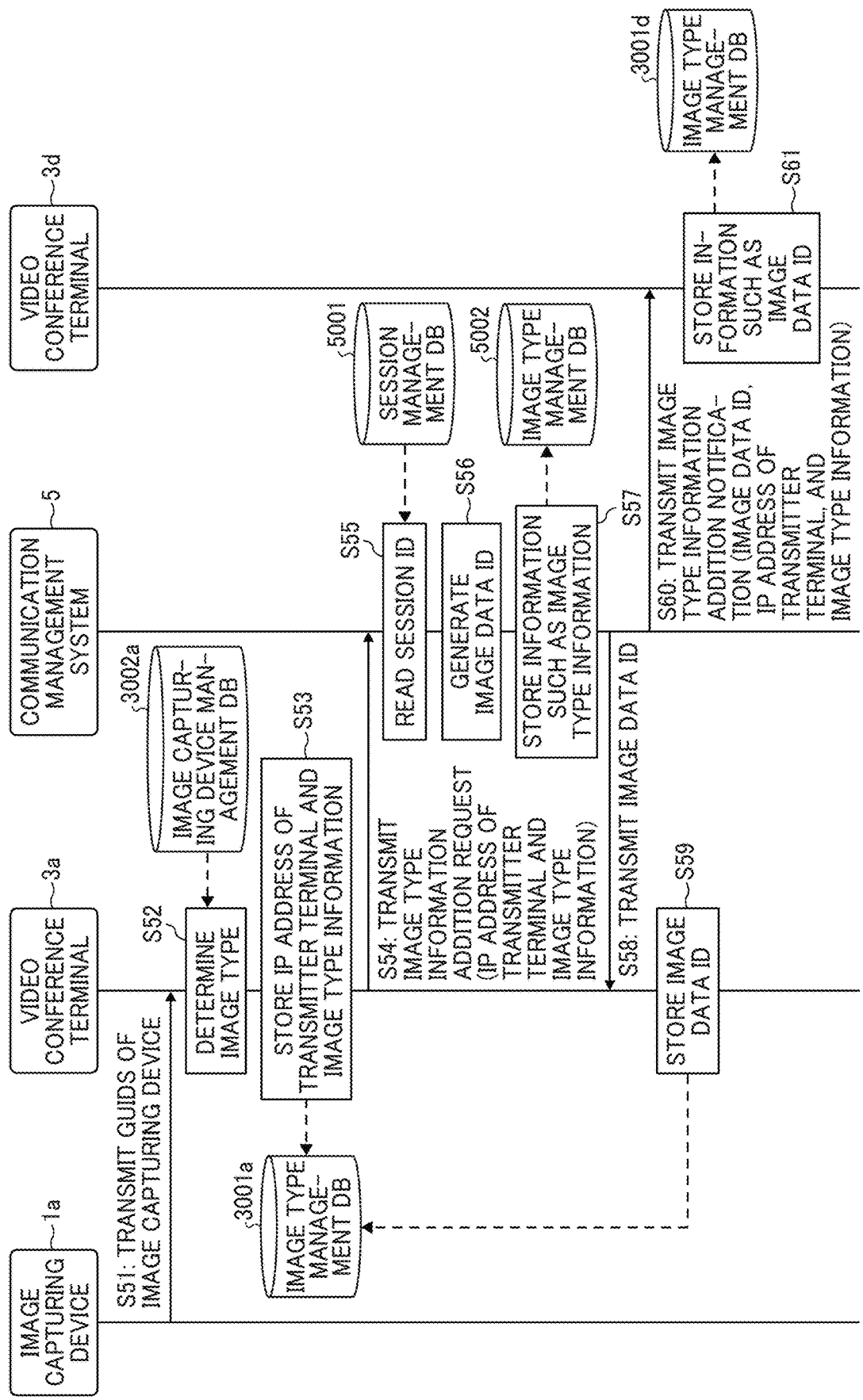
FIG. 26 is a sequence diagram illustrating an image type information management process performed in the image communication system.

FIG. 26 is a sequence diagram illustrating a process of managing the image type information. A user at the site A (e.g., the user UA1) first connects the video conference terminal 3a to a USB cable of the cradle 2a having the image capturing device 1a attached thereto. Then, in the image capturing device 1a, the storing and reading unit 19a reads the GUIDs of the image capturing device 1a from the storage unit 1000a, and the communication unit 18a transmits the GUIDs of the image capturing device 1a to the communication unit 38a of the video conference terminal 3a (step S51). Then, the communication unit 38a of the video conference terminal 3a receives the GUIDs of the image capturing device 1a.

Then, the determination unit 35a of the video conference terminal 3a determines whether the same VID and PID as those included in the GUIDs received at step S51 are managed in the image capturing device management DB 3002a (see FIG. 17), to thereby determine the image type (step S52). Specifically, if the same VID and PID as those included in the received GUIDs are managed in the image capturing device management DB 3002a, the determination unit 35a determines that the image capturing device 1a is an image capturing device that captures the special image (i.e., the omnidirectional image in the present example). If the same VID and PID as those included in the received GUIDs are not managed in the image capturing device management DB 3002a, on the other hand, the determination unit 35a determines that the image capturing device 1a is an image capturing device that captures the general image.

Then, the storing and reading unit 39a stores the IP address of the video conference terminal 3a (i.e., the transmitter terminal) and the image type information in the image type management DB 3001a (see FIG. 16) in association with each other (step S53). Herein, the image type information represents the result of determination obtained at step S52. At this stage, the IP address and the image type information are not associated with the image data ID. The image type information includes the source name determined in accordance with the particular naming rule and the image type (e.g., the general image or the special image), for example.

Then, the transmitting and receiving unit 31a transmits an image type information addition request to the communication management system 5 (step S54). The image type information addition request includes the IP address of the video conference terminal 3a (i.e., the transmitter terminal) and the image type information stored at step S53. Then, the transmitting and receiving unit 51 of the communication management system 5 receives the image type information addition request.

Then, in the communication management system 5, the storing and reading unit 59 performs a search through the session management DB 5001 (see FIG. 20) with a search key set to the IP address of the video conference terminal 3a (i.e., the transmitter terminal) received at step S54, to thereby read from the session management DB 5001 the session ID corresponding to the IP address (step S55).

Then, the generation unit 56 generates a unique image data ID (step S56), and the storing and reading unit 59 stores a new record in the image type management DB 5002 (see FIG. 21) (step S57). In the new record, the session ID read at step S55, the image data ID generated at step S56, and the IP address of the video conference terminal 3a (i.e., the transmitter terminal) and the image type information received at step S54 are associated with each other. Then, the transmitting and receiving unit 51 transmits the image data ID generated at step S56 to the video conference terminal 3a. Then, the transmitting and receiving unit 31a of the video conference terminal 3a receives the image data ID (step S58).

Then, the storing and reading unit 39a of the video conference terminal 3a stores the image data ID received at step S58 in the image type management DB 3001a (see FIG. 16) in association with the IP address of the video conference terminal 3a (i.e., the transmitter terminal) and the image type information stored at step S53 (step S59).

In the communication management system 5, the transmitting and receiving unit 51 transmits an image type information addition notification to any other communication terminal (the video conference terminal 3d in the present example) (step S60). The image type information addition notification includes the image data ID generated at step S56 and the IP address of the video conference terminal 3a (i.e., the transmitter terminal) and the image type information stored at step S57. Then, the transmitting and receiving unit 31d of the video conference terminal 3d receives the image type information addition notification. The destination to which the transmitting and receiving unit 51 transmits the image type information addition notification corresponds to any other IP address associated with the session ID corresponding to the IP address of the video conference terminal 3a in the session management DB 5001 (see FIG. 20). That is, the destination of the image type information addition notification is any other communication terminal located in the virtual meeting room together with the video conference terminal 3a.

Then, the storing and reading unit 39d of the video conference terminal 3d stores a new record in the image type management DB 3001d (see FIG. 16) (step S61). In the new record, the image data ID, the IP address of the video conference terminal 3a (i.e., the transmitter terminal), and the image type information received at step S60 are associated with each other. The image type information addition notification is similarly transmitted to the remaining communication terminals, i.e., the PC 7 and the smartphone 9, and is stored in the image type management DB 7001 of the PC 7 and the image type management DB 9001 of the smartphone 9. Thereby, the communication terminals share the same information in the image type management DBs 3001a, 3001d, 7001, and 9001.

A process of communicating the captured image data in the video call will be described with FIGS. 27A and 27B to FIGS. 29A, 29B, and 29C.

Figure 27A:
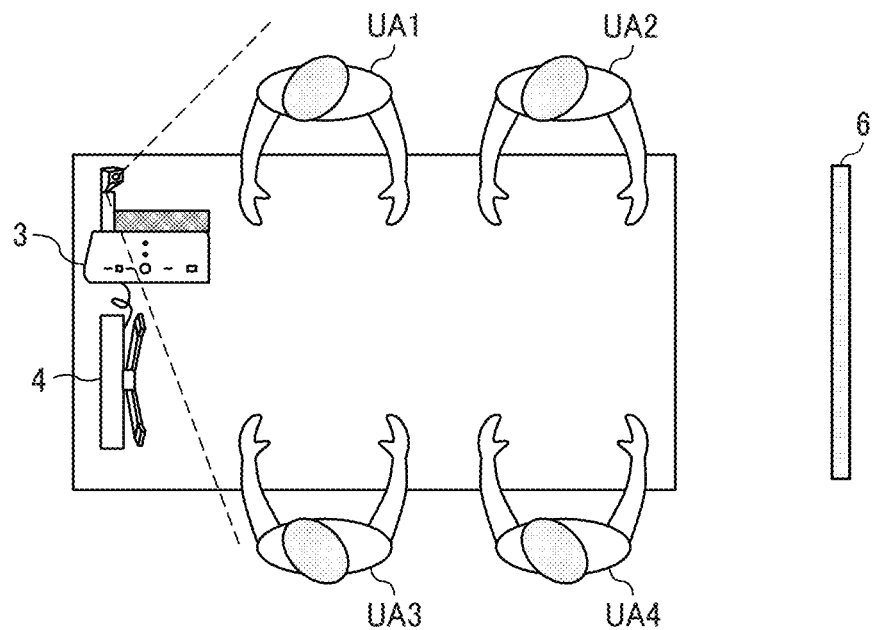
FIGS. 27A and 27B are diagrams each illustrating a video call.
Figure 27B:
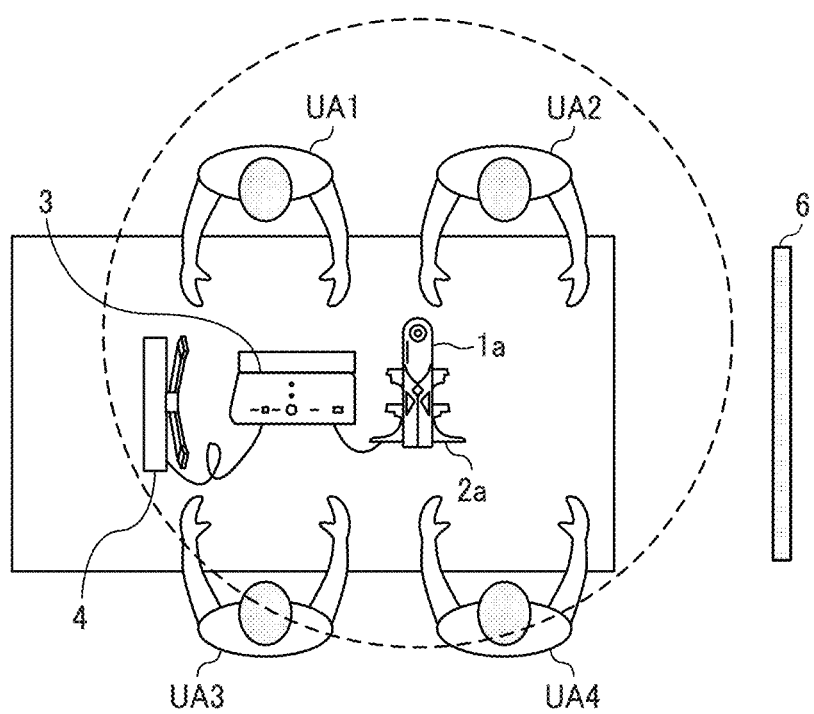

FIGS. 27A and 27B are diagrams each illustrating a video call taking place at the site A. FIG. 27A illustrates a video call not using the image capturing device 1a. FIG. 27B illustrates a video call using the image capturing device 1a. At the site A, a whiteboard 6 is placed on the right side to allow the users UA1 to UA4 to write text or draw figures on the whiteboard 6.

As illustrated in FIG. 27A, when the video call does not use the image capturing device 1a but uses the camera 312 (see FIG. 11) built in the video conference terminal 3a, the video conference terminal 3a is typically placed on one end of a desk such that the respective images of the users UA1 to UA4 are captured by the camera 312, the horizontal angle of view and the vertical angle of view of which are 125 degrees and 70 degrees, respectively. When speaking, therefore, the users UA1 to UA4 turn their faces toward the video conference terminal 3a, and thus the display 4a is placed near the video conference terminal 3a. With this layout, the users UA2 and UA4 distant from the microphone 314 (see FIG. 11) of the video conference terminal 3a may feel a need to speak relatively loudly, and may find it difficult to clearly see the image displayed on the display 4a.

By contrast, when the video call uses the image capturing device 1a, as illustrated in FIG. 27B, two hemispherical images for generating the omnidirectional image therefrom are obtained. It is therefore possible to place the video conference terminal 3a and the display 4a relatively near the center of the desk. With this layout, each of the users UA1 to UA4 is close to the microphone 314, and thus is able to speak relatively quietly and see the displayed image on the display 4a more clearly.

With FIG. 28, a description will be given of a process in which the captured image data and the audio data obtained at the site A illustrated in FIG. 27B are transmitted to the communication terminals at the other sites B, C, and D (i.e., the smartphone 9, the PC 7, and the video conference terminal 3d) via the communication management system 5.

Figure 28:
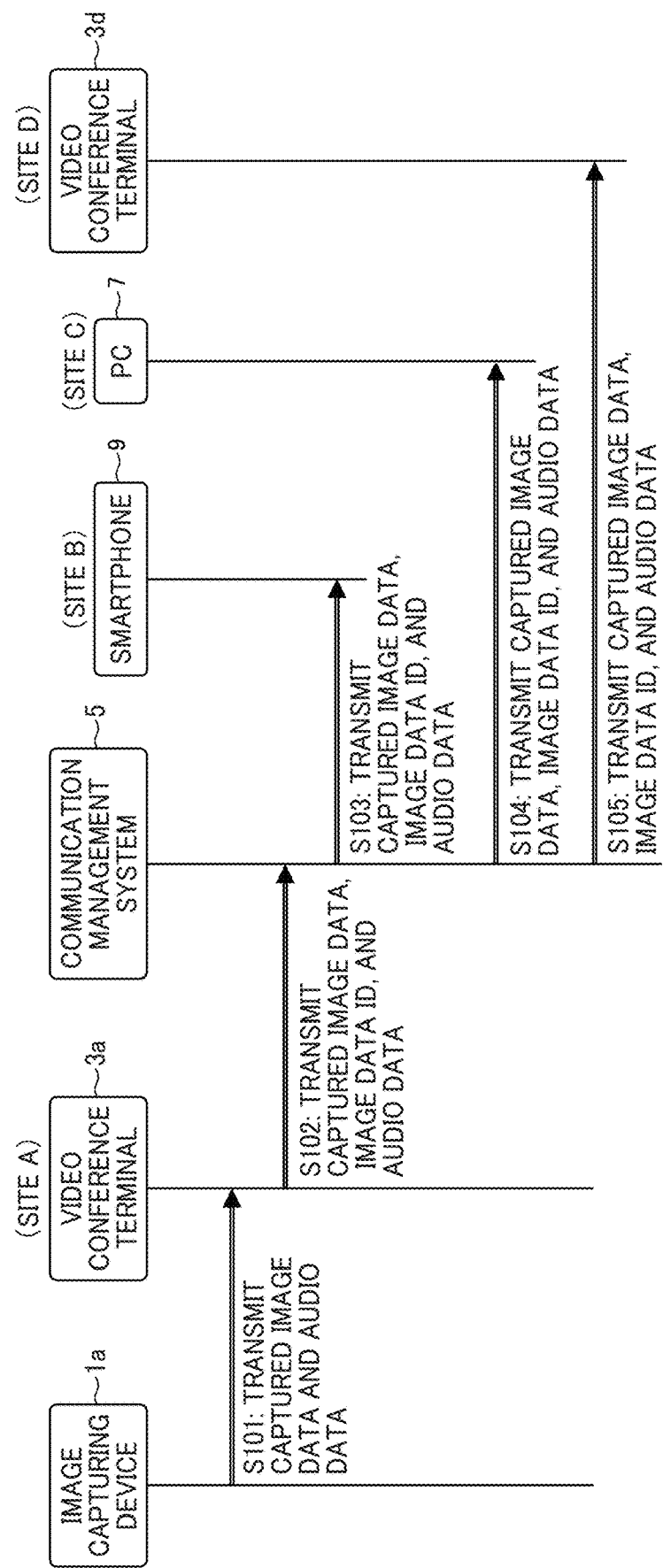
FIG. 28 is a sequence diagram illustrating a process of communicating captured image data and audio data in the video call in FIG. 27B.

FIG. 28 is a sequence diagram illustrating a process of communicating the captured image data and the audio data in a video call.

The communication unit 18a of the image capturing device 1a first transmits the captured image data of the captured image of a subject (e.g., an object or surroundings) and the audio data of collected sounds to the communication unit 38a of the video conference terminal 3a (step S101). In this case, the image capturing device 1a is capable of obtaining two hemispherical images, based on which the omnidirectional image is generated. That is, the captured image data includes the data of two hemispherical images, as illustrated in FIGS. 3A and 3B. Then, the communication unit 38a of the video conference terminal 3a receives the captured image data and the audio data.

Then, the transmitting and receiving unit 31a of the video conference terminal 3a transmits to the communication management system 5 the captured image data and the audio data transmitted from the image capturing device 1a (step S102). In this transmission process, the image data ID for identifying the captured image data to be transmitted is also transmitted. Then, the transmitting and receiving unit 51 of the communication management system 5 receives the captured image data, the image data ID, and the audio data.

The transmitting and receiving unit 51 of the communication management system 5 then transmits the captured image data and the audio data to the communication terminals participating in the video call participated by the video conference terminal 3a (i.e., the smartphone 9, the PC 7, and the video conference terminal 3d) (steps S103, S104, and S105). In each of these transmission processes, the image data ID for identifying the captured image data to be transmitted is also transmitted. Then, the transmitting and receiving unit 91 of the smartphone 9, the transmitting and receiving unit 71 of the PC 7, and the transmitting and receiving unit 31*d* of the video conference terminal 3*d* receive the captured image data, the image data ID, and the audio data.

Display examples on the display 917 of the smartphone 9 at the site B will be described with FIGS. 29A, 29B, and 29C.

Figures 29A, 29B, 29C:
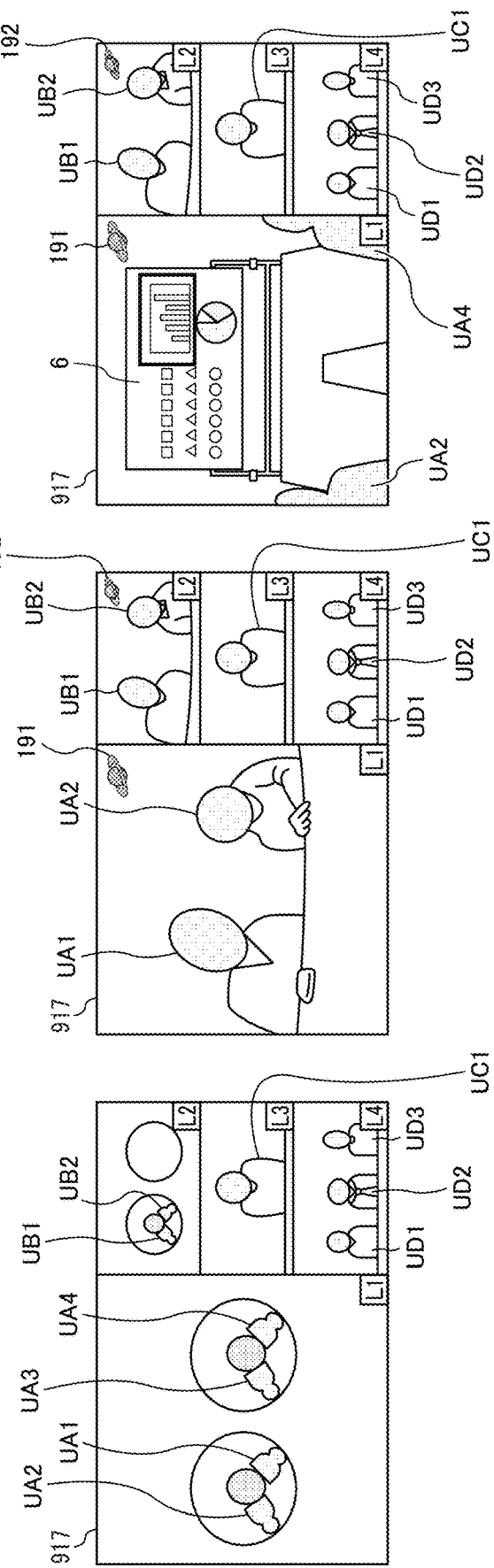
FIGS. 29A, 29B, and 29C are diagrams illustrating display examples on a display of the smartphone, FIG. 29A illustrating images displayed directly based on image data from two image capturing devices of the image communication system without generating the omnidirectional image or the viewable area image, FIG. 29B illustrating images obtained by generating the omnidirectional image and the viewable area image from the image data transmitted from the two image capturing devices, and FIG. 29C illustrating images obtained by changing the viewable area image in FIG. 29B.

FIGS. 29A, 29B, and 29 C illustrate display examples on the display 917 of the smartphone 9 at the site B. FIG. 29A illustrates images displayed directly based on the captured image data transmitted from the image capturing device 1*a* at the site A via the video conference terminal 3*a* and the captured image data transmitted from the image capturing device 1*b* at the site B, without generating the omnidirectional image or the viewable area image. FIG. 29B illustrates images obtained by generating the omnidirectional image and the viewable area image from the captured image data transmitted from the image capturing devices 1*a* and 1*b*.

A left display area L1 of the display 917 displays the image of the site A. An upper-right display area L2 of the display 917 displays the image of the site B, at which the display 917 is located. A middle-right display area L3 of the display 917 displays the image of the site C. A lower-right display area L4 of the display 917 displays the image of the site D. The display area L1 is a main display area, and the display areas L2 to L4 are sub-display areas. Each of the communication terminals is capable of switching the image of the main display area to one of the images of the sub-display areas. At each of the sites A to D, the main display area normally displays the image of the site at which a keyperson of the video call is located. The image of the site at which the display (the display 917 in the present example) is located is not necessarily displayed in the display area L2, but may be displayed in the display area L3 or L4.

As illustrated in FIG. 29A, if the images of the captured image data transmitted from the image capturing devices 1*a* and 1*b* are directly displayed, each of the image of the site A and the image of the site B is displayed as front and rear hemispherical images, as illustrated in FIGS. 3A and 3B.

On the other hand, if the image and audio processing unit 93 of the smartphone 9 generates the omnidirectional images from the captured image data output from the image capturing devices 1*a* and 1*b* each capable of obtaining two hemispherical images as a basis for the omnidirectional image, and generates the viewable area images from the omnidirectional images, the viewable area images are displayed as planar images, as illustrated in FIG. 29B. At the site C, the image capturing device 8 capable of capturing the general image is used to capture the image. Similarly, at the site D, the video conference terminal 3*d* capable of capturing the general image is used to capture the image. In FIGS. 29A and 29B, therefore, each of the image of the site C and the image of the site D is displayed as the general image (the planar image in the present example).

Further, at each of the sites A to D, a user is able to change the viewable area corresponding to the viewable area image of the same omnidirectional image. For example, in response to the operation of the touch panel 921 performed by the user UB1, the receiving unit 92 receives an operation of moving the viewable area image, and the display control unit 94 moves or rotates the viewable area image or reduces or increases the size of the viewable area image. It is thereby possible to change the viewable area image illustrated in FIG. 29B, in which the users UA1 and UA2 at the site A are displayed based on initial (i.e., default) settings, to the viewable area image illustrated in FIG. 29C. Specifically, FIG. 29C illustrates a viewable area image with the image of the whiteboard 6, which is changed from the viewable area image with the images of the users UA1 and UA2 in the captured image of the site A illustrated in FIG. 27B.

FIGS. 29B and 29C further illustrate omnidirectional image icons 191 and 192. The omnidirectional image icons 191 and 192 are examples of a special image identifying icon indicating that the image displayed with the special image identifying icon is the viewable area image representing the viewable area as a part of the omnidirectional image. The display position of each of the omnidirectional image icons 191 and 192 is not limited to an upper-right position in the display area, and may be any other position in the display area such as an upper-left position, a lower-left position, or a lower-right position. Further, the omnidirectional image icons 191 and 192 are not limited to the type of icon illustrated in FIGS. 29B and 29C. Further, each of the omnidirectional image icons 191 and 192 may be replaced by text such as "OMNIDIRECTIONAL IMAGE" or a combination of an icon and text.

A process of sharing the viewable area image in the image communication system 10 will be described with FIG. 30. The following description will be given of a process of the image communication system 10, in which the viewable area image displayed as in FIG. 29B is changed to another viewable area image such as that in FIG. 29C.

FIG. 30 is a sequence diagram illustrating the process of sharing the viewable area image. For example, when the user UD1 at the site D displays the viewable area image of the site A with the video conference terminal 3*d*, as illustrated in FIG. 29B, the transmitting and receiving unit 31*d* of the video conference terminal 3*d* transmits to the communication management system 5 the viewable area information representing the displayed viewable area image (step S111). The viewable area information includes the IP address of the video conference terminal 3*a* and the IP address of the video conference terminal 3*d*. Herein, the video conference terminal 3*a* is the transmitter terminal that transmits the captured image data corresponding to the omnidirectional image, and the video conference terminal 3*d* is the destination terminal to which the captured image data is transmitted (i.e., the transmitter terminal that transmits the viewable area information). Then, the transmitting and receiving unit 51 of the communication management system 5 receives the viewable area information.

Then, in the communication management system 5, the storing and reading unit 59 stores the viewable area information, the IP address of the transmitter terminal, and the IP address of the destination terminal received at step S111 in the viewable area management DB 5003 in association with each other (step S112). The processes of steps S111 and S112 are performed each time the viewable area image is changed in the video conference terminal 3*d*, as in the change from the viewable area image of FIG. 29B to the viewable area image of FIG. 29C.

The storing and reading unit 59 of the communication management system 5 then reads, at each certain time interval (e.g., every 30 seconds), the latest (i.e., most recently stored) set of the viewable area information and the IP addresses from the sets of the viewable area information and the IP addresses stored in the viewable area management DB 5003 (step S113). Then, the transmitting and receiving unit 51 distributes (i.e., transmits) the viewable area information including the IP addresses read at step S113 to the other communication terminals (i.e., the video conference terminal 3*a*, the smartphone 9, and the PC 7) participating in the video call participated by the video conference terminal 3*d* as the source of the viewable area information (steps S114, S117, and S120). Then, in the video conference terminal 3a, the transmitting and receiving unit 31a receives the viewable area information. Further, the storing and reading unit 39a stores the viewable area information and the IP addresses received at step S114 in the viewable area management DB 3003a in association with each other (step S115). Similarly, in the smartphone 9, the transmitting and receiving unit 91 receives the viewable area information, and the storing and reading unit 99 stores the viewable area information and the IP addresses received at step S117 in the viewable area management DB 9003 in association with each other (step S118). Further, in the PC 7, the transmitting and receiving unit 71 receives the viewable area information, and the storing and reading unit 79 stores the viewable area information and the IP addresses received at step S120 in the viewable area management DB 7003 in association with each other (step S121). Then, the video conference terminal 3a performs a process of setting the operation state, i.e., the state of a user operation performed on the displayed image (step S116).

The process of setting the operation state of the displayed image will be described with FIG. 31.

Figure 31:
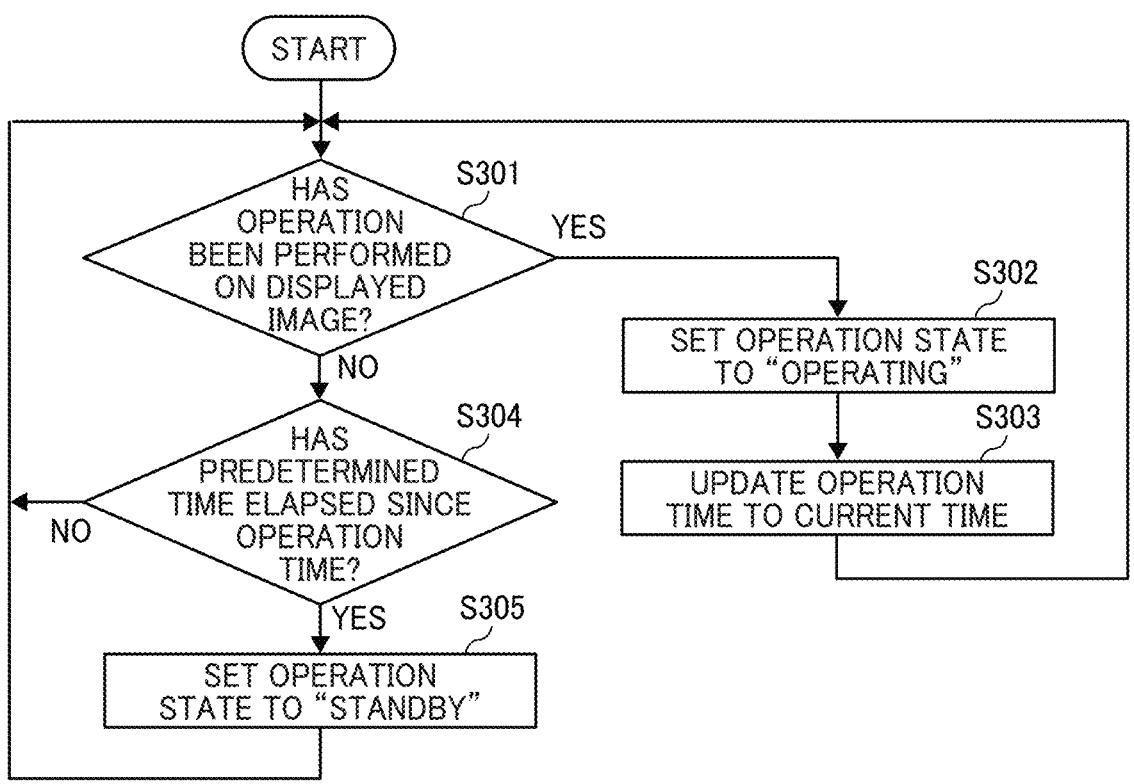
FIG. 31 is a flowchart illustrating an operation state setting process performed in each of communication terminals of the image communication system.

FIG. 31 is a flowchart illustrating a process performed in each of the communication terminals to set the operation state of the displayed image. The determination unit 35a of the video conference terminal 3a first determines whether the user operation (e.g., a viewing operation) has been performed on the displayed image of a given omnidirectional image during the communication session (step S301). For example, the determination unit 35a determines whether a user has performed, via the operation buttons 308, an operation such as scrolling, zooming-in, or zooming-out on the viewable area image displayed on the display 4a (an example of a first viewable area image) corresponding to an area forming a part of the target omnidirectional image (an example of a first viewable area).

If it is determined at step S301 that the operation has been performed on the displayed image (YES at step S301), the storing and reading unit 39a accesses the operation state management DB 3004a, and sets the operation state to "OPERATING" for the viewable area image as an area forming a part of the target omnidirectional image (step S302).

The storing and reading unit 39a then updates the operation time to the current time in the operation state management DB 3004a (step S303), and the video conference terminal 3a returns to the process of step S301.

If it is determined at step S301 that the operation has not been performed on the displayed image (NO at step S301), the determination unit 35a determines whether a predetermined time has elapsed since the operation time of the last execution of the operation on the displayed image (step S304). As an example of a method of determining whether the predetermined time has elapsed since the last execution of the operation, the determination unit 35a may acquire the operation time from the operation state management DB 3004a and calculate the elapsed time between the operation time and the current time.

If it is determined at step S304 that the elapsed time is shorter than a predetermined time (NO at step S304), the video conference terminal 3a returns to the process of step S301. If it is determined at step S304 that the elapsed time is equal to or longer than the predetermined time (YES at step S304), the storing and reading unit 39a sets the operation state managed in the operation state management DB 3004a to "STANDBY" In the present example, the predetermined time is set to three seconds, for example. However, the predetermined time is not limited thereto. The predetermined time may be preset in the storage unit 3000a before factory shipment of the video conference terminal 3a, or may be set therein or changed after the factory shipment.

Each of the communication terminals participating in the communication session regularly executes the procedure of FIG. 31 on each omnidirectional image shared by the other communication terminals.

The smartphone 9 and the PC 7 also perform a process similar to that of step S116 in FIG. 30 (steps S119 and S122). When the communication terminal performing this process is the smartphone 9, the determination unit 95 determines whether a user has performed an operation such as swiping, flicking, pinching-in, or pinching-out on the displayed image.

With the above-described process, the viewable area information representing the viewable area image changed at the site D is transmitted to the communication terminals at the other sites A, B, and C, which are participating in the video call participated by the communication terminal at the site D. Thereby, the viewable area information representing the viewable area image being displayed at the site D is shared at the other sites A. B. and C. This process is similarly performed at the other sites A, B, and C when the viewable area image is changed thereat. When a plurality of communication terminals at a plurality of sites are participating in the same video call, therefore, the viewable area information representing the viewable area image being displayed by one of the communication terminals at the sites is shared by the communication terminals at the other sites.

A process of setting the display control right will be described with FIGS. 32 and 33.

Figure 32:
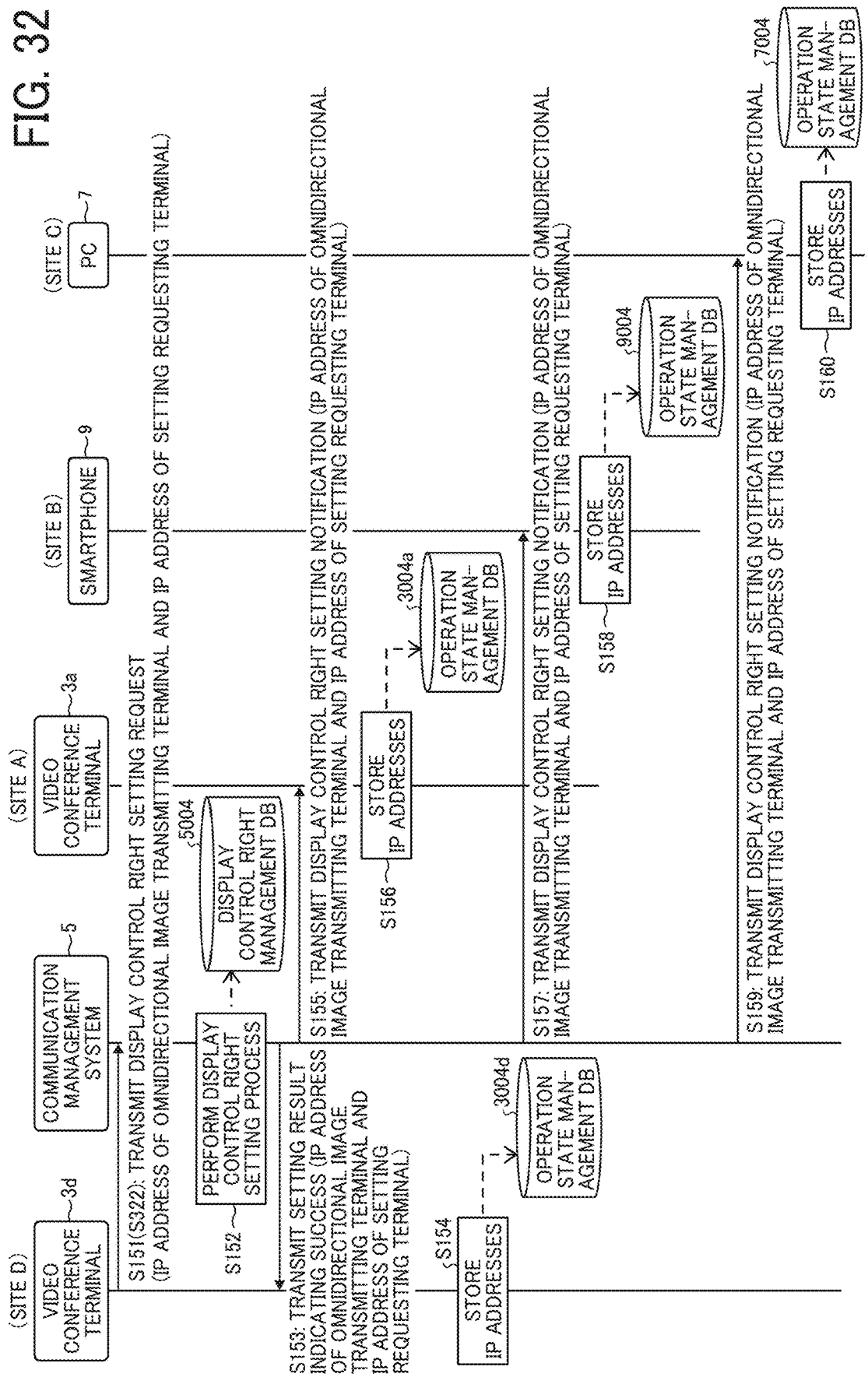
FIG. 32 is a sequence diagram illustrating a successful example of a display control right setting process performed in the image communication system.

FIG. 32 is a sequence diagram illustrating a successful example of the process of setting the display control right. FIG. 33 is a sequence diagram illustrating a failed example of the process of setting the display control right. It is assumed in the following description that the video conference terminal 3d requests the communication management system 5 to set the display control right for the video conference terminal 3d.

A successful example of the process of setting the display control right will first be described with FIG. 32.

As illustrated in FIG. 32, the transmitting and receiving unit 31d of the video conference terminal 3d transmits a display control right setting request to the communication management system 5 in accordance with the operation state (i.e., "OPERATING") of the user operation on the displayed image (step S151). The process of step S151 corresponds to a later-described process of step S322 in FIG. 41. The display control right setting request includes the IP address of the video conference terminal 3a and the IP address of the video conference terminal 3d. Herein, the video conference terminal 3a is the transmitter terminal that transmits the captured image data corresponding to the omnidirectional image, and the video conference terminal 3d is the transmitter terminal that transmits the display control right setting request. Then, the transmitting and receiving unit 51 of the communication management system 5 receives the display control right setting request.

In the communication management system 5, the storing and reading unit 59 performs the process of setting the display control right (step S152). Specifically, the storing and reading unit 59 performs a search through the display control right management DB 5004 with a search key set to the IP address of the video conference terminal 3a (i.e., the transmitter terminal that transmits the captured image data corresponding to the omnidirectional image) received at step S151, to thereby retrieve the IP address of the display control right set terminal corresponding to the IP address of the video conference terminal 3a. If it is determined from the search that the IP address of the display control right set terminal corresponding to the IP address of the video conference terminal 3a is not managed (i.e., is absent) in the display control right management DB 5004, the storing and reading unit 59 stores the IP addresses received at step S151 in the display control right management DB 5004 in association with each other. Specifically, the storing and reading unit 59 stores the IP address of the video conference terminal 3a as the IP address of the omnidirectional image transmitting terminal, and stores the IP address of the video conference terminal 3d as the IP address of the display control right set terminal. Thereby, the display control right is set for the video conference terminal 3d.

The transmitting and receiving unit 51 of the communication management system 5 then transmits a setting result indicating the success of the display control right setting process to the video conference terminal 3d, which has transmitted the display control right setting request (step S153). Then, the transmitting and receiving unit 31d of the video conference terminal 3d receives the setting result indicating the success of the display control right setting process.

Then, in the video conference terminal 3d, the storing and reading unit 39d stores the IP addresses received at step S153 in the operation state management DB 3004d in association with each other (step S154). Specifically, the storing and reading unit 39d stores the IP address of the video conference terminal 3a as the IP address of the omnidirectional image transmitting terminal, and stores the IP address of the video conference terminal 3d as the IP address of the display control right set terminal. The video conference terminal 3d thereby manages, for each omnidirectional image, the information of the communication terminal set with the display control right for the omnidirectional image.

To notify the other communication terminals of the latest display control right set terminal, the transmitting and receiving unit 51 of the communication management system 5 transmits a display control right setting notification to each of the video conference terminal 3a, the smartphone 9, and the PC 7 (steps S155, S157, and S159). The display control right setting notification includes the IP address of the video conference terminal 3a (i.e., the transmitter terminal that transmits the captured image data corresponding to the omnidirectional image) and the IP address of the video conference terminal 3d (i.e., the transmitter terminal that transmits the display control right setting request) similarly as in the setting result transmitted at step S153. Then, the transmitting and receiving unit 31a of the video conference terminal 3a, the transmitting and receiving unit 91 of the smartphone 9, and the transmitting and receiving unit 71 of the PC 7 receive the display control right setting notification.

Then, in the video conference terminal 3a, the storing and reading unit 39a stores the IP addresses received at step S155 in the operation state management DB 3004a in association with each other (step S156). Specifically, the storing and reading unit 39a stores the IP address of the video conference terminal 3a as the IP address of the omnidirectional image transmitting terminal, and stores the IP address of the video conference terminal 3d as the IP address of the display control right set terminal. The video conference terminal 3a thereby manages, for each omnidirectional image, the information of the communication terminal set with the display control right for the omnidirectional image. The process of step S156 is similarly performed in the smartphone 9 and the PC 7 (steps S158 and S160).

A failed example of the display control right setting process will be described with FIG. 33.

Figure 33:
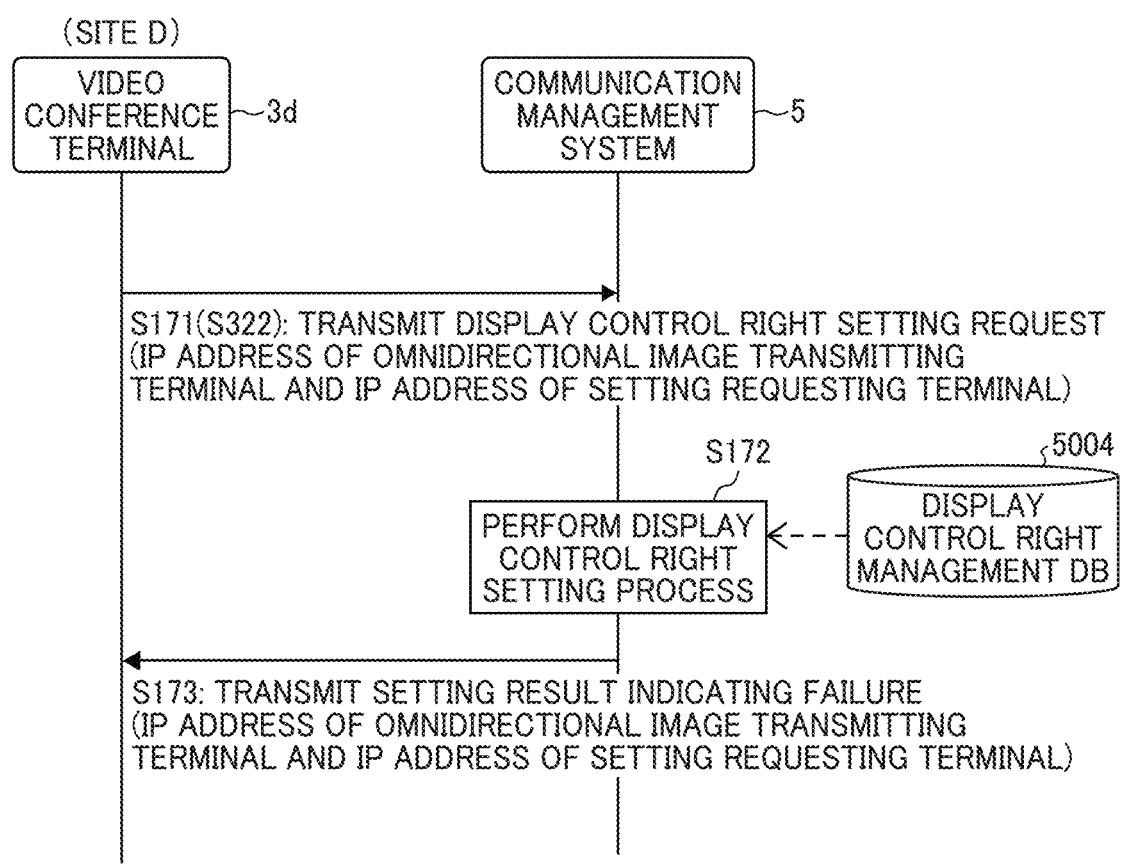
FIG. 33 is a sequence diagram illustrating a failed example of the display control right setting process performed in the image communication system.

As illustrated in FIG. 33, the transmitting and receiving unit 31d of the video conference terminal 3d transmits the display control right setting request to the communication management system 5 in response to the user operation on the displayed image (step S171). The process of step S171 corresponds to a later-described process of step S322 in FIG. 41, and is similar to the process of step S151. Then, the transmitting and receiving unit 51 of the communication management system 5 receives the display control right setting request.

Then, in the communication management system 5, the storing and reading unit 59 performs the display control right setting process (step S172). Specifically, the storing and reading unit 59 performs a search through the display control right management DB 5004 by with a search key set to the IP address of the video conference terminal 3a (i.e., the transmitter terminal that transmits the captured image data corresponding to the omnidirectional image) received at step S171, to thereby retrieve the IP address of the display control right set terminal corresponding to the IP address of the video conference terminal 3a. If it is determined from the search that the IP address of the display control right set terminal corresponding to the IP address of the video conference terminal 3a is managed (i.e., present) in the display control right management DB 5004, the storing and reading unit 59 does not store the IP addresses received at step S171 in the display control right management DB 5004 in association with each other. Specifically, the storing and reading unit 59 does not overwrite the IP addresses managed in the display control right management DB 5004 with the newly received IP addresses of the video conference terminals 3a and 3d as the IP address of the omnidirectional image transmitting terminal and the IP address of the display control right set terminal. That is, when the display control right is already set for a particular communication terminal, the communication management system 5 does not newly set the display control right for another communication terminal, unless the setting of the display control right is cancelled as described later.

Then, the transmitting and receiving unit 51 of the communication management system 5 transmits a setting result indicating the failure of the display control right setting process to the video conference terminal 3d, which has transmitted the display control right setting request (step S173). The setting result includes the IP address of the video conference terminal 3a (i.e., the transmitter terminal that transmits the captured image data corresponding to the omnidirectional image) and the IP address of the video conference terminal 3d (i.e., the transmitter terminal that transmits the display control right setting request) similarly as in the display control right setting request transmitted at step S171. Then, the transmitting and receiving unit 31d of the video conference terminal 3d receives the setting result indicating the failure of the display control right setting process. Thereby, the video conference terminal 3d fails to be set with the display control right.

A process of canceling the setting of the display control right (hereinafter referred to as the display control right cancellation process) will be described with FIG. 34. The following description will be given of an example in which the video conference terminal 3*d* requests the communication management system 5 to cancel the setting of the display control right.

Figure 34:
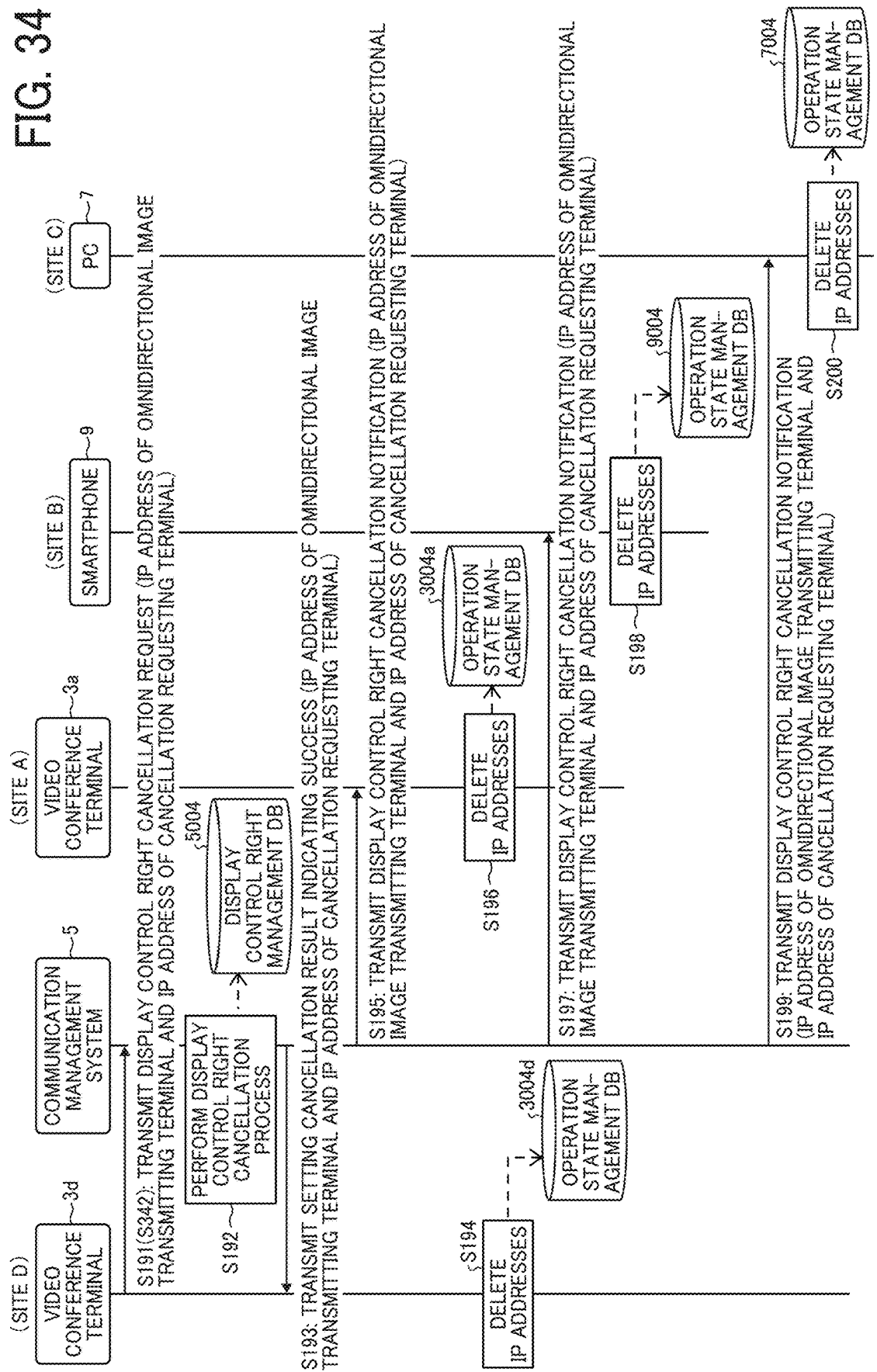
FIG. 34 is a sequence diagram illustrating a display control right cancellation process performed in the image communication system.

FIG. 34 is a sequence diagram illustrating the display control right cancellation process. As illustrated in FIG. 34, the transmitting and receiving unit 31*d* of the video conference terminal 3*d* transmits a request to cancel the setting of the display control right (hereinafter referred to as the display control right cancellation request) to the communication management system 5 in accordance with the operation state (i.e., "STANDBY") of the user operation on the displayed image (step S191). The process of step S191 corresponds to a later-described process of step S342 in FIG. 42. The display control right cancellation request includes the IP address of the video conference terminal 3*a* and the IP address of the video conference terminal 3*d*. Herein, the video conference terminal 3*a* is the transmitter terminal that transmits the captured image data corresponding to the omnidirectional image, and the video conference terminal 3*d* is the transmitter terminal that transmits the display control right cancellation request. Then, the transmitting and receiving unit 51 of the communication management system 5 receives the display control right cancellation request.

In the communication management system 5, the storing and reading unit 59 performs the display control right cancellation process (step S192). Specifically, the storing and reading unit 59 performs a search through the display control right management DB 5004 with a search key set to the IP address of the video conference terminal 3*a* (i.e., the transmitter terminal that transmits the captured image data corresponding to the omnidirectional image) received at step S191, to thereby retrieve the IP address of the display control right set terminal corresponding to the IP address of the video conference terminal 3*a*. If it is determined from the search that the IP address of the display control right set terminal corresponding to the IP address of the video conference terminal 3*a* is managed in the display control right management DB 5004, the storing and reading unit 59 deletes the managed IP address of the display control right set terminal. Thereby, the display control right set for the video conference terminal 3*d* is cancelled. If it is determined from the search that the IP address of the display control right set terminal corresponding to the IP address of the video conference terminal 3*a* is not managed (i.e., absent) in the display control right management DB 5004, the storing and reading unit 59 does not do anything. It is assumed in the following description that the managed IP address of the display control right set terminal is successfully deleted by the storing and reading unit 59.

The transmitting and receiving unit 51 of the communication management system 5 transmits a setting cancellation result indicating the success of the display control right cancellation process to the video conference terminal 3*d*, which has transmitted the display control right cancellation request (step S193). The setting cancellation result includes the IP address of the video conference terminal 3*a* (i.e., the transmitter terminal that transmits the captured image data corresponding to the omnidirectional image) and the IP address of the video conference terminal 3*d* (i.e., the transmitter terminal that transmits the display control right cancellation request) similarly as in the display control right cancellation request transmitted at step S191. Then, the transmitting and receiving unit 31*d* of the video conference terminal 3*d* receives the setting cancellation result indicating the success of the display control right cancellation process.

Then, the storing and reading unit 39*d* of the video conference terminal 3*d* deletes, from the operation state management DB 3004*d*, two IP addresses the same as the two IP addresses received at step S193 (step S194). The video conference terminal 3*d* thereby manages the information indicating that the video conference terminal 3*d* is not owning the display control right (i.e., not set with the display control right).

To notify the other communication terminals of the latest display control right cancelled terminal, the transmitting and receiving unit 51 of the communication management system 5 transmits a display control right cancellation notification to each of the video conference terminal 3*a*, the smartphone 9, and the PC 7 (steps S195, S197, and S199). The display control right cancellation notification includes the IP address of the video conference terminal 3*a* (i.e., the transmitter terminal that transmits the captured image data corresponding to the omnidirectional image) and the IP address of the video conference terminal 3*d* (i.e., the transmitter terminal that transmits the display control right cancellation request) similarly as in the setting cancellation result transmitted at step S193. Then, the transmitting and receiving unit 31*a* of the video conference terminal 3*a*, the transmitting and receiving unit 91 of the smartphone 9, and the transmitting and receiving unit 71 of the PC 7 receive the display control right cancellation notification.

Then, in the video conference terminal 3*a*, the storing and reading unit 39*a* deletes, from the operation state management DB 3004*a*, two IP addresses the same as the two IP addresses received at step S195 (step S196). The video conference terminal 3*a* thereby deletes, for each omnidirectional image, the information of the communication terminal set with the display control right for the omnidirectional image. The process of step S196 is similarly performed in the smartphone 9 and the PC 7 (steps S198 and S200).

With reference to FIGS. 35 to 40, a description will be given of a method for a communication terminal to display the display direction and the point of interest of the viewable area image being displayed by another communication terminal. Since each of the communication terminals performs the same process, the following description will be given of a process executed by the smartphone 9 at the site B as an example. Specifically, a description will be given of a process executed by the smartphone 9 at the site B when the captured image data transmitted from the video conference terminal 3*a* at the site A is being displayed by the video conference terminal 3*d* at the site D as the viewable area image and the viewable area information representing the viewable area image is transmitted from the video conference terminal 3*d* to the other communication terminals participating in the video call participated by the video conference terminal 3*d*.

Figure 35:
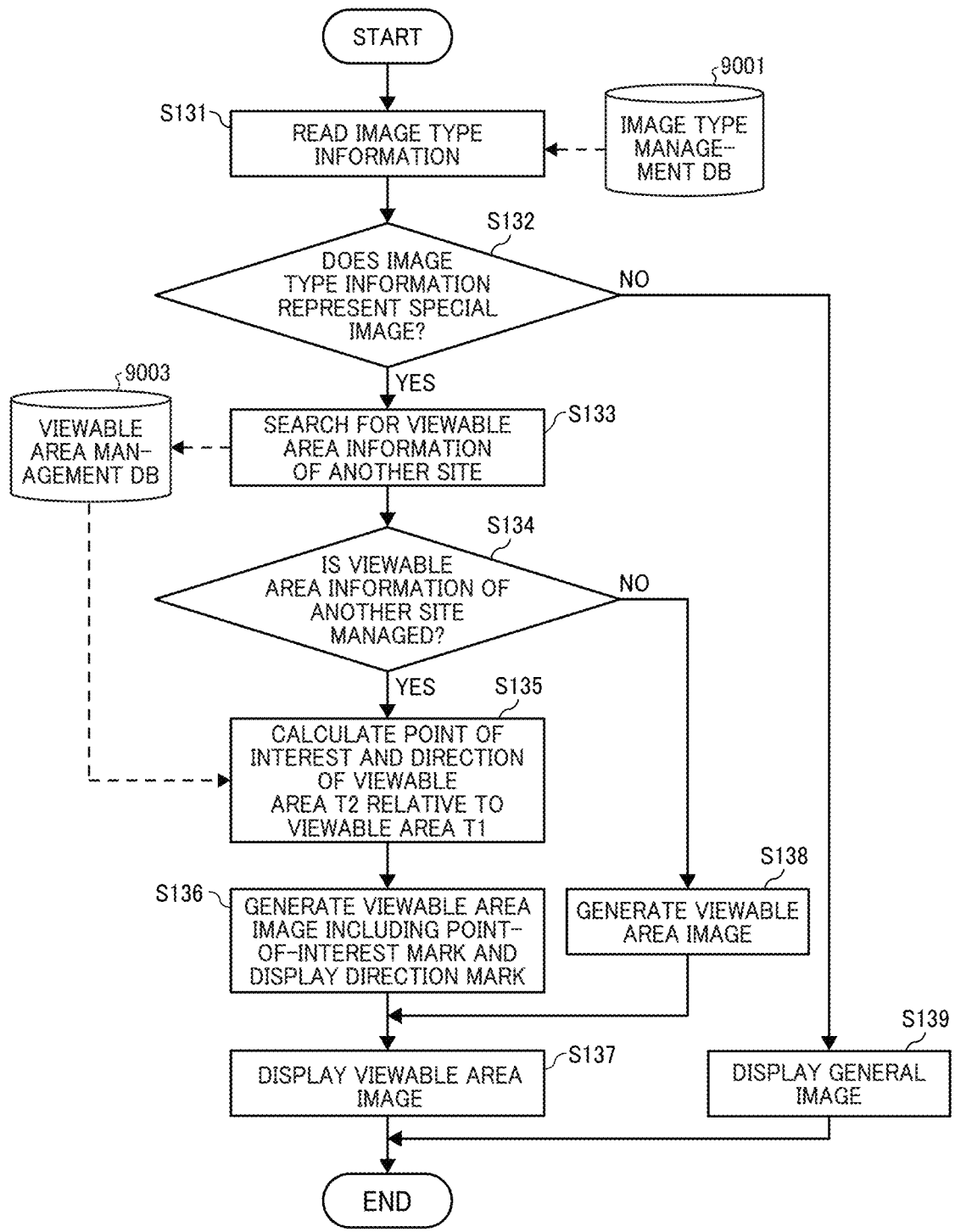
FIG. 35 is a flowchart illustrating a viewable area image display process performed the in the image communication system.

FIG. 35 is a flowchart illustrating a process of displaying the viewable area image. In the smartphone 9, the storing and reading unit 99 first performs a search through the image type management DB 9001 (see FIG. 16) with a search key set to the image data ID received at step S103 in FIG. 28, to thereby read from the image type management DB 9001 the image type information (i.e., the source name) corresponding to the image data ID (step S131).

Then, the determination unit 95 determines whether the image type information read at step S131 represents the special image (step S132). If it is determined that the image type information represents the special image (YES at step S132), the storing and reading unit 99 further searches through the viewable area management DB 9003 for the viewable area information representing the viewable area image being displayed by the communication terminal at another site (hereinafter simply referred to as the another communication terminal) (step S133). Then, the determination unit 95 determines whether the viewable area information representing the viewable area image being displayed by the another communication terminal is managed in the viewable area management DB 9003 (step S134). If it is determined that the viewable area information representing the viewable area image being displayed by the another communication terminal is managed in the viewable area management DB 9003 (YES at step S134), the calculation unit 97 calculates the position of the viewable area T2 relative to the position of the viewable area T1 in the whole image based on the viewable area information i1 and the viewable area information i2 (step S135). Herein, the viewable area information i1 represents the viewable area image of the viewable area T1 being displayed by the smartphone 9. Further, the viewable area information i2 represents the viewable area image of the viewable area T2 received from the another communication terminal by the transmitting and receiving unit 91 and managed in the viewable area management DB 9003. Technically, in this case, the position of the viewable area T2 relative to the position of the viewable area T1 corresponds to the point of interest of the viewable area T2 relative to the point of interest of the viewable area T1. Herein, the point of interest of a viewable area is the center point of the viewable area, as described above, but may be a rectangular upper-left, lower-left, upper-right, or lower right portion of the viewable area. Alternatively, the point of interest of a viewable area may be a particular point in the viewable area.

A method of calculating the point of interest of the viewable area T2 relative to the point of interest of the viewable area T1 in the whole image will be described with FIGS. 36A and 36B.

Figure 36B:
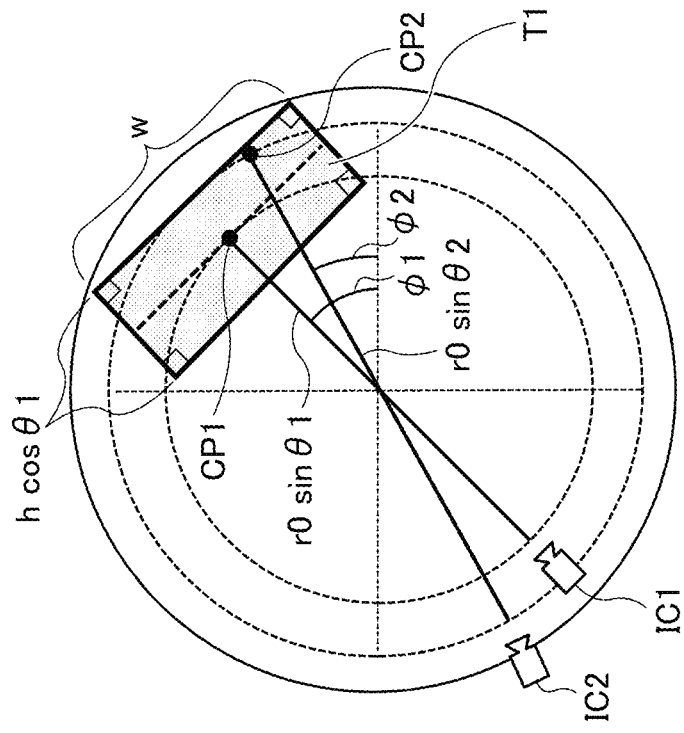
FIGS. 36A and 36B are diagrams illustrating a method of deriving the position of a point of interest at one site in the viewable area image at another site in the image communication system.
Figure 36A:
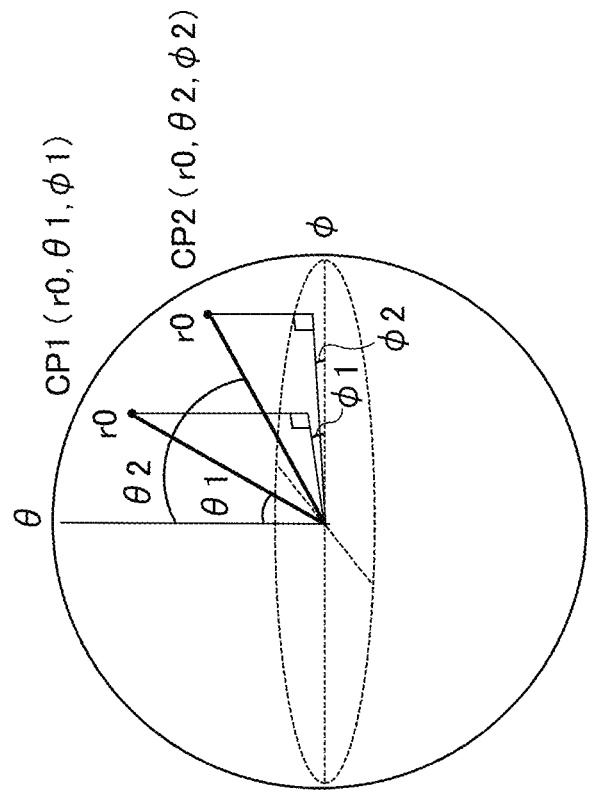

FIG. 36A is a diagram illustrating the respective definitions of the angle of a virtual camera IC1 corresponding to the viewable area image of the viewable area T1 being displayed by the smartphone 9 and the angle of a virtual camera IC2 corresponding to the viewable area image of the viewable area T2 received from the another communication terminal. FIG. 36B is a diagram illustrating a method of calculating the position of the point of interest of the viewable area image being displayed by the another communication terminal in the viewable area image being displayed by the smartphone 9, as viewed from above in parallel projection.

As illustrated in FIG. 36A, the calculation unit 97 acquires the radius vector r, the polar angle $\theta$, and the azimuth $\varphi$ from the viewable area information i1 representing the viewable area image being displayed by the display control unit 94 of the smartphone 9, and determines the acquired radius vector r, polar angle $\theta$, and azimuth $\varphi$ as a point of interest CP1 (r0, $\theta$1, $\varphi$1). The calculation unit 97 then acquires the radius vector r, the polar angle $\theta$, and the azimuth $\varphi$ from the viewable area information i2 of the another communication terminal read at step S133, and determines the acquired radius vector r, polar angle $\theta$, and azimuth $\varphi$ as a point of interest CP2 (r0, $\theta$2, $\varphi$2).

When the viewable area T1 of the smartphone 9 centering around the point of interest CPI has a width w and a height h, the viewable area T1 parallel-projected in the poloidal direction as in FIG. 36B has the width w and a height h cos $\theta$1.

Further, through the projection, the radius r of the point of interest CP1 is changed to r0 sin $\theta$1, and the radius r of the point of interest CP2 is changed to r0 sin $\theta$2. Therefore, the point of interest CP is positioned at coordinates (r0 sin $\theta$1·r0 cos $\varphi$1, r0 sin $\theta$1·r0 sin $\varphi$1), and the point of interest CP2 is positioned at coordinates (r0 sin $\theta$2·r0 cos $\varphi$2, r0 sin $\theta$2·r0 cos $\varphi$2).

With the above-described method, the coordinates of the point of interest CP1 and the coordinates of the point of interest CP2 are derived as illustrated in FIG. 36B. The position of the point of interest CP2 on the plane of the viewable area T1 with the width w and the height h is thus derived through commonly-used coordinate conversion.

A method of calculating the direction of the viewable area T2 relative to the direction of the viewable area T1 in the whole image will be described with FIGS. 37A and 37B.

Figure 37B:
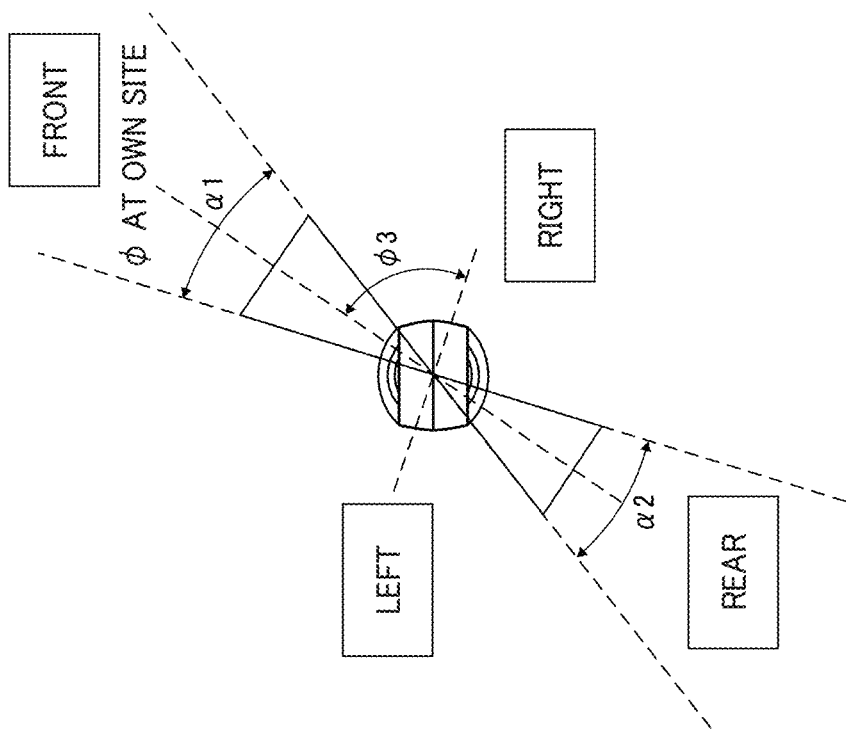
FIG. 37B is a diagram illustrating respective definitions of angle ranges used in the method.
Figure 37A:
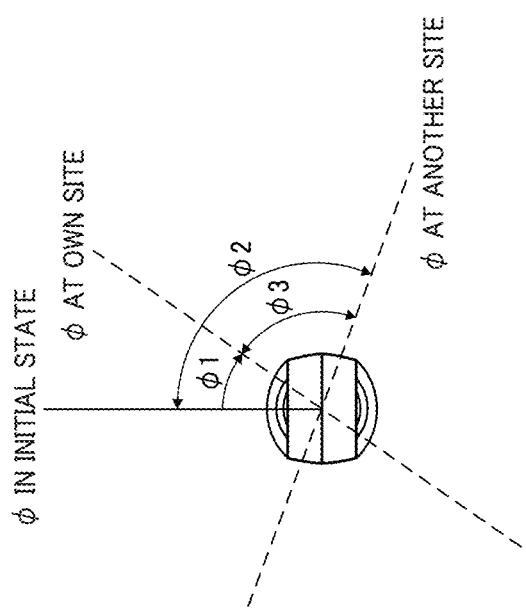
FIG. 37A is a diagram illustrating respective definitions of angles used in the method.

FIG. 37A is a diagram illustrating respective definitions of angles used in the method. The FIG. 37B is a diagram illustrating respective definitions of angle ranges used in the method. As illustrated in FIG. 37A, the calculation unit 97 acquires the azimuth $\varphi$ from the viewable area information i1 representing the viewable area image being displayed by the display control unit 94 of the smartphone 9 at the site B, and determines the acquired azimuth $\varphi$ as the rotation angle $\varphi$1. The calculation unit 97 then acquires the azimuth $\varphi$ from the viewable area information i2 of the another communication terminal at the another site read at step S133, and determines the acquired azimuth (pas the rotation angle $\varphi$2. The calculation unit 97 further determines the difference between the rotation angle $\varphi$2 and the rotation angle $\varphi$1 as the rotation angle $\varphi$3.

Further, as illustrated in FIG. 37B, when an angle range around the rotation angle $\varphi$ of the smartphone 9 at the site B is represented as al and an angle range around an angle 180 degrees from the horizontal angle of the smartphone 9 is represented as $\alpha$2, the calculation unit 97 calculates the direction of the viewable area T2 relative to the direction of the viewable area T1 in the whole image in accordance with the following method.

If the rotation angle $\varphi$3 is included in the angle range $\alpha$1, the direction of the viewable area T2 relative to the direction of the viewable area T1 is determined as front. If the rotation angle $\varphi$3 is included in the angle range $\alpha$2, the direction of the viewable area T2 relative to the direction of the viewable area T1 is determined as rear. If the rotation angle $\varphi$3 is not included in the angle range $\alpha$1 or $\alpha$2, and is greater than 0 degrees and equal to or less than 180 degrees, the direction of the viewable area T2 relative to the direction of the viewable area T1 is determined as right. If the rotation angle $\varphi$3 is not included in the angle range $\alpha$1 or $\alpha$2, and is greater than 180 degrees and equal to or less than 360 degrees, the direction of the viewable area T2 relative to the direction of the viewable area T1 is determined as left.

The image and audio processing unit 93 then generates the viewable area image including a point-of-interest mark and a display direction mark (step S136). Herein, the point-of-interest mark represents the point of interest calculated by the calculation unit 97, and the display direction mark represents the direction calculated by the calculation unit 97. The display position of the point-of-interest mark is directly calculated from the position of the viewable area T2 relative to the position of the viewable area T1 in the whole image. The display position of the display direction mark is calculated in accordance with the above-described method with the position of the viewable area T2 relative to the position of the viewable area T1 in the whole image.

Figure 38A:
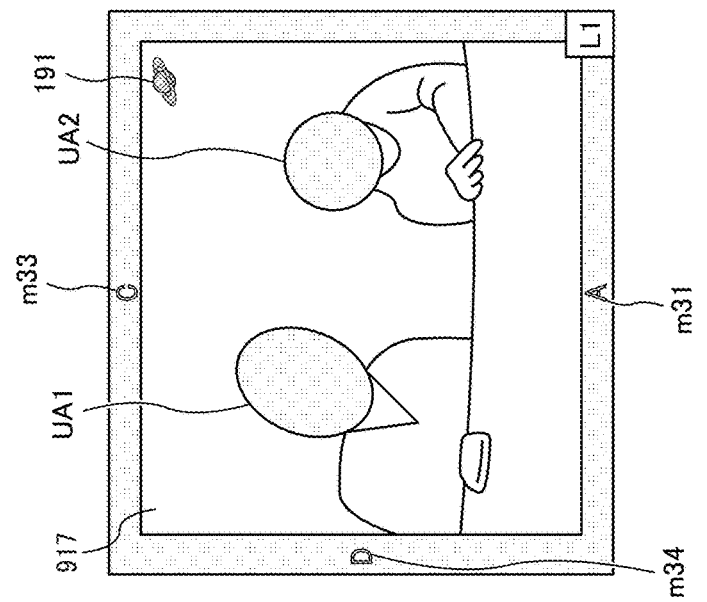
FIGS. 38A, 38B, and 38C are diagrams illustrating display examples of the viewable area image with display direction marks displayed in a main display area on the display of the smartphone.
Figure 38B:
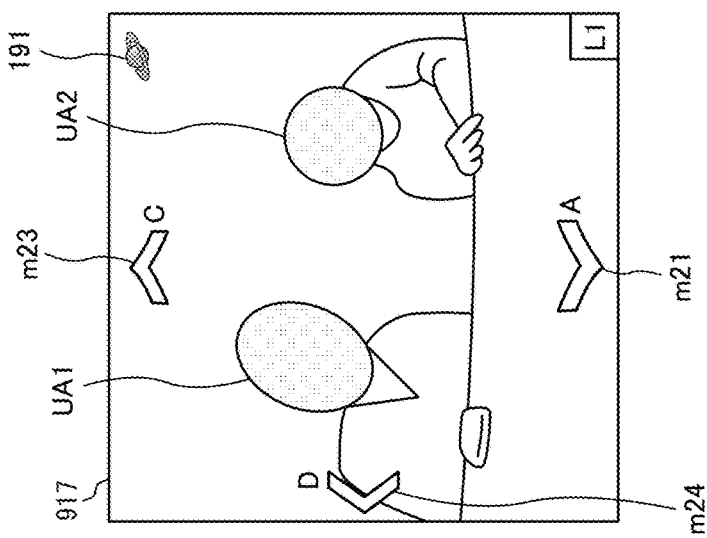
Figure 38C:
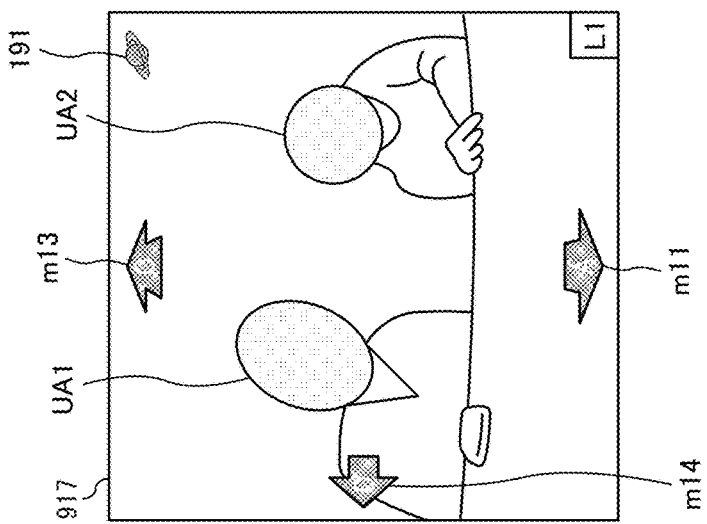
Figure 39B:
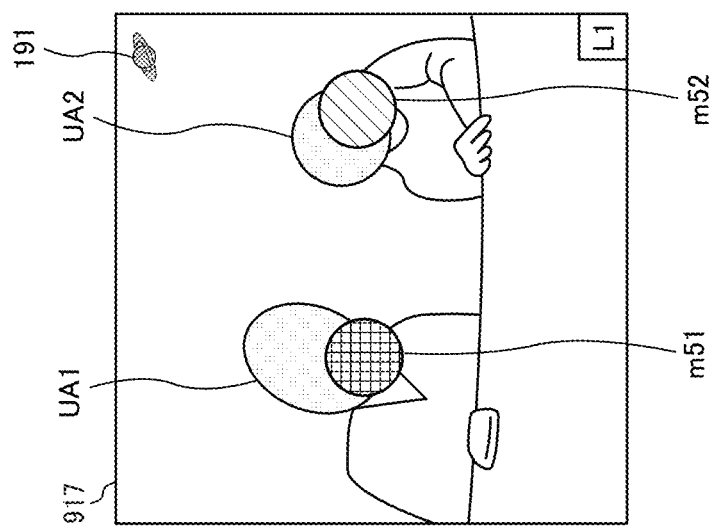
FIGS. 39A and 39B are diagrams illustrating display examples of the viewable area image with point-of-interest marks displayed in the main display area on the display of the smartphone.
Figure 39A:
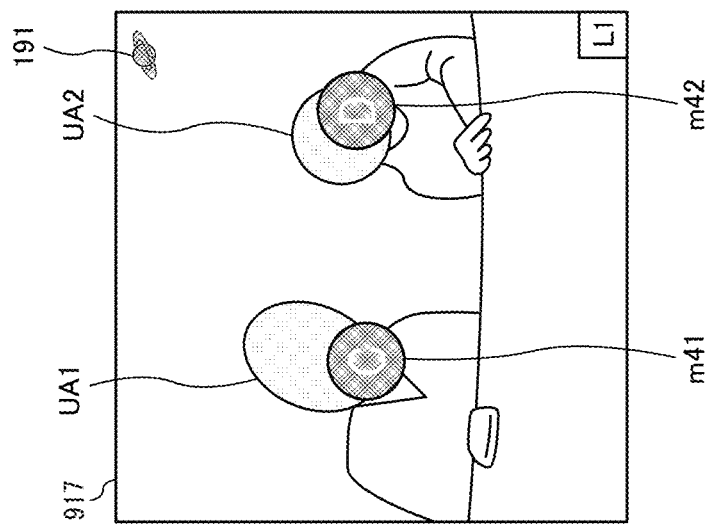
Figure 40:
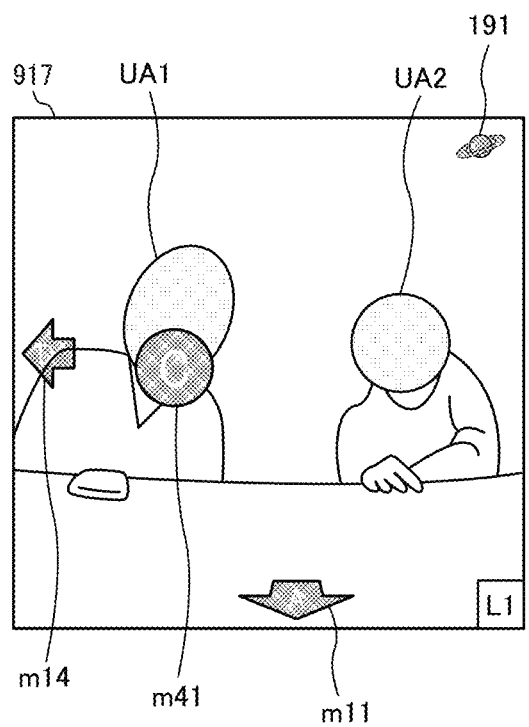
FIG. 40 is a diagram illustrating a display example of the viewable area image with display direction marks and a point-of-interest mark displayed in the main display area on the display of the smartphone.

In this process, based on the image type information representing the special image, the image and audio processing unit 93 combines the viewable area image with the omnidirectional image icon 191 or 192, which indicates that the viewable area image is based on the omnidirectional image. Then, as illustrated in FIGS. 38A, 38B, and 38C, FIGS. 39A and 39B, and FIG. 40, the display control unit 94 displays the viewable area image generated at step S136 (step S137). FIGS. 38A, 38B, and 38C are diagrams illustrating three display examples of the viewable area image displayed in the main display area with display direction marks. FIGS. 39A and 39B are diagrams illustrating two display examples of the viewable area image displayed in the main display area with point-of-interest marks. FIG. 40 is a diagram illustrating a display example of the viewable area image displayed in the main display area with a point-of-interest mark and display direction marks. Although the images of all of the sites A to D participating in the video call are actually displayed on the display 917, as illustrated in FIGS. 29A, 29B, and 29C, each of the images illustrated in FIGS. 38A, 38B, and 38C, FIGS. 39A and 39B, and FIG. 40 is limited to the image of the site A owing to the limitation in space of the drawings.

As illustrated in FIG. 38A, display direction marks m11, m13, and m14 are displayed in the viewable area image as apart of the image of the site A. The direction marks m11, m13, and m14 represent the respective directions of the viewable area images being displayed at the other sites A. C, and D relative to the direction of the viewable area image of the whole image being displayed at the site B. Display direction marks m21, m23, and m24 illustrated in FIG. 38B and display direction marks m31, m33, and m34 illustrated in FIG. 38C correspond to the display direction marks m11, m13, and m14 in FIG. 38A, respectively.

The display direction mark is an example of direction information, and may be displayed in other forms than the display direction marks m11, m13, m14, m21, m23, m24, m31, m33, and m34. Further, the direction information may be expressed not as an arrow but as text such as "RIGHT," "LEFT," "BACK," and "FRONT"

Further, as illustrated in FIG. 39A, point-of-interest marks m41 and m42 are displayed in the viewable area image as a part of the image of the site A. The point-of-interest marks m41 and m42 represent the respective points of interest of the viewable area images being displayed at the other sites C and D relative to the point of interest of the viewable area image of the whole image being displayed at the site B. Point-of-interest marks m51 and m52 illustrated in FIG. 39B correspond to the point-of-interest marks m41 and m42 in FIG. 39A, respectively.

In FIG. 39A, the point-of-interest marks m41 and m42 include letters "C" and "D," respectively, which represent the respective corresponding site names to enable the users to identify the respective sites corresponding to the displayed points of interest. In FIG. 39B, on the other hand, different sites are represented by the point-of-interest marks m51 and m52 not with site names but with different patterns. In this case, a correspondence table between the patterns and the site names may be prepared at each of the sites A to D to enable the users to identify the sites from the patterns of the point-of-interest marks. The correspondence table may be printed on a sheet, or may be stored at each of the sites A to D as electronic data.

Further, the point-of-interest marks may be distinguished from each other by color or line type instead of pattern. Each of the point-of-interest marks is an example of corresponding position information.

In the example of FIG. 40, when the point of interest of the viewable area image being displayed at another site (e.g., the site C) is included in the viewable area image being displayed on the display 917, the point-of-interest mark representing the point of interest of the viewable area image at the another site (i.e., the point-of-interest mark m41 in this case) is displayed. Further, when the point of interest of the viewable area image being displayed at another site (e.g., the site A or D) is not included in the viewable area image being displayed on the display 917, the display direction mark representing the direction of the viewable area image at the another site (i.e., the display direction mark m11 or m14 in this case) is displayed.

Referring back to the procedure of FIG. 35, if it is determined at step S134 that the viewable area information representing the viewable area image being displayed by the another communication terminal is not managed in the viewable area management DB 9003 (NO at step S134), the image and audio processing unit 93 generates the viewable area image without including the point-of-interest mark or the display direction mark (step S138). Then, the procedure proceeds to the process of step S137.

Further, if it is determined at step S132 that the image type information read at step S131 does not represent the special image (NO at step S132), i.e., if the image type information represents the general image, the image and audio processing unit 93 does not generate the omnidirectional image from the captured image data received at step S103, and the display control unit 94 displays the general image (step S139).

With the above-described process, the users UB1 and UB2 at the site B are able to understand the relationship between the position of the viewable area image being displayed at the site B and the respective positions of the viewable area images being displayed at the other sites A, C, and D. The above-described process is therefore helpful in preventing the users UB1 and UB2 at the site B from losing track of the topic of a meeting, for example.

A process of requesting the setting of the display control right (hereinafter referred to as the display control right setting request process) performed in each of the communication terminals will be described with FIG. 41.

Figure 41:
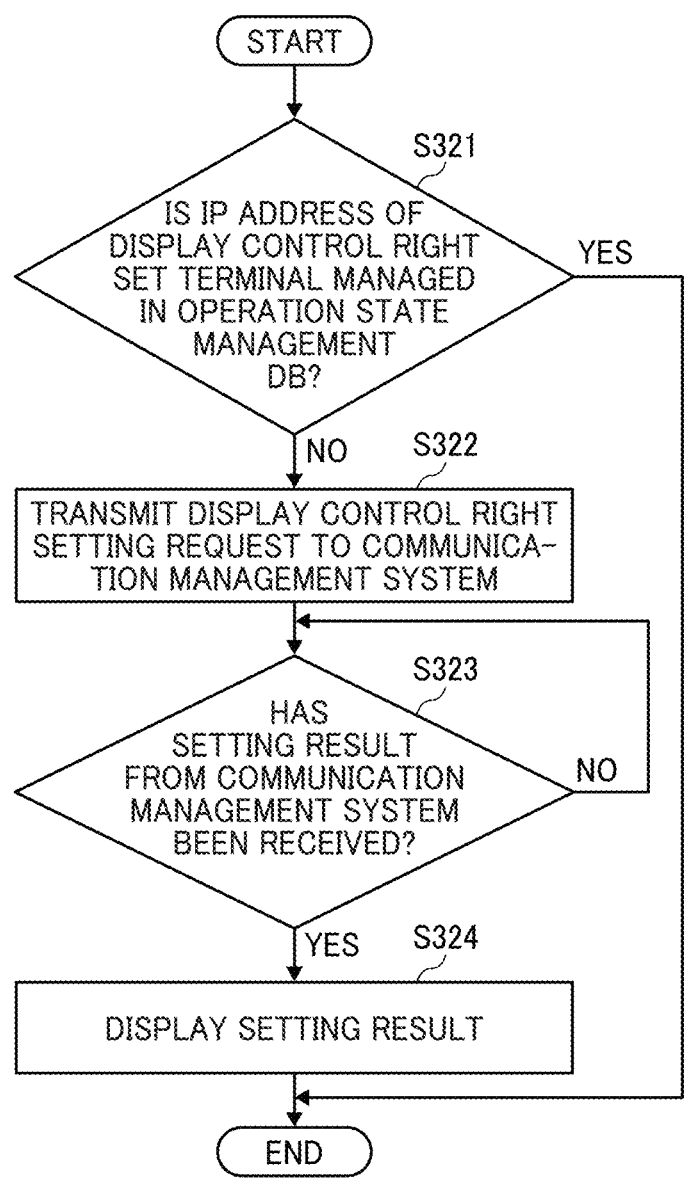
FIG. 41 is a flowchart illustrating a display control right setting request process performed in a communication terminal of the image communication system.

FIG. 41 is a flowchart illustrating the display control right setting request process performed in each of the communication terminals. This process is executed in response to transition of the operation state to "OPERATING" at step S302 in FIG. 31. In the following example, the video conference terminal 3d (an example of the communication terminal) transmits the display control right setting request.

The storing and reading unit 39d of the video conference terminal 3d first performs a search through the operation state management DB 3004d with a search key set to the IP address of the communication terminal having transmitted the omnidirectional image including the currently displayed viewable area image (an example of image sharing terminal identification information). Then, based on whether the IP address of the display control right set terminal (an example of display control terminal identification information) corresponding to the IP address of the communication terminal having transmitted the omnidirectional image is managed in the operation state management DB 3004d, the determination unit 35d determines whether the IP address of the display control right set terminal is managed in the operation state management DB 3004d (step S321). If it is determined that the IP address of the display control right set terminal is managed in the operation state management DB 3004d (YES at step S321), the process of FIG. 41 is completed.

If it is determined that the IP address of the display control right set terminal is not managed in the operation state management DB 3004d (NO at step S321), on the other hand, the transmitting and receiving unit 31d transmits the display control right setting request to the communication management system 5 (step S322). The process of step S322 corresponds to the process of step S151 in FIG. 32 and the process of step S171 in FIG. 33. The transmitting and receiving unit 31d then stands by until the setting result transmitted from the communication management system 5 at step S153 in FIG. 32 or step S173 in FIG. 33 is received (NO at step S323). Then, if the transmitting and receiving unit 31d receives the setting result transmitted from the communication management system 5 at step S153 in FIG. 32 or step S173 in FIG. 33 (YES at step S323), the display control unit 34d displays the setting result on the display 4d (step S324).

With the above-described process, if the operation state of the displayed image in a certain communication terminal (e.g., the video conference terminal 3d) transitions to "OPERATING," and if the display control right is not set for any of the other communication terminals participating in the video communication (i.e., communication session) participated by the certain communication terminal, the certain communication terminal is able to automatically transmit the display control right setting request.

A process of requesting the cancellation of the display control right (hereinafter referred to as the display control right cancellation request process) performed in each of the communication terminals will be described with FIG. 42.

Figure 42:
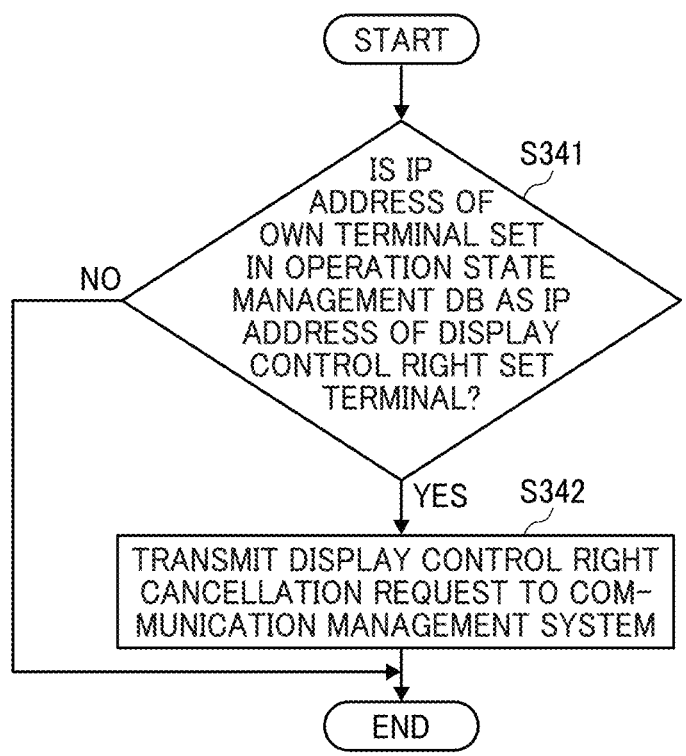
FIG. 42 is a flowchart illustrating a display control right cancellation request process performed in a communication terminal of the image communication system.

FIG. 42 is a flowchart illustrating the display control right cancellation request process performed in each of the communication terminals. This process is executed in response to transition of the operation state to "STANDBY" at step S305 in FIG. 31. In the following example, the video conference terminal 3d (an example of the communication terminal) transmits the display control right cancellation request.

The storing and reading unit 39d of the video conference terminal 3d first performs a search through the operation state management DB 3004d with a search key set to the IP address of the communication terminal having transmitted the omnidirectional image including the currently displayed viewable area image. Then, based on whether the IP address of the video conference terminal 3d is managed in the operation state management DB 3004d as the IP address of the display control right set terminal corresponding to the IP address of the communication terminal having transmitted the omnidirectional image, the determination unit 35d determines whether the IP address of the video conference terminal 3d is managed in the operation state management DB 3004d as the IP address of the display control right set terminal (step S341). If it is determined that the IP address of the video conference terminal 3d is not managed in the operation state management DB 3004d as the IP address of the display control right set terminal (NO at step S341), the process of FIG. 42 is completed.

If it is determined that the IP address of the video conference terminal 3d is managed in the operation state management DB 3004d as the IP address of the display control right set terminal (YES at step S341), on the other hand, the transmitting and receiving unit 31d transmits the display control right cancellation request to the communication management system 5 (step S342). The process of step S342 corresponds to the process of step S191 in FIG. 34.

With the above-described process, if the operation state of the displayed image in the communication terminal (e.g., the video conference terminal 3d) transitions to "STANDBY" in a video communication (i.e., communication session), and if the communication terminal is set with the display control right in the video communication, the communication terminal is able to automatically transmit the display control right cancellation request.

With FIG. 43, a description will be given of a process of controlling follow-up display of the viewable area image, which is performed in a communication terminal when the operation state thereof is "STANDBY."

Figure 43:
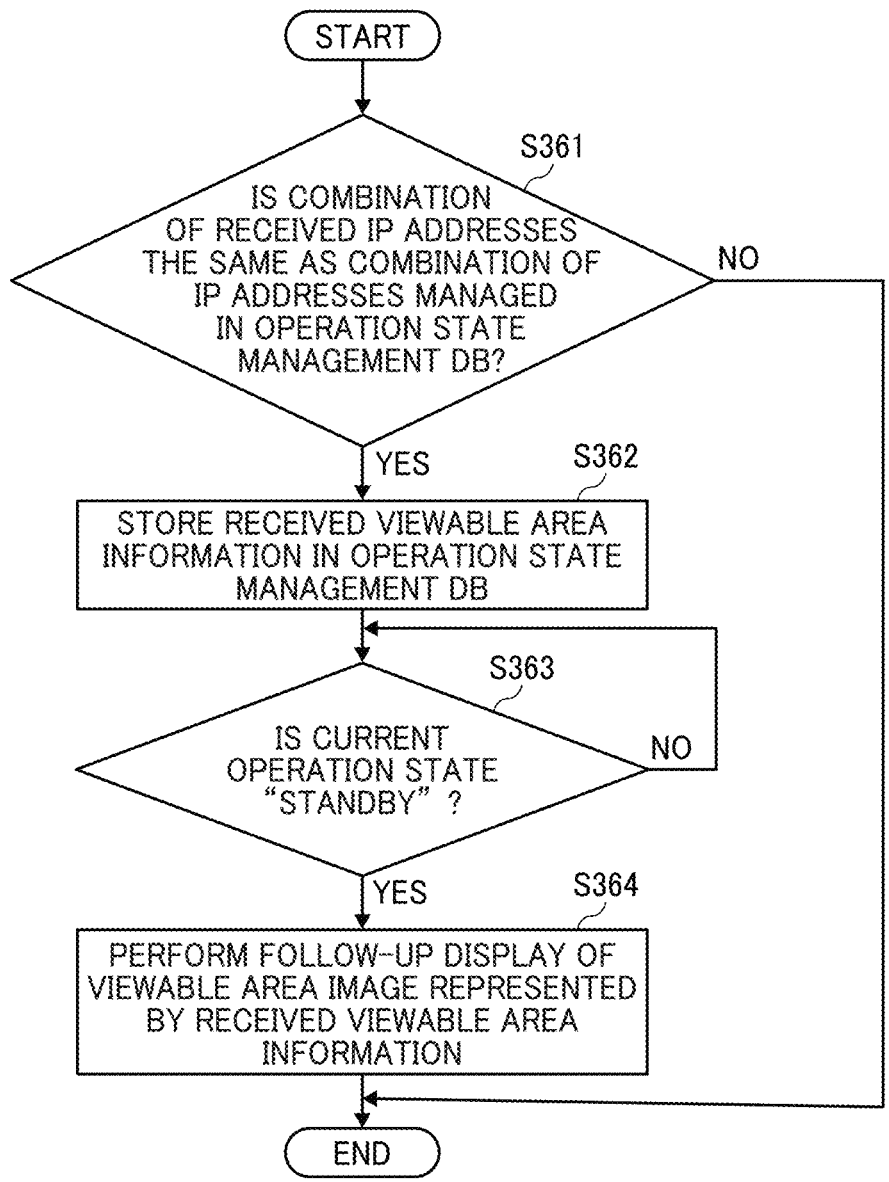
FIG. 43 is a flowchart illustrating a process of controlling follow-up display of the viewable area image performed in a communication terminal of the image communication system when the operation state of the communication terminal is a standby state.

FIG. 43 is a flowchart illustrating a process of controlling the follow-up display of the viewable area image, which is performed in a communication terminal when the operation state thereof is "STANDBY." It is assumed in the following description that the video conference terminal 3a (an example of the communication terminal) performs the follow-up display.

In the video conference terminal 3a, the determination unit 35a first determines whether the combination of IP addresses received at step S114 in FIG. 30, i.e., the combination of the IP address of the omnidirectional image transmitting terminal and the IP address of the viewable area information transmitting terminal, is the same as the combination of the IP address of the omnidirectional image transmitting terminal and the IP address of the viewable area information transmitting terminal managed in the operation state management DB 3004a (step S361). If it is determined that the combination of IP addresses received at step S114 is different from the combination of IP addresses managed in the operation state management DB 3004a (NO at step S361), the process of FIG. 43 is completed. Herein, the IP address of the omnidirectional image transmitting terminal is an example of image sharing terminal identification information.

If it is determined that the combination of IP addresses received at step S114 is the same as the combination of IP addresses managed in the operation state management DB 3004a (YES at step S361), the storing and reading unit 39a temporarily stores the viewable area information received at step S114 in the operation state management DB 3004a as pending parameters (step S362).

The determination unit 35a then determines whether the current operation state of the displayed image in the video conference terminal 3a is "STANDBY" (step S363). Specifically, the storing and reading unit 39a monitors the transition of the operation state in the operation state management DB 3004a, thereby enabling the determination unit 35a to make the determination on the operation state.

If the current operation state of the displayed image in the video conference terminal 3a is "STANDBY" (YES at step S363), the display control unit 34a performs the follow-up display on the display 4a by switching the currently displayed viewable area image (i.e., the first viewable area image) to the viewable area image represented by the viewable area information received at step S114 (an example of a second viewable area image) corresponding to an area forming a part of the omnidirectional image (an example of a second viewable area) (step S364). If the current operation state of the displayed image in the video conference terminal 3a is not "STANDBY" but is "OPERATING" (NO at step S363), on the other hand, the display control unit 34a gives priority to the operation being performed on the displayed image by the video conference terminal 3a, without performing the follow-up display of displaying, on the display 4a, the viewable area image represented by the viewable area information received at step S114.

With the above-described process, if a communication terminal is not performing an operation on the displayed image at the time of receipt of the viewable area information from another communication terminal, the communication terminal performs the follow-up display of the viewable area image based on the received viewable area information. When a communication terminal is performing an operation on the displayed image at the time of receipt of the viewable area information from another communication terminal, on the other hand, the communication terminal gives priority to the operation currently performed on the displayed image by the communication terminal, without performing the follow-up display of the viewable area image based on the received viewable area information.

With FIG. 44, a description will be given of a process of controlling the follow-up display of the viewable area image, which is performed in a communication terminal when the operation state thereof transitions from "OPERATING" to "STANDBY."

Figure 44:
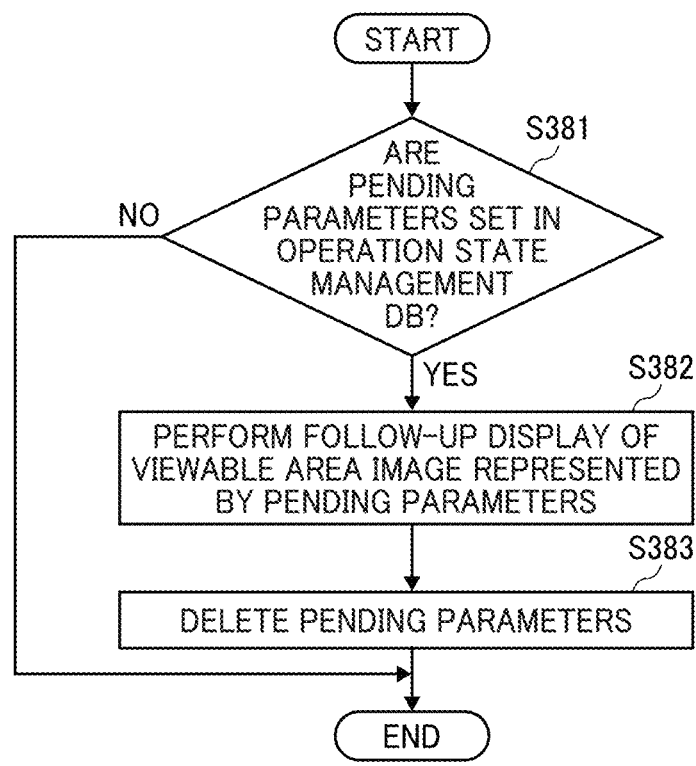
FIG. 44 is a flowchart illustrating a process of controlling follow-up display of the viewable area image performed in a communication terminal of the image communication system in response to transition of the operation state of the communication terminal to the standby state from an operating state.

FIG. 44 is a flowchart illustrating a process of controlling the follow-up display of the viewable area image, which is performed in a communication terminal when the operation state thereof transitions from "OPERATING" to "STANDBY." This process is executed in response to transition of the operation state to "STANDBY" at step S305 in FIG. 31. It is assumed in the following description that the video conference terminal 3a (an example of the communication terminal) performs the follow-up display.

The storing and reading unit 39a of the video conference terminal 3a first performs a search through the operation state management DB 3004a with a search key set to the IP address of the communication terminal having transmitted the omnidirectional image including the currently displayed viewable area image. Then, based on whether the pending parameters (i.e., the viewable area information) corresponding to the IP address of the communication terminal is managed in the operation state management DB 3004a, the determination unit 35a determines whether the pending parameters are set in the operation state management DB 3004a (step S381). If the pending parameters are not set in the operation state management DB 3004a (NO at step S381), the process of FIG. 44 is completed.

If the pending parameters are set in the operation state management DB 3004a (YES at step S381), on the other hand, the display control unit 34a performs the follow-up display on the display 4a by switching the currently displayed viewable area image (i.e., the first viewable area image) to the viewable area image represented by the pending parameters (an example of the second viewable area image) (step S382). Then, the storing and reading unit 39a deletes, from the operation state management DB 3004a, the pending parameters used in the follow-up display (step S383).

With the above-described process, in response to completion of the operation on the displayed image by the video conference terminal 3a, i.e., the operation to which priority is given in the process of FIG. 43, the follow-up display is performed to display the viewable area image represented by the already-received pending parameters (i.e., viewable area information).

As described above, the first embodiment reduces the restriction on the degree of freedom in display in the communication terminal. Specifically, a communication terminal (e.g., the video conference terminal 3a) is capable of displaying, in the appropriate priority order, the viewable area image based on the operation thereof and the viewable area image based on the viewable area information transmitted from another communication terminal.

Further, a communication terminal (e.g., the video conference terminal 3a) is capable of generating the omnidirectional image based on the image data ID transmitted thereto together with the image data, depending on the corresponding image type information, and is further capable of generating the viewable area image from the omnidirectional image. Thereby, the direct display of the front and rear hemispherical images as illustrated in FIG. 29A is prevented.

Further, the first embodiment enables a user at one site to recognize which part of the whole image of the omnidirectional image is being displayed at another site as the viewable area image, helping the user to follow the currently discussed topic of a meeting, for example.

Further, in the example of FIG. 30, if the communication management system 5 forwards the viewable area information from one communication terminal (e.g., the video conference terminal 3d) to another communication terminal each time the communication management system 5 receives the viewable area information from the one communication terminal, flickering of the point-of-interest mark m41 and the display direction marks m11 and m14 may distract the users UB1 and UB 2 from focusing on the video call. As in the foregoing description of steps S112 to S114 in FIG. 30, therefore, the communication management system 5 distributes the latest set of the viewable area image and the IP addresses at each certain time interval, thereby allowing the users UB1 and UB 2 to focus on the video call.

A second embodiment of the present invention will be described with FIG. 45.

Figure 45:
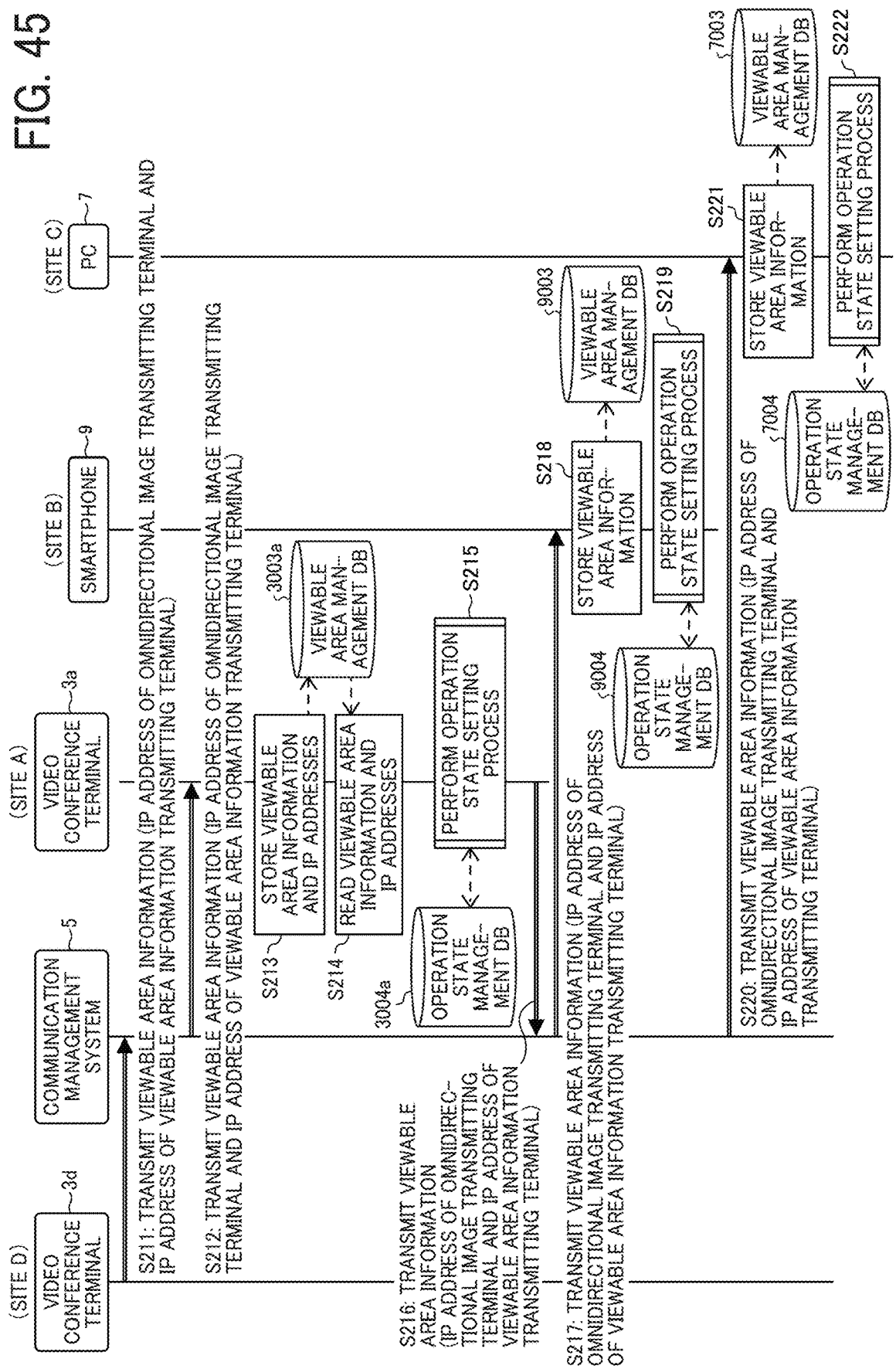
FIG. 45 is a sequence diagram illustrating a viewable area information sharing process of a second embodiment of the present invention.

FIG. 45 is a sequence diagram illustrating another example of the process illustrated in FIG. 30, i.e., another process of sharing the viewable area information.

As illustrated in FIG. 30, in the above-described first embodiment, the communication management system 5 temporarily manages the viewable area information transmitted from each of the communication terminals (step S112), and transmits, at each certain time interval, the viewable area information to each of the communication terminals other than the communication terminal that transmits the viewable area information (steps S114 to S122).

In the second embodiment, on the other hand, the above-described operation is performed by the communication terminal that transmits the captured image data (i.e., the video conference terminal 3a in the present example) in place of the communication management system 5, as illustrated in FIG. 45. That is, the communication terminal that transmits the captured image data (i.e., the video conference terminal 3a) temporarily manages the viewable area information (step S213), and transmits, at each certain time interval, the viewable area information to each of the other communication terminals (steps S215 to S222). In other words, in the second embodiment, the transmitter terminal that transmits the captured image data (i.e., the video conference terminal 3a in the present example) manages the captured image data transmitted thereby and displayed as the viewable area image of the viewable area T2 by another communication terminal.

The second embodiment is the same in configuration as the first embodiment. However, the process of the second embodiment illustrated in FIG. 45 is different from the process of the first embodiment illustrated in FIG. 30. In the following description, therefore, the same components as those of the first embodiment will be denoted with the same reference numerals as those of the first embodiment, and description thereof will be omitted. Further, differences from the process of the first embodiment will be described with FIG. 45.

For example, when the user UD1 at the site D displays the viewable area image of the site A with the video conference terminal 3d, the transmitting and receiving unit 31d of the video conference terminal 3d transmits the viewable area information representing the displayed viewable area image to the communication management system 5 (step S211). The viewable area information includes the IP address of the video conference terminal 3a and the IP address of the video conference terminal 3d. Herein, the video conference terminal 3a is the transmitter terminal that transmits the captured image data corresponding to the omnidirectional image, and the video conference terminal 3d is the destination terminal to which the captured image data is transmitted (i.e., the transmitter terminal that transmits the viewable area information). Then, the transmitting and receiving unit 51 of the communication management system 5 receives the viewable area information.

The transmitting and receiving unit 51 of the communication management system 5 then transmits the viewable area information including the IP addresses received at step S211 to the video conference terminal 3a (i.e., the transmitter terminal that transmits the captured image data) (step S212). Then, the transmitting and receiving unit 31a of the video conference terminal 3a receives the viewable area information.

Then, the storing and reading unit 39a of the video conference terminal 3a stores the viewable area information, the IP address of the transmitter terminal, and the IP address of the destination terminal received at step S212 in the viewable area management DB 3003a (step S213). The process of step S213 is a process for the transmitter terminal that transmits the captured image data (i.e., the video conference terminal 3a in the present example) to manage the information of how the captured image data transmitted by the transmitter terminal is displayed by another communication terminal. The processes of steps S211 to S213 are performed each time the viewable area image is changed in the video conference terminal 3d.

The storing and reading unit 39a of the video conference terminal 3a then reads, at each certain time interval (e.g., every 30 seconds), the latest (i.e., most recently stored) set of the viewable area information and the IP addresses from the sets of the viewable area information and the IP addresses stored in the viewable area management DB 3003a (step S214).

Then, the video conference terminal 3a performs a process of setting the operation state (step S215). This process of step S215 is similar to that of step S116 of the first embodiment illustrated in FIG. 30, and thus description thereof will be omitted. The transmitting and receiving unit 31a then transmits the viewable area information including the IP addresses read at step S214 to the communication management system 5 (step S216). Then, the transmitting and receiving unit 51 of the communication management system 5 receives the viewable area information.

The transmitting and receiving unit 51 of the communication management system 5 then distributes (i.e., transmits) the viewable area information including the IP addresses received at step S216 to the other communication terminals (i.e., the smartphone 9 and the PC 7) (steps S217 and S220). Then, in the smartphone 9, the transmitting and receiving unit 91 receives the viewable area information, and the storing and reading unit 99 stores the viewable area information and the IP addresses received at step S217 in the viewable area management DB 9003 in association with each other (step S218). Then, the smartphone 9 performs a process of setting the operation state (step S219). This process of step S219 is similar to that of step S116 in FIG. 30, and thus description thereof will be omitted.

Further, in the PC 7, the transmitting and receiving unit 71 receives the viewable area information, and the storing and reading unit 79 stores the viewable area information and the IP addresses received at step S220 in the viewable area management DB 7003 in association with each other (step S221). Then, the PC 7 performs a process of setting the operation state (step S222). This process of step S222 is similar to that of step S122 in FIG. 30, and thus description thereof will be omitted.

As described above, according to the second embodiment, the communication terminal that transmits the captured image data (i.e., the transmitter terminal) collects the viewable area information indicating how the viewable area is displayed by another communication terminal based on the captured image data transmitted from the transmitter terminal. Further, the transmitter terminal distributes the collected viewable area information to the other communication terminals. In addition to the effects of the first embodiment, therefore, the second embodiment also provides an effect of avoiding concentration of loads on the communication management system 5 when many communication terminals participate in the same video conference, for example.

A third embodiment of the present invention will be described with FIGS. 46 to 49.

In the above-described first embodiment, when the display control right is set for a particular communication terminal, the particular communication terminal is capable of causing another communication terminal to perform the follow-up display of the viewable area image being displayed by the particular communication terminal. In the third embodiment, on the other hand, the particular communication terminal is capable of causing the another communication terminal to perform the follow-up display of the viewable area image being displayed by the particular communication terminal, specifically when the particular communication terminal is previously permitted to do so by the another communication terminal.

The image communication system 10 of the third embodiment is the same in the hardware and functional configurations and databases as that of the first embodiment except that the communication management system 5 of the first embodiment illustrated in FIG. 15A is replaced by a communication management system 50 in which the storage unit 5000 additionally stores a forwarding permission setting management DB 5005. In the following description, therefore, the same components as those of the first embodiment will be denoted with the same reference numerals as those of the first embodiment, and description thereof will be omitted. Further, differences from the databases of the first embodiment will be described with FIGS. 46 and 47.

Figures 46, 47:
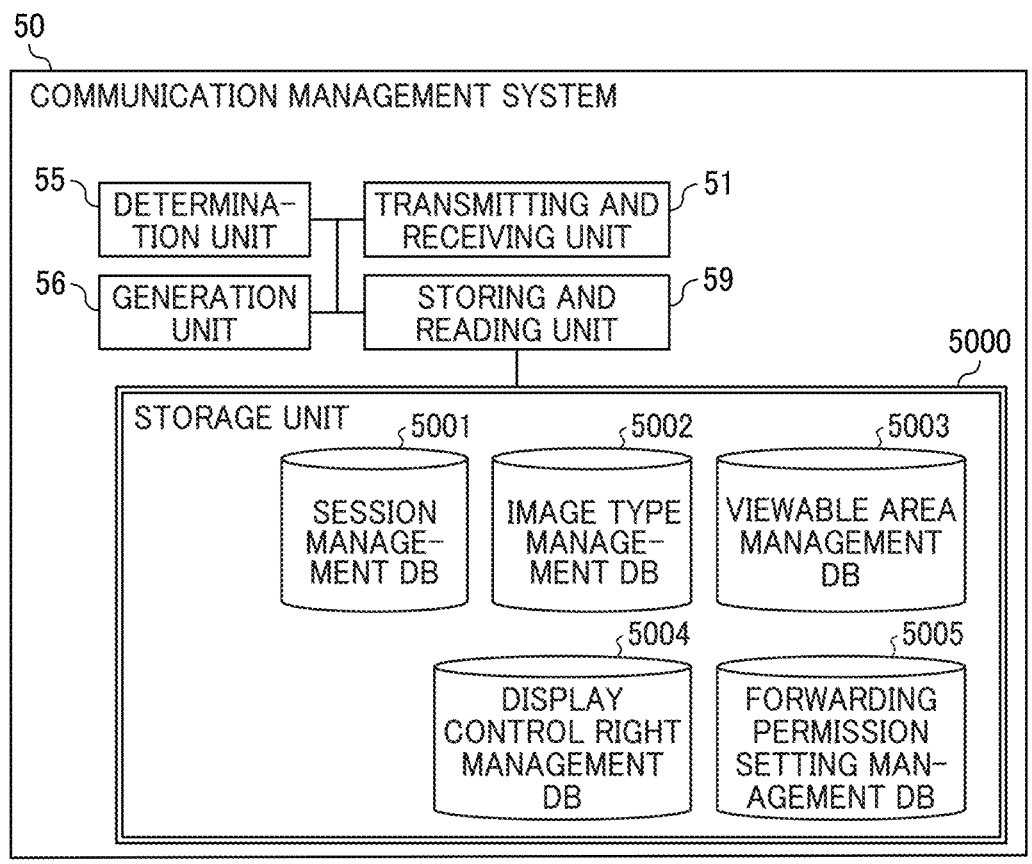
FIG. 46 is a functional block diagram illustrating a communication management system of a third embodiment of the present invention.
FIG. 47 is a conceptual diagram illustrating a forwarding permission setting management table of the third embodiment.

As illustrated in FIG. 46, the storage unit 5000 of the communication management system 50 stores the forwarding permission setting management DB 5005 in addition to the session management DB 5001, the image type management DB 5002, the viewable area management DB 5003, and the display control right management DB 5004. The forwarding permission setting management DB 5005 is configured as a forwarding permission setting management table illustrated in FIG. 47.

FIG. 47 is a conceptual diagram illustrating the forwarding permission setting management table. In the forwarding permission setting management table, the IP address of the communication terminal that transmits the viewable area information (i.e., the transmitter terminal) and the IP address of the communication terminal to which the viewable area information is transmitted (i.e., the destination terminal) are managed in association with each other. For example, when the communication terminal that transmits the viewable area information (i.e., the transmitter terminal) has a 32-bit IP address "1.3.1.1" and the communication terminal to which the viewable area information is transmitted (i.e., the destination terminal) has an IP address "1.2.1.1." the IP addresses "1.3.1.1" and "1.2.1.1" are managed in association with each other. When the communication management system 50 receives the viewable area information from the communication terminal with the IP address "1.3.1.1," therefore, the communication management system 50 forwards (i.e., transmits) the viewable area information to the communication terminal with the IP address "1.2.1.1." The communication management system 50, however, does not forward (i.e., transmit) the viewable area information to a communication terminal, the IP address of which is not managed in the forwarding permission setting management table.

Processes and operations of the third embodiment will be described with FIGS. 48 and 49.

With FIG. 48, a description will be given of an example in which the video conference terminal 3*a* sets permission in the communication management system 50 to forward the viewable area information from the video conference terminal 3*d* to the video conference terminal 3*a*.

Figure 48:
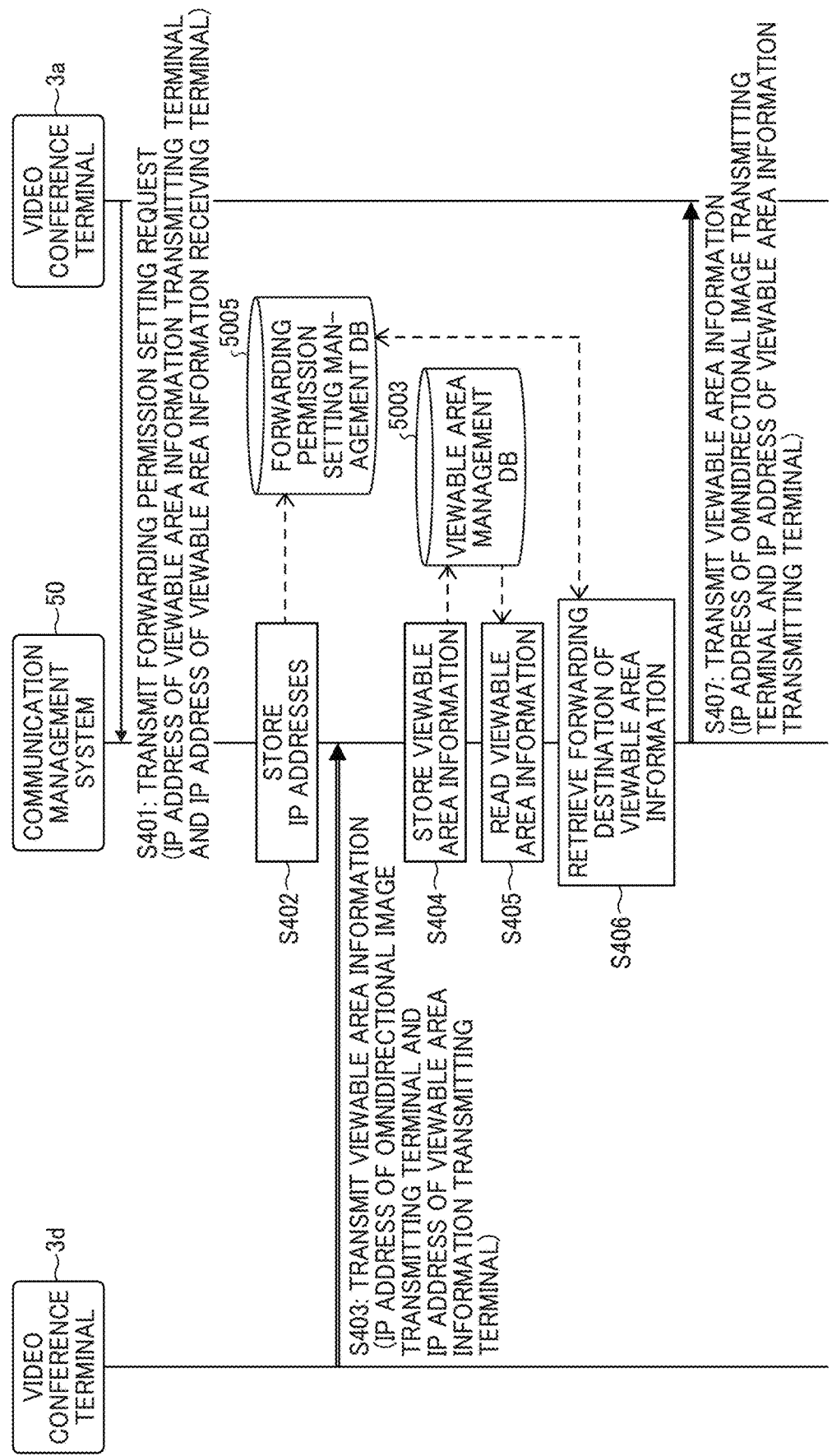
FIG. 48 is a sequence diagram illustrating a viewable area information sharing process of the third embodiment based on forwarding permission setting.

FIG. 48 is a sequence diagram illustrating a process of the third embodiment to share the viewable area information based on a forwarding permission setting.

The transmitting and receiving unit 31*a* of the video conference terminal 3*a* first transmits a forwarding permission setting request to the communication management system 50 (step S401). The forwarding permission setting request represents a request to set the forwarding permission. The forwarding permission setting request includes the IP address of the transmitter terminal that transmits the viewable area information (i.e., the video conference terminal 3*d* in the present example) and the IP address of the destination terminal to which the viewable area information is transmitted (i.e., the video conference terminal 3*a* in the present example). Then, the transmitting and receiving unit 51 of the communication management system 50 receives the forwarding permission setting request.

Then, the storing and reading unit 59 of the communication management system 50 stores the IP addresses received at step S401, i.e., the IP address of the transmitter terminal that transmits the viewable area information and the IP address of the destination terminal to which the viewable area information is transmitted, in the forwarding permission setting management DB 5005 in association with each other (step S402).

Then, the transmitting and receiving unit 31*d* of the video conference terminal 3*d* set with the display control right transmits the viewable area information to the communication management system 50 (step S403), and the transmitting and receiving unit 51 of the communication management system 50 receives the viewable area information. This process of step S403 is similar to that of step S111 in FIG. 30. The viewable area information includes the IP address of the transmitter terminal that transmits the captured image data corresponding to the omnidirectional image and the IP address of the destination terminal to which the captured image data is transmitted (i.e., the transmitter terminal that transmits the viewable area information). Then, the communication management system 50 executes processes similar to those of steps S112 and S113 in FIG. 30 (steps S404 and S405).

Then, the determination unit 55 of the communication management system 50 performs a search through the forwarding permission setting management DB 5005 with a search key set to the IP address of the transmitter terminal that transmits the viewable area information (i.e., one of the IP addresses received at step S403), to thereby read from the forwarding permission setting management DB 5005 the corresponding IP address of the destination terminal to which the viewable area information is transmitted (step S406). Thereby, the communication management system 50 extracts the IP address of the destination terminal to which the viewable area information is forwarded (i.e., the IP address of the video conference terminal 3*a* in the present example). Then, the transmitting and receiving unit 51 of the communication management system 50 forwards (i.e., transmits) the viewable area information received at step S403 to the video conference terminal 3*a* (step S407). Then, the transmitting and receiving unit 31*a* of the video conference terminal 3*a* receives the viewable area information. Thereby, the video conference terminal 3*a* performs the follow-up display to display the viewable area image being displayed by the video conference terminal 3*d*.

With FIG. 49, a description will be given of an example in which the video conference terminal 3*a* cancels the permission set in the communication management system 50 to forward the viewable area information from the video conference terminal 3*d* to the video conference terminal 3*a*.

Figure 49:
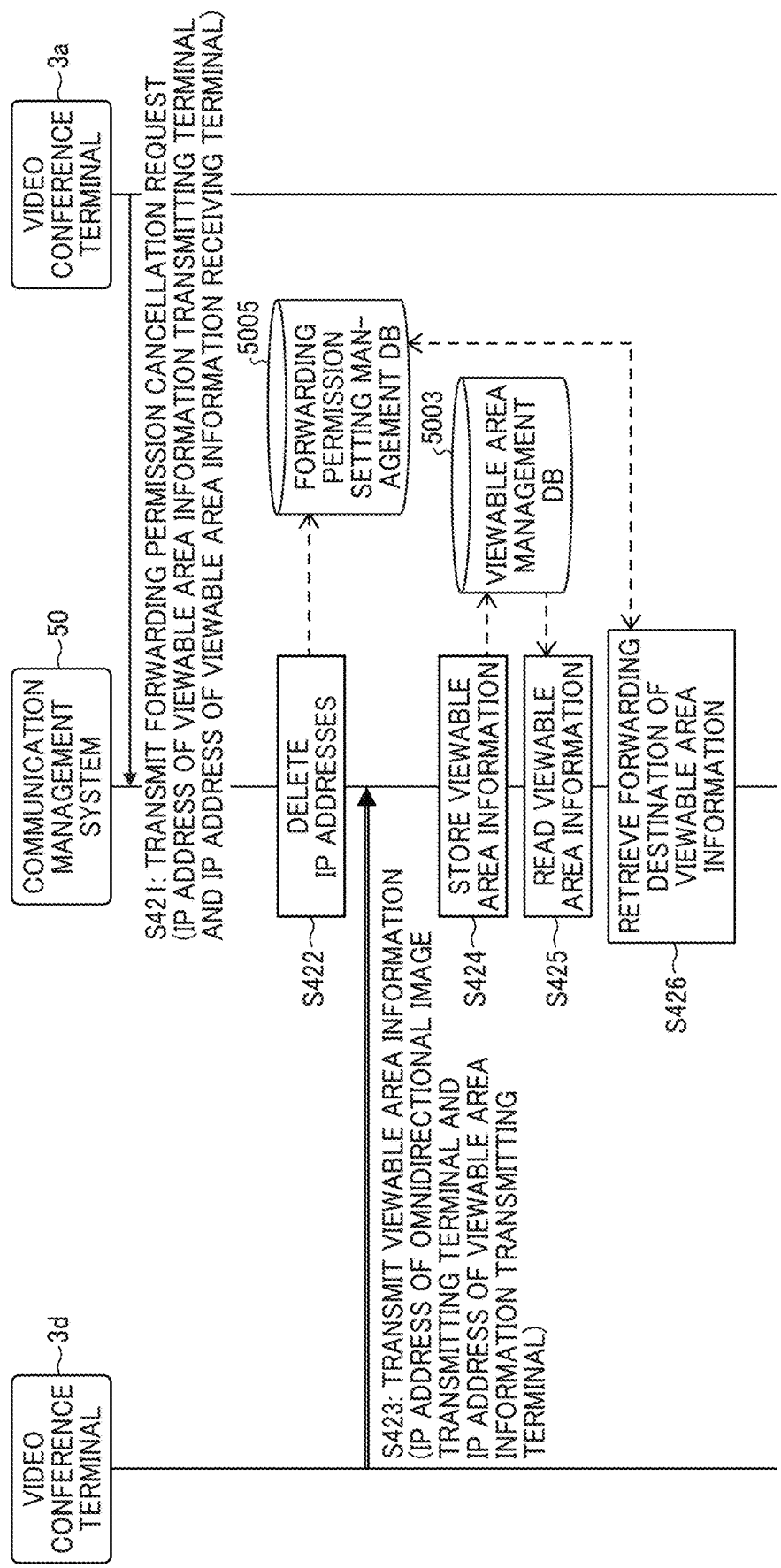
FIG. 49 is a sequence diagram illustrating a viewable area information unsharing process of the third embodiment based on cancellation of the forwarding permission.

FIG. 49 is a sequence diagram illustrating a process of the third embodiment to unshare the viewable area information based on the cancellation of the setting of the forwarding permission.

The transmitting and receiving unit 31*a* of the video conference terminal 3*a* first transmits a forwarding permission cancellation request to the communication management system 50 (step S421). The forwarding permission cancellation request represents a request to cancel the setting of the forwarding permission. The forwarding permission cancellation request includes the IP address of the transmitter terminal that transmits the viewable area information (i.e., the video conference terminal 3*d* in the present example) and the IP address of the destination terminal to which the viewable area information is transmitted (i.e., the video conference terminal 3*a* in the present example). Then, the transmitting and receiving unit 51 of the communication management system 50 receives the forwarding permission cancellation request.

Then, the storing and reading unit 59 of the communication management system 50 deletes, from the forwarding permission setting management DB 5005, the same IP addresses as the IP addresses received at step S421, i.e., the IP address of the transmitter terminal that transmits the viewable area information and the IP address of the destination terminal to which the viewable area information is transmitted (step S422).

Then, the transmitting and receiving unit 31*d* of the video conference terminal 3*d* set with the display control right transmits the viewable area information to the communication management system 50 (step S423), and the transmitting and receiving unit 51 of the communication management system 50 receives the viewable area information. This process of step S423 is similar to that of step S111 in FIG. 30. The viewable area information includes the IP address of the transmitter terminal that transmits the captured image data corresponding to the omnidirectional image and the IP address of the destination terminal to which the captured image data is transmitted (i.e., the transmitter terminal that transmits the viewable area information). Then, the communication management system 50 executes processes similar to those of steps S112 and S113 in FIG. 30 (steps S424 and S425).

Then, the determination unit 55 of the communication management system 50 performs a search through the forwarding permission setting management DB 5005 with a search key set to the IP address of the transmitter terminal that transmits the viewable area information (i.e., one of the IP addresses received at step S423), to read from the forwarding permission setting management DB 5005 the corresponding IP address of the destination terminal to which the viewable area information is transmitted (step S426). In the present example, the IP address of the video conference terminal 3a (i.e., the destination terminal to which the viewable area information is transmitted) has been deleted from the forwarding permission setting management DB 5005 at step S422, and thus is not read at step S426. Unlike at step S407 in FIG. 48, therefore, the transmitting and receiving unit 51 of the communication management system 50 does not forward (i.e., transmit) the viewable area information received at step S423 to the video conference terminal 3a. Consequently, the video conference terminal 3a avoids the follow-up display of the viewable area image being displayed by the video conference terminal 3d.

As described above, according to the third embodiment, a communication terminal transmits the forwarding permission setting request to the communication management system 50 specifically when performing the follow-up display of the viewable area image being displayed by another communication terminal. When the communication terminal prefers not to perform the follow-up display of the viewable area image being displayed by another communication terminal, therefore, the viewable area information transmitted to the communication management system 50 from the another communication terminal is not forwarded (i.e., transmitted) to the communication terminal by the communication management system 50. Consequently, the communication terminal is capable of avoiding the follow-up display of the viewable area image being displayed by the another communication terminal.

In the above-described embodiments, the communication terminal performs the follow-up display by switching the first viewable area image to the second viewable area image. However, the follow-up display is not limited thereto. For example, the second viewable area image may be displayed simultaneously with (i.e., together with) the first viewable area image being displayed.

Further, in the above-described embodiments, the captured image (i.e., the whole image) is the three-dimensional omnidirectional image as an example of the panoramic image. The captured image, however, may be a two-dimensional panoramic image.

Further, in the above-described embodiments, the communication management system 5 or 50 relays the viewable area information transmitted from each of the communication terminals. However, the communication of the viewable area information is not limited thereto. For example, the communication terminals may directly transmit and receive the viewable area information therebetween.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions. Further, the above-described steps are not limited to the order disclosed herein.

The invention claimed is:

1. A communication terminal comprising circuitry configured to
    display a first viewable area image on a display, the first viewable area image corresponding to a first viewable area of a whole image, and the whole image being shared by a plurality of communication terminals,
    store first display control terminal identification information in a memory, the first display control terminal identification information identifying a first communication terminal of the plurality of communication terminals that causes a second communication terminal of the plurality of communication terminals to display an image being displayed by the first communication terminal,
    receive second display control terminal identification information and viewable area information from a third communication terminal of the plurality of communication terminals that displays a second viewable area image corresponding to a second viewable area of the whole image, the second display control terminal identification information identifying the third communication terminal, and the viewable area information representing the second viewable area,
    when the second display control terminal identification information is the same as the first display control terminal identification information, determine whether an operation state of the first viewable area image at the time of receipt of the viewable area information is an operating state, and
    when the operation state of the first viewable area image at the time of receipt of the viewable area information is the operating state, displays the second viewable area image represented by the viewable area information on the display after the operation state of the first viewable area image shifts from the operating state to a standby state.

2. The communication terminal of claim 1, wherein the circuitry displays the second viewable area image on the display in place of the first viewable area image being displayed by the communication terminal.

3. The communication terminal of claim 1, wherein the circuitry further
    stores first image sharing terminal identification information in the memory in association with the first display control terminal identification information, the first image sharing terminal identification information identifying a fourth communication terminal of the plurality of communication terminals that transmits the whole image to be shared,
    receives, in addition to the second display control terminal identification information and the viewable area information, second image sharing terminal identification information from the third communication terminal, and when the second display control terminal identification information is the same as the first display control terminal identification information and the second image sharing terminal identification information is the same as the first image sharing terminal identification information, displays the second viewable area image represented by the viewable area information on the display.

4. The communication terminal of claim 3, wherein when the operation state of the first viewable area image at the time of receipt of the viewable area information is the operating state, the circuitry stores the received viewable area information in the memory, and wherein when the operation state of the first viewable area image shifts from the operating state to the standby state, the circuitry displays the second viewable area image represented by the stored viewable area information on the display.

5. The communication terminal of claim 1, wherein when the operation state of the first viewable area image is the operating state and the first display control terminal identification information is absent in the memory, the circuitry transmits a setting request to a communication management server to set a display control right for the communication terminal to cause another communication terminal of the plurality of communication terminals to display the first viewable area image being displayed by the communication terminal, the communication management server controlling communication between the plurality of communication terminals.

6. The communication terminal of claim 5, wherein when transmitting the setting request, the circuitry transmits identification information identifying the communication terminal as the first display control terminal identification information.

7. The communication terminal of claim 5, wherein the circuitry receives a setting result from the communication management server as a response to the setting request, and displays the setting result on the display.

8. The communication terminal of claim 5, wherein when the operation state of the first viewable area image is the standby state and identification information identifying the communication terminal is stored in the memory as the first display control terminal identification information, the circuitry transmits a cancellation request to the communication management server to cancel the display control right set for the communication terminal.

9. The communication terminal of claim 5, wherein the circuitry transmits, to the communication management server, identification information identifying the third communication terminal to permit the communication management server to forward the viewable area information from the third communication terminal to the communication terminal.

10. An image communication system comprising:
a plurality of communication terminals each configured as the communication terminal of claim 1; and
a communication management server configured to control communication between the plurality of communication terminals.

11. A display method executed by a communication terminal, the display method comprising:
displaying a first viewable area image on a display, the first viewable area image corresponding to a first viewable area of a whole image, and the whole image being shared by a plurality of communication terminals;
storing first display control terminal identification information in a memory, the first display control terminal identification information identifying a first communication terminal of the plurality of communication terminals that causes a second communication terminal of the plurality of communication terminals to display an image being displayed by the first communication terminal;
receiving second display control terminal identification information and viewable area information from a third communication terminal of the plurality of communication terminals that displays a second viewable area image corresponding to a second viewable area of the whole image, the second display control terminal identification information identifying the third communication terminal, and the viewable area information representing the second viewable area;
when the second display control terminal identification information is the same as the first display control terminal identification information, determining whether an operation state of the first viewable area image at the time of receipt of the viewable area information is an operating state; and
when the determining determines that the operation state of the first viewable area image at the time of receipt of the viewable area information is the operating state, displaying the second viewable area image represented by the viewable area information on the display after the operation state of the first viewable area image shifts from the operating state to a standby state.

12. A non-transitory recording medium storing a plurality of instructions which, when executed by one or more processors, cause the processors to perform a display method executed by a communication terminal, the display method comprising:
displaying a first viewable area image on a display, the first viewable area image corresponding to a first viewable area of a whole image, and the whole image being shared by a plurality of communication terminals;
storing first display control terminal identification information in a memory, the first display control terminal identification information identifying a first communication terminal of the plurality of communication terminals that causes a second communication terminal of the plurality of communication terminals to display an image being displayed by the first communication terminal;
receiving second display control terminal identification information and viewable area information from a third communication terminal of the plurality of communication terminals that displays a second viewable area image corresponding to a second viewable area of the whole image, the second display control terminal identification information identifying the third communication terminal, and the viewable area information representing the second viewable area;
when the second display control terminal identification information is the same as the first display control terminal identification information, determining whether an operation state of the first viewable area image at the time of receipt of the viewable area information is an operating state; and
when the determining determines that the operation state of the first viewable area image at the time of receipt of the viewable area information is the operating state, displaying the second viewable area image represented by the viewable area information on the display after the operation state of the first viewable area image shifts from the operating state to a standby state.

* * * * *